US012575584B2

(12) United States Patent
Zeng et al.

(10) Patent No.: US 12,575,584 B2
(45) Date of Patent: \*Mar. 17, 2026

(54) FUNCTIONAL EDIBLE OIL, PREPARATION METHOD THEREFOR AND USE THEREOF

(71) Applicant: Nanchang University, Nanchang (CN)

(72) Inventors: Zheling Zeng, Nanchang (CN); Guibing Zeng, Nanchang (CN); Zhen Ouyang, Nanchang (CN); Bo Yang, Nanchang (CN); Ping Yu, Nanchang (CN); Jiaheng Xia, Nanchang (CN); Maomao Ma, Nanchang (CN); Dongman Wan, Nanchang (CN); Miao Luo, Nanchang (CN); Cheng Zeng, Nanchang (CN); Xuefang Wen, Nanchang (CN)

(73) Assignee: Nanchang University, Nanchang (CN)

( * ) Notice: Subject to any disclaimer, the term of this patent is extended or adjusted under 35 U.S.C. 154(b) by 295 days.

This patent is subject to a terminal disclaimer.

(21) Appl. No.: 18/273,740

(22) PCT Filed: Oct. 14, 2021

(86) PCT No.: PCT/CN2021/123734
§ 371 (c)(1),
(2) Date: Jul. 21, 2023

(87) PCT Pub. No.: WO2022/156273
PCT Pub. Date: Jul. 28, 2022

(65) Prior Publication Data
US 2024/0122200 A1     Apr. 18, 2024

(30) Foreign Application Priority Data
Jan. 22, 2021    (CN) .......................... 202110086361.2

(51) Int. Cl.
*A23D 9/007*        (2006.01)
*A23D 9/04*         (2006.01)

(52) U.S. Cl.
CPC .............. *A23D 9/007* (2013.01); *A23D 9/04* (2013.01)

(58) Field of Classification Search
CPC . A23D 9/007; A23D 9/04; A23D 9/00; C11C 3/10
See application file for complete search history.

(56) References Cited

U.S. PATENT DOCUMENTS

2004/0191391 A1      9/2004  Takeuchi et al.

FOREIGN PATENT DOCUMENTS

| CN | 1293176 C | 1/2007 |
| CN | 100372470 C | 3/2008 |
| CN | 101185465 A | 5/2008 |
| CN | 100523206 C | 8/2009 |
| CN | 101530138 A | 9/2009 |
| CN | 102140390 A | 8/2011 |
| CN | 102326630 A | 1/2012 |
| CN | 103027133 A | 4/2013 |
| CN | 103315071 A | 9/2013 |
| CN | 103380827 A | 11/2013 |
| CN | 103891920 A | 7/2014 |
| CN | 104247783 A | 12/2014 |
| CN | 104413147 A | 3/2015 |
| CN | 104413172 A | 3/2015 |
| CN | 104642563 A | 5/2015 |
| CN | 104719504 A | 6/2015 |
| CN | 104988190 A | 10/2015 |
| CN | 106490189 A | 3/2017 |
| CN | 107058413 A | 8/2017 |
| CN | 108770954 A | 11/2018 |
| CN | 109666541 A | 4/2019 |
| CN | 109699760 A | 5/2019 |
| CN | 109907126 A | 6/2019 |
| CN | 111304006 A | 6/2020 |
| CN | 112772731 A | 5/2021 |
| CN | 112772924 A | 5/2021 |
| CN | 113287659 A | 8/2021 |
| JP | 2001-226693 A | 8/2001 |
| JP | 2005-171237 A | 6/2005 |
| JP | 2015211666 A | 11/2015 |

(Continued)

OTHER PUBLICATIONS

"National Food Safety Standards Determination of Fatty Acids in Food" The People's Republic of China National Health and Family Planning Commission, Issued by the State Food & Drug Administration General Bureau, Published on Dec. 23, 2016.
"Lipase-catalyzed Preparation of Structural Lipids from Cinnamomum Camphora Seed Kernel Oil and Polyunsaturated Long Carbon Chain Oil" China Academic Journal Electronic Publishing House, May 18, 2019.
Hu, Jiang-Ning et al., "Characterization of Medium-Chain Triacylglycerol (MCT)-Enriched Seed Oil from Cinnamomum Camphora (Lauraceae) and Its Oxidative Stability", Journal of Agricultural and Food Chemistry, Apr. 2, 2011, pp. 4771-4778.

(Continued)

*Primary Examiner* — Erik Kashnikow
*Assistant Examiner* — Janice Y Silverman

(57)                ABSTRACT

Provided is a functional edible oil (FEO), a preparation method therefor and use thereof. The FEO is prepared by ternary transesterification of medium-chain triglycerides (MCTs), oils rich in linoleic acid, and oils rich in linolenic acid. The fatty acid composition and distribution of the FEO were determined and optimized via comparative analysis of indexes such as melting point, and effect of improving glucose and lipid metabolism as determined by animal tests. The FEO has a mass ratio of 2.3 to 4.0 for medium chain fatty acids (MCFAs) in MCTs to long chain fatty acids (LCFAs) in the oils rich in linoleic acid, and oils rich in linolenic acid and a mass ratio of 0.5 to 1.0 for linoleic acid to linolenic acid in the LCFAs, by mass of fatty acids. The FEO is added to food products at ≥18.00%.

10 Claims, 44 Drawing Sheets

(56) References Cited

FOREIGN PATENT DOCUMENTS

| | | | | |
|---|---|---|---|---|
| JP | 201910039 | A | * | 1/2019 |
| WO | 2016010102 | A1 | | 1/2016 |

OTHER PUBLICATIONS

"Import and Export Animal Fat Method for Determination of Freezing Point of Fatty Acids" People's Republic of China (PRC) Entry-Exit Inspection and Quarantine Industry Standard, Nov. 1, 2010.

"Vegetable Fat Determination of Fatty Acid Composition in 2-Position of Triglyceride Molecule" General Adminstration of Quality Supervision, Inspection and Quarantine of the People's Republic of China, Published Jun. 30, 2010.

Chinese Office Action dated Oct. 14, 2022 for Application No. 202110086345.3.

* cited by examiner

1

FUNCTIONAL EDIBLE OIL, PREPARATION METHOD THEREFOR AND USE THEREOF

CROSS-REFERENCE TO RELATED APPLICATION

This patent application is a national phase application of the PCT application No. PCT/CN2021/123734, filed on Oct. 14, 2021, which claims the benefit and priority of Chinese Patent Application No. 202110086361.2 filed with the China National Intellectual Property Administration on Jan. 22, 2021, both of which are incorporated by reference herein in their entirety as part of the present application.

TECHNICAL FIELD

The present disclosure belongs to the technical field of edible fats and oils.

BACKGROUND

Fatty acids are classified as Short-Chain Fatty Acids (SCFAs, fatty acids with 2-6 carbon atoms), Medium-Chain Fatty Acids (MCFAs, fatty acids with 8-12 carbon atoms), Long-Chain Fatty Acids (LCFAs, fatty acids with more than 12 carbon atoms) according to the length of their carbon chains, and are classified as Essential Fatty Acids (EFAs) and Non-Essential Fatty Acids (NEFAs) according to whether the body can synthesize them by itself.

Oils and fats are mixed fatty acid triglycerides, which, according to the number of carbon atoms of fatty acids attached to the glycerol backbone, are classified as Long-Chain Triglycerides (LCTs), Medium and Long-Chain Triglycerides (MLCTs), Medium-Chain Triglycerides (MCTs), and Short-Chain Triglycerides (SCTs).

Oils and fats are one of the three major energy-producing nutrients and six major nutrients for the human body. The unit energy yield of lipid (9 kcal) is 2.25 times that of the other two energy-producing nutrients, carbohydrate (4 kcal) and protein (4 kcal). Because most of oils and fats contain EFAs required by the human body, long-term shortage of lipid in human body will lead to serious physiological disorders.

The vast majority of natural edible fats and oils are LCTs containing more than 95% (w/w) LCFAs, such as soybean oil, palm oil, peanut oil, canola oil, lard, corn oil, rice bran oil, tea seed oil, olive oil, cocoa butter, etc. MLCTs containing more than 50% MCFAs merely include coconut oil (about 7.5% caprylic acid, 7.0% capric acid, 48.0% lauric acid), palm kernel oil (about 3.9% caprylic acid, 5.0% capric acid, 47.5% lauric acid) and *Litsea cubeba* kernel oil (about 15.8% capric acid, 71.6% lauric acid), MCT containing more than 95% (w/w) MCFAs includes only *Cinnamomum camphora* Seed Kernel Oil (CCSKO, containing 0.32-0.47% caprylic acid, 56.49-61.98% capric acid and 34.18-39.20% lauric acid), which was found by the inventor of the present disclosure, and SCT containing more than 1% SCFA only includes cow butyrin produced by fermentation of cow milk.

Studies at home and abroad on LCTs and LCFAs have reported that LCTs are absorbed, transported, and stored in the body as triglycerides. LCFAs, whose intracellular transport and metabolic and energy-producing process depend on the carnitine-acylcarnitine transferase system, have a large molecular weight, small solubility in the blood, long half-life, and slow and incomplete metabolism and clearance. Excess LCFAs in the body are easily re-esterified into LCTs and accumulated in blood, liver, adipose tissue and other tissues, affecting the function of liver, kidney, lung and other organs, which in turn leads to disorders of lipid metabolism and glucose metabolism. Long-term excessive intake of high-energy foods rich in LCTs is one of the main causes for metabolic syndrome such as overweight, obesity, non-alcoholic fatty liver disease, hyperlipidemia, hyperglycemia, hypertension, hyperviscosity, hyperuricemia and hyperinsulinemia.

Domestic and foreign research and reports on MCTs and MCFAs show that MCFAs contained in MCTs include Caprylic acid (C), Capric acid (Ca) and Lauric acid (La). MCTs are absorbed, transported and metabolized in the body in the form of free MCFAs. MCFAs have small molecular weight, high solubility in blood, short half-life, and do not depend on the carnitine-acylcarnitine transferase system for in vivo transport, so they can directly enter cells and mitochondria for oxidative production. MCFAs are not easily re-esterified in the body, have little effect on liver, kidney, lung and other organs, do not compete with bilirubin for albumin, do not deepen jaundice, and have more significant protein-saving (nitrogen-saving) effects than LCFAs. MCTs have the effect of quickly replenishing energy in the body and improving disorders of glucose and lipid metabolism in the body. However, MCFAs are NEFAs, cannot be converted into functional fatty acid in the body, nor does it provide essential and functional fatty acids required for human growth and development.

Linoleic acid (L) is an ω-6 essential fatty acid and linolenic acid (Ln) is an ω-3 essential fatty acid. Linoleic acid and linolenic acid are precursors or parents for in vivo synthesis of polyunsaturated fatty acids with important physiological functions, such as Arachidonic acid (ARA), Eicosapentaenoic acid (EPA), Docosahexaenoic acid (DHA), Prostaglandin (PG), Thromboxane (TXA), and Leukotriene (LT). These polyunsaturated fatty acids are important components of the brain and retina, and have the function of promoting and maintaining the development and growth of the brain nervous system and visual system, lowering triglyceride and cholesterol levels in the blood, preventing the accumulation of cholesterol and fat in the arterial walls, improving the health of the cardiovascular system and immune system, and improving the disorders of glucose and lipid metabolism in the body.

Affected by the physical and chemical properties, flavors and tastes, dietary patterns, production, and prices of fats and oils, human consumption of fats and oils so far is still limited mainly to soybean oil, palm oil, peanut oil, rapeseed oil, lard, corn oil, rice bran oil, tea seed oil, olive oil, cocoa butter and other LCTs, in the form of lipid-containing food, and slightly to MLCTs with low annual production, such as palm kernel oil, coconut oil. Since most of the fats and oils consumed by human are LCTs including oils rich in oleic acid, linoleic acid, palmitic acid and erucic acid, oils rich in linoleic acid and oleic acid, oils rich in oleic acid and palmitic acid and oils rich in erucic acid and oleic acid, and the phenomenon of imbalance of EFAs and lack of linolenic acid in human body is quite common. With the improvement of human living standards, the number of people suffering from overweight, obesity, non-alcoholic fatty liver disease, hyperlipidemia, hyperglycemia, hypertension, hyperviscosity, hyperuricemia, hyperinsulinemia and other metabolic syndromes is increasing due to excessive intake of high-energy foods rich in LCTs.

In order to overcome the drawbacks of LCT products, researchers focused on oils and fats at home and abroad have developed a variety of MLCTs and methods of preparation thereof, mainly including the following four kinds.

The first is a method for preparing medium and long chain blended oil by physically mixing LCTs with MCTs. CN101530138 discloses a medium and long chain health care dietary oil, and CN100372470C discloses a physically blended MLCTs suitable for critically ill patients and method of preparation thereof. Both of them adopted physical blending of LCTs with MCTs to make up for the deficiency of MCTs. However, these products do not solve the problems of low smoke point, easy foaming, high freezing point and crystalline delamination at low temperature which makes it difficult to maintain clarity and transparency brought by physical blending, so they are not suitable for application as cooking oil.

The second is a method for preparing lipid and lipid composition with diglycerides as the main components. For example, CN101185465 discloses a lipid composition that can reduce lipid deposition in the body with conjugated linoleic acid and medium chain fatty acid glycerides and diglycerides as active ingredients. JP2005171237 discloses an oil composition comprising diglycerides and triglycerides. The oil composition contains 15-98% (w/w) of diglycerides and 1-40% (w/w) of triglycerides. The diglycerides are the active ingredient, and have one medium-chain fatty acid residue in the molecule. However, in 2009, the safety of these diglyceride-containing lipids was questioned, and all diglyceride products, which were popular in Japan, were withdrawn from the shelves because they contained glycidylglycerol, a carcinogenic substance; it was difficult to produce high concentrations of diglycerides at low cost and to be widely used.

The third is a method for preparing MLCTs. For example, CN102140390A discloses a method for synthesizing MLCTs by sodium ethanol-catalyzed transesterification of two raw materials, caprylic/capric triglyceride and soybean oil. CN102140390A discloses a method of synthesizing MLCTs for medical use by chemical transesterification. Although there are many studies on such methods, they mostly focus on the modification of the esterification method, and the content of MCFAs in the oil is low, with a maximum not exceeding 35% (w/w). For instance, US2004191391A1 discloses an oil or fat containing 5-23% of MCFAs and 1-20% of triglycerides having 2 MCFAs in the molecule; CN103380827A discloses a lipid composition for the prevention of fatty liver disease caused by obesity, which uses vegetable oils such as soybean oil, rapeseed oil, corn oil, sunflower oil, peanut oil, sesame oil, safflower oil, flax oil, cottonseed oil, rice oil, animal fats and MCTs as raw materials and adopts lipase-catalyzed transesterification of the two lipids; CN1293176C discloses a lipid composition containing MCFAs that can be used for cooking, in which the content of MCFAs is less than 14% (w/w); CN103891920A discloses a lipid composition containing MLCTs and a method of preparation thereof, in which the content of MCFAs is less than 30% (w/w); CN103380827A discloses a lipid composition for reducing liver triglycerides, in which the proportion of MCFAs in the composition is 25-35% (w/w) to all fatty acids in the composition. In contrast, according to our preliminary study, no significant effect of MLCTs with less than 50% of MCFAs was found in terms of reducing in vivo lipid deposition.

The fourth is a method for preparing triglycerides rich in polyunsaturated fatty acids. For example, CN100523206 discloses a method of producing oil or fat containing triglycerides of polyunsaturated fatty acids. In the patent, oil or fat containing at least 30% (w/w) ARA (ω6 polyunsaturated fatty acid), or oil or fat containing at least 30% (w/w) dihomo-γ-linolenic acid or ω9 series long-chain polyunsaturated fatty acid is firstly prepared by microbial method, followed by lipase-catalyzed transesterification of triglycerides containing ARA with MCFAs and their esterification, and finally the oil or fat containing triglycerides with MCFAs attached at the 1,3 position and long chain polyunsaturated fatty acids of the ω6 or ω9 series attached at the 2 position is obtained after separation. However, for one thing, the MCFAs in the patent do not include La, and the polyunsaturated fatty acids do not include linolenic acid. For another, in the patent, the physiological effects of the oil or fat containing triglycerides with polyunsaturated fatty acids is merely identified based on disclosed functions of fatty acids, and the oil or fat containing triglycerides with polyunsaturated fatty acids is used to prepare functional foods, nutritional supplement foods, newborn foods, infant formula foods, children's foods, pregnant women's foods, foods for the old, therapeutically nutritional foods, pharmaceutical compositions, and animal diets. The physiological functions of these products have not been evaluated by cellular and animal experiments.

A synthesis of the available invented products and technologies shows that there are still the following problems.

First, the domestic and foreign production and sales of caprylic/capric MCTs so far are still synthetic products prepared through hydrolysis or cleavage, separation, esterification, with vegetable oils containing less than 10% (w/w) caprylic/capric acid as raw materials, and the production is of high energy consumption and cost. CCSKO, which is a natural MCT, contains 95.60-98.50% MCFAs (containing 0.32-0.47% capric acid, 56.49-61.98% caprylic acid and 34.18-39.20% lauric acid), and there is no literature report on the development and production of functional edible oil using CCSKO.

Secondly, the MCFA contents of various MLCTs and lipid compositions are below 50% (w/w), and efforts are focused on the reduction of body lipid deposition and triglyceride content in the liver. According to our previous study, there was no significant effect of MLCTs with less than 50% (w/w) of MCFAs on reducing body lipid deposition. Moreover, the physiological effects of improving the disorders of glucose and lipid metabolism in the body while replenishing EFAs (linoleic acid and linolenic acid) are not involved for various MLCTs and lipid compositions.

Third, the fatty acid composition and structure of various MLCTs or structured lipids or lipid compositions are not optimized and determined based on the results of animal experiments.

Fourth, the mass ratio of linoleic acid to linolenic acid in human body directly affects the conversion rate of EFAs into ARA, EPA, docosapentaenoic acid (DPA), DHA and other polyunsaturated fatty acids with important physiological functions. According to the Chinese Nutrition Society, the mass ratio of linoleic acid to linolenic acid in Chinese people's daily diet is 20:1, far more than the 1-4:1 recommended by the World Nutrition Society and the 0.5-3:1 recommended by experts, which is in a serious long-term imbalance. There is no change as to the mass ratio of linoleic acid to linolenic acid in MLCT mixed by MCTs and oils rich in linoleic acid and linolenic acid, both of which are seriously imbalanced.

Fifth, the mass ratio for MCFAs to LCFAs, the position of MCFAs and EFAs on glycerides, and the mass ratio of linoleic acid to linolenic acid all affect the effect of MLCTs on reducing body lipid deposition, lowering blood lipid and blood glucose levels, improving insulin sensitivity and other effects on improving disorders of body glucose and lipid metabolism, as well as the freezing point of functional oils or fats. However, no studies have been reported on medium and long carbon chain fats that combine all three properties.

SUMMARY

The disclosure described herein includes the following technical solutions.

A first objective of the present disclosure is to provide a functional edible oil (FEO) blended by changing the composition and distribution of the fatty acids in the lipid through ternary transesterification with MCTs as the main raw material and oils rich in linoleic acid and oils rich in linolenic acid as auxiliary raw materials. The FEO is characterized by the capacity of significantly improving disorders of glucose and lipid metabolism in the body, replenishing essential and functional fatty acids in the body in a balanced manner, rapidly replenishing energy in the body, and having a low freezing point.

The FEO in the present disclosure is formed by ternary transesterification of MCTs, oils rich in linoleic acid, and oils rich in linolenic acid.

The MCTs are selected from the group consisting of CCSKO, caprylin, caprin, laurin, caprylic/capric triglyceride, capric/lauric triglyceride, caprylic/capric/lauric triglyceride, and a mixture thereof.

The oils rich in linoleic acid are selected from the group consisting of soybean oil, corn oil, sunflower seed oil, safflower seed oil.

The oils rich in linolenic acid are selected from the group consisting of linseed oil, and *perilla* seed oil.

The fatty acids of the FEO in the present disclosure have a mass ratio of 2.3 to 4.0 for MCFAs to LCFAs, and a mass ratio of 0.5 to 1.0 for linoleic acid to linolenic acid in the LCFAs. In some embodiments, a mass ratio of the MCFAs to the LCFAs is 3.0, and a mass ratio of linoleic acid to linolenic acid is 0.5 for the LCFAs in the FEO.

In some embodiments, the MCFAs are derived from MCTs selected from the group consisting of CCSKO, caprylin, caprin, laurin, caprylic/capric triglyceride, capric/lauric triglyceride, caprylic/capric/lauric triglyceride, and a mixture thereof. The LCFAs are derived from oils rich in linoleic acid and linolenic acid.

In some embodiments, the MCFAs in the FEO are selected from the group consisting of caprylic acid, capric acid and lauric acid; the LCFAs in the FEO contain 3.94% to 7.37% linoleic acid and 7.16% to 11.97% linolenic acid by percentage of a total mass of the edible oil. In some embodiments, the FEO include at least two of the MCFAs selected from the group consisting of caprylic acid, capric acid and lauric acid; and the LCFAs in the FEO include 5.30% linoleic acid and 9.97% linolenic acid by percentage of the total mass of the edible oil.

The fatty acids of the FEO in the present disclose are distributed as follows: MCFAs (caprylic acid, capric acid and lauric acids) are rich at sn-1,3 position, and EFAs (linoleic and linolenic acids) are rich at sn-2 position, with the MCFAs at sn-1,3 accounting for 84.97% to 95.86% of the total fatty acids at sn-1,3 and EFAs at position sn-2 accounting for 30.74% to 34.28% of the total fatty acids at position sn-2. In some embodiments, the MCFAs (caprylic acid, capric acid and lauric acids) at sn-1,3 account for 89.52% of the total fatty acids at sn-1,3 and the EFAs (linoleic and linolenic acids) at position sn-2 account for 33.34% of the total fatty acids at sn-2 position.

The FEO in the present disclosure has a triglyceride content of ≥60% with an equivalent carbon number (ECN)

of 34 to 44. In some embodiments, the FEO has a triglyceride content of 65.92% with an ECN of 34 to 44.

In some embodiments, the MCTs used in the FEO in the present disclosure are derived from CCSKO.

In some embodiments, in the LCTs used in the FEO in the present disclosure, the oils rich linoleic acid are taken from soybean oil and the oils rich in linolenic acid are derived from linseed oil.

The inventors of the disclosure found that CCSKO, which contains about 0.32-0.47% caprylic acid, 56.49-61.98% capric acid, 34.18-39.20% lauric acid with the MCFAs accounting for more than 95%, is natural MCT.

Experiments show that the pathway and mechanism of the FEO in the present disclosure to improve the disorders of glucose and lipid metabolism in vivo include: increasing the terminal distribution of sympathetic nerves in interscapular adipose tissue (brown adipose tissue), inguinal adipose tissue (beige adipose tissue) and epididymal adipose tissue (white adipose tissue) and promoting norepinephrine (NE) secretion and activated the β3-adrenergic receptor (β3-AR) signaling pathway by increasing the expression levels of brain-derived neurotrophic factor (BDNF) in the hypothalamic paraventricular nucleus of obese rats and BDNF and corresponding neurotrophic receptors Tyrosine kinase receptor A (TrkA) in these adipose tissues; increasing the expression of browning-related proteins such as uncoupling protein 1 (UCP1), iodothyronine deiodinase II (Dio2), PR structural domain protein 16 (PRDM16), cell death-inducing DFFA-like effector protein A (CIDEA), and beige-related protein TBX1, thereby promoting browning of abdominal white adipose tissue and beiging of inguinal white adipose tissue in obese rats; inhibiting the expression of proteins that affect triglyceride and fatty acid synthesis, such as sterol regulatory element binding protein-1c (SREBP-1c), acetyl coenzyme A carboxylase 1 (ACC1), and fatty acid synthase (FAS) in liver and adipose tissue to decrease the synthesis of fatty acids and triglycerides in vivo, increasing the expression of proteins that affect triglyceride catabolism, such as triglyceride lipase (ATGL), hormone-sensitive lipase (HSL), and lipoprotein lipase (LPL) to increase triglyceride catabolism in vivo, increasing the expression of proteins that affect β-oxidation of fatty acids, such as peroxisome proliferator-activated receptor alpha (PPARα) and carnitine palmitoyl-transferase 1a (CPT-1a) to increase the β-oxidation of fatty acids, and increasing the expression of proteolytic coupling protein 1 (UCP1) to increase proton pump leakage in mitochondria and enhance the heat production of fatty acid β-oxidation in mitochondria of adipocytes; in this way, the body fat is burned in the form of calories, thus reducing lipid deposition in obese rats, lowering serum triglyceride level in obese rats, and improving the disorder of glucose and lipid metabolism.

The second objective of the present disclosure is to provide a method for preparing the FEO.

A method for preparing the FEO in the present disclosure includes: subjecting a lipase as a catalyst to a direct ternary transesterification of MCTs with oils rich in linoleic acid and oils rich in linolenic acid at a suitable temperature and stirring intensity to obtain the FEO in one step. Wherein, a mass ratio for MCFAs to LCFAs of the FEO is 2.3 to 4.0, and a mass ratio of linoleic acid to linolenic acid in the LCFAs is 0.5 to 1.0.

In some embodiments, in the FEO, a mass ratio MCFAs in MCTs to LCFAs in oils rich in linoleic acid and oils rich in linolenic acid is 3.0, and a mass ratio of linoleic acid to linolenic acid is 0.5.

The lipase is selected from the group consisting of LIPOZYME® RM IM (lipase derived from *Rhizomucor miehei*), LIPOZYME® TL IM (lipase derived from *Thermomyces lanuginosus*), NOVOZYME® 435 (lipase derived from *Candida antarctica* lipase B), and *Staphylococcus caprae* lipase. In some embodiment, the lipase is *Staphylococcus caprae* lipase.

In some embodiments, the lipase is added at 5-25% (mass percentage of mixed oil), and the ternary transesterification is conducted at 25-45° C. for 1-8 h. In some embodiments, the lipase is added at 10% (mass percentage of mixed oil), and the ternary transesterification is conducted at 40° C. for 4 h.

The third objective of the present disclosure is to provide use of the FEO in a food product.

The food product includes but is not limited to non-dairy creamer, milk tea, meal replacement powder, health food, sports nutrition food and special medical use food. The FEO is added at ≥18.00% to the food product. In some embodiments, the FEO is added at ≥24.00%.

The FEO in the present disclosure may significantly improve the disorder of glucose and lipid metabolism in the body, balance and replenish essential and functional fatty acids in the body, quickly replenish energy, and have a freezing point lower than 7.5° C. It may meet the dietary and nutritional needs of consumers, especially patients and athletes with overweight, obese, non-alcoholic fatty liver disease, hyperlipidemia, hyperglycemia, hypertension, hyperviscosity, hyperuricemia, hyperinsulinemia and other metabolic syndrome. It may be widely used in non-dairy creamer, milk tea, meal replacement powder, health food, sports nutrition food and special medical use food industry to improve human health and living standards, with significant social, ecological and economic benefits.

BRIEF DESCRIPTION OF THE DRAWINGS

FIG. 1A is the effect on body weight of mice; FIG. 1B is the effect on body fat coefficient of mice; FIG. 1C is the effect on serum triglycerides (TG) of mice; FIG. 1D is the effect on total serum cholesterol (TC) of mice.

FIG. 2A is the effect on serum low-density lipoprotein cholesterol (LDL-C) in mice; FIG. 2B is the effect on serum high-density lipoprotein cholesterol (HDL-C) in mice; FIG. 2C is the effect on serum fasting blood glucose (FBG) in mice; and FIG. 2D is the effect on serum fasting insulin (FIN) in mice.

FIG. 3A is the effect on homeostatic model assessment of insulin resistance (HOMA-IR) in mice; FIG. 3B is the effect on serum alanine aminotransferase (ALT) in mice; and FIG. 3C is the effect on serum aspartate aminotransferase (AST) in mice.

In FIGS. 1A-3C, MCFA/LCFA: mass ratio of MCFAs to LCFAs, H-FEO: high fat functional edible oil diet, NC: normal chow (AIN-93M) group, NR: natural recovering group, HFD: high fat diet (D12451) group, FEO1: H-FEO group with MCFA/LCFA of 1.9, FEO2: H-FEO group with an MCFA/LCFA of 2.3, FEO3: H-FEO group with an MCFA/LCFA of 3.0, FEO4: H-FEO group with an MCFA/LCFA of 4.0.

8

Figure 4A:
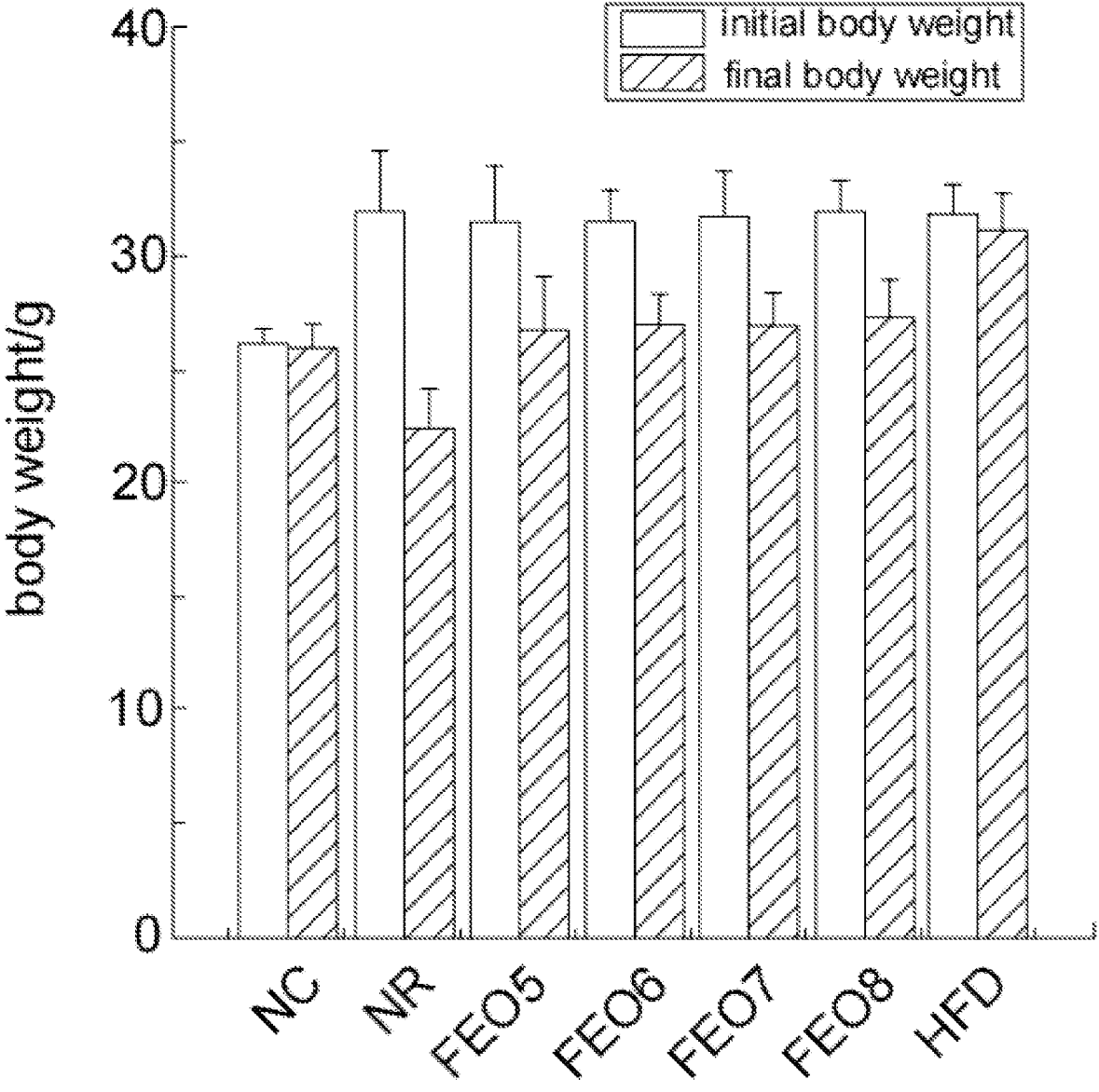
Figure 4B:
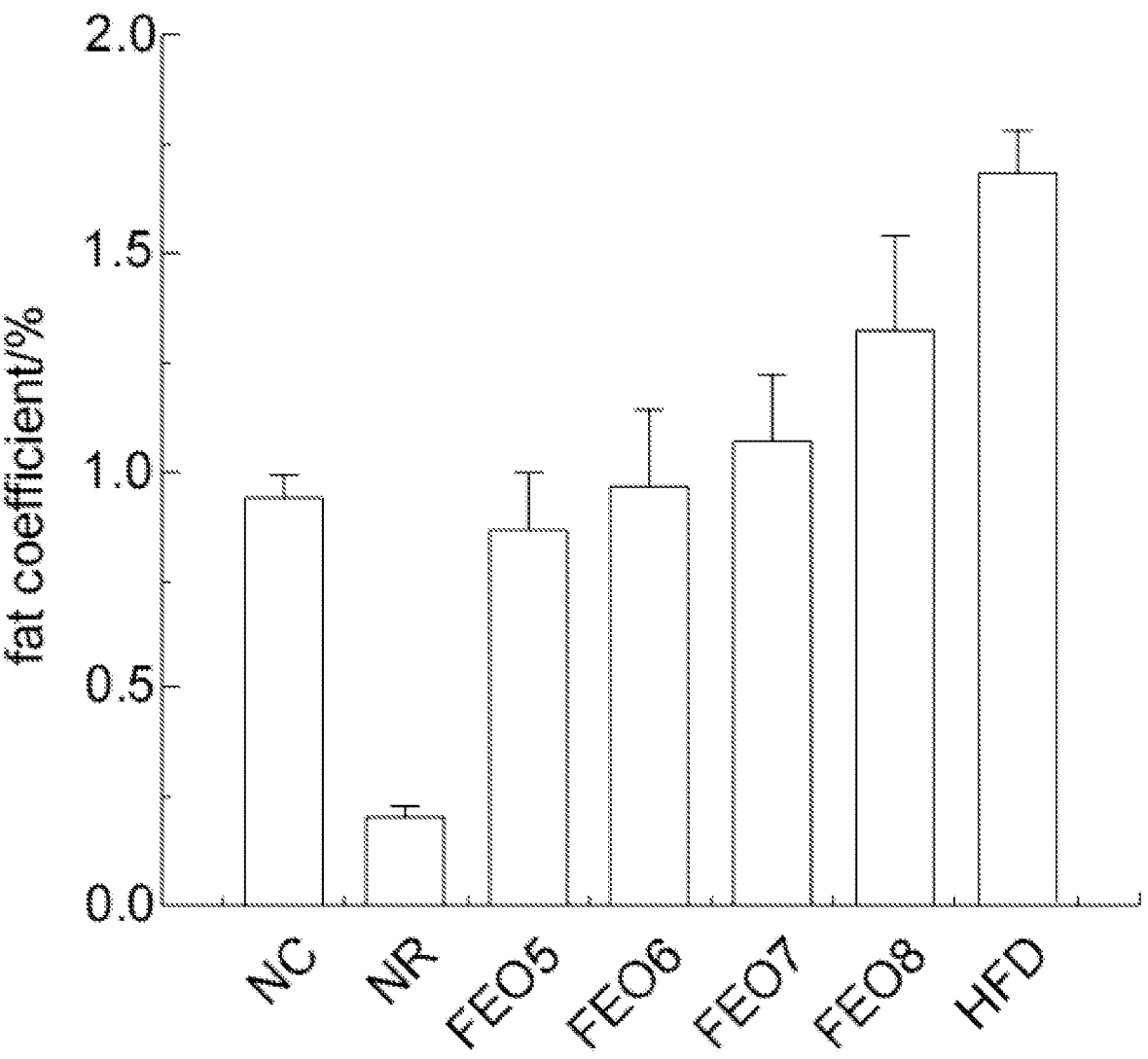
Figure 4C:
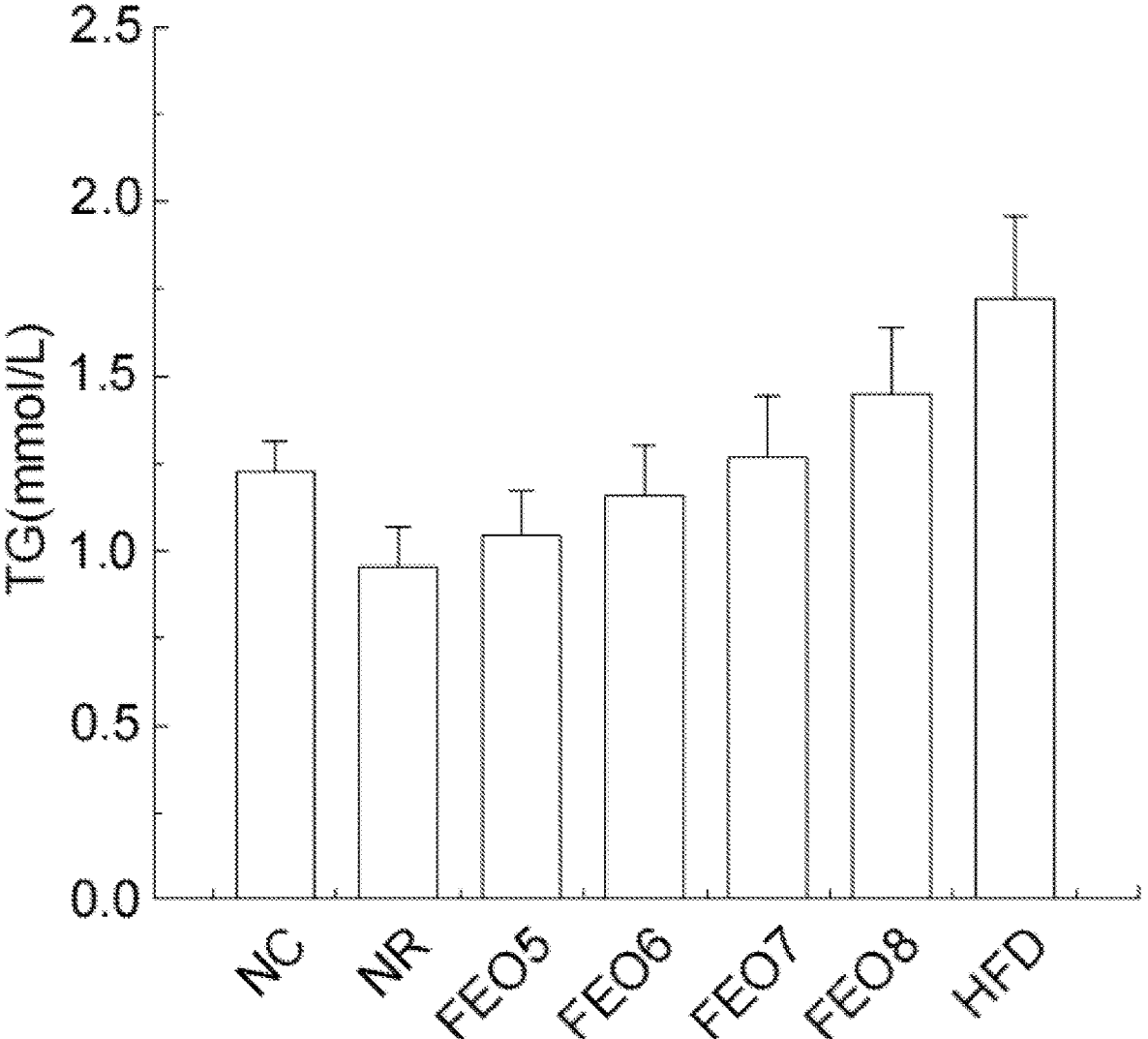
Figure 4D:
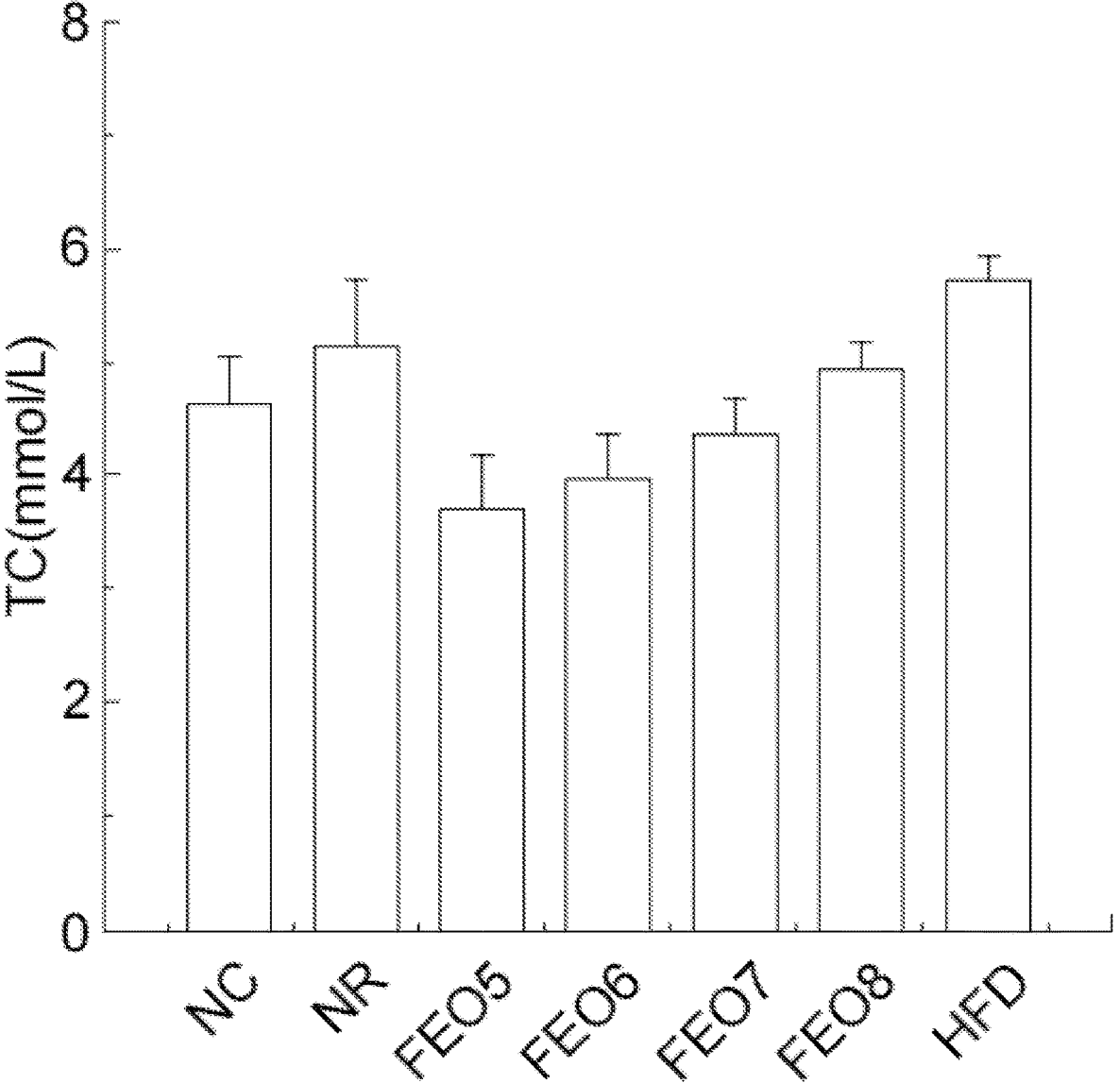

FIGS. 4A-4D shows effects of the mass ratio of linoleic acid to linolenic acid in the FEO of Example 2 on various indexes of obesity model mice, where FIG. 4A is the effect on body weight of mice; FIG. 4B is the effect on body fat coefficient of mice; FIG. 4C is the effect on serum triglyceride (TG) of mice; FIG. 4D is the effect on serum total cholesterol (TC) of mice.

Figure 5A:
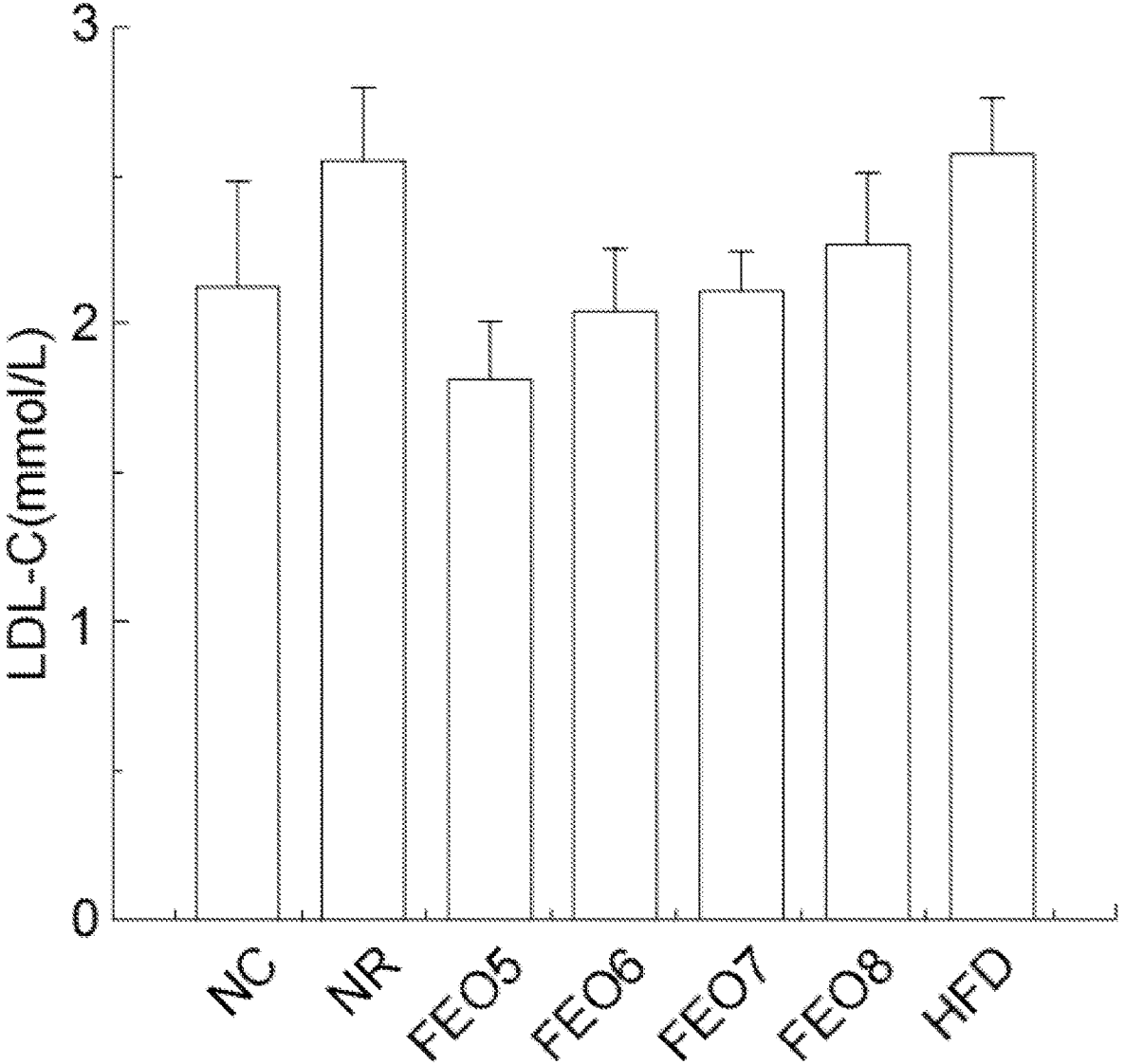
Figure 5B:
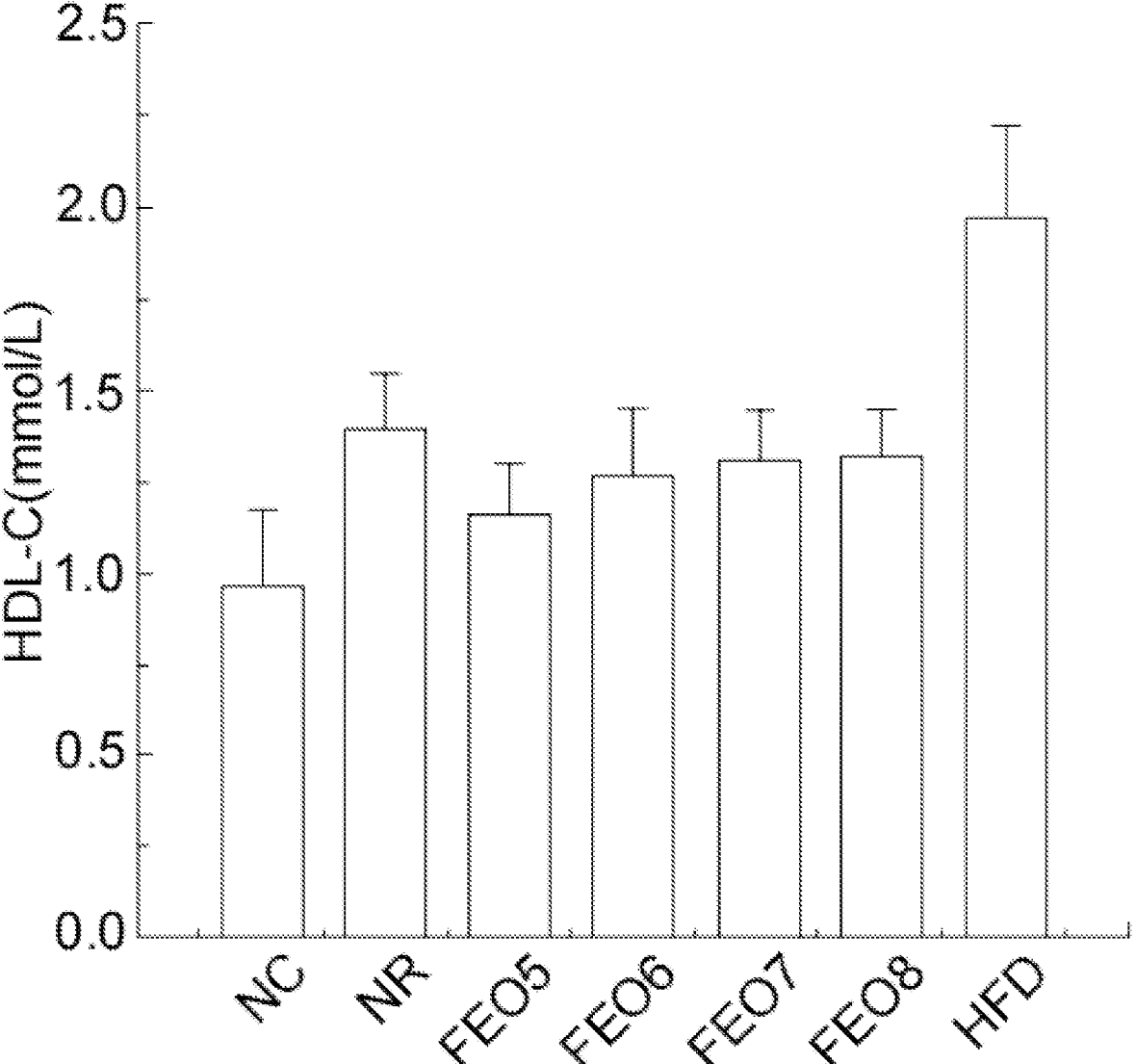
Figure 5C:
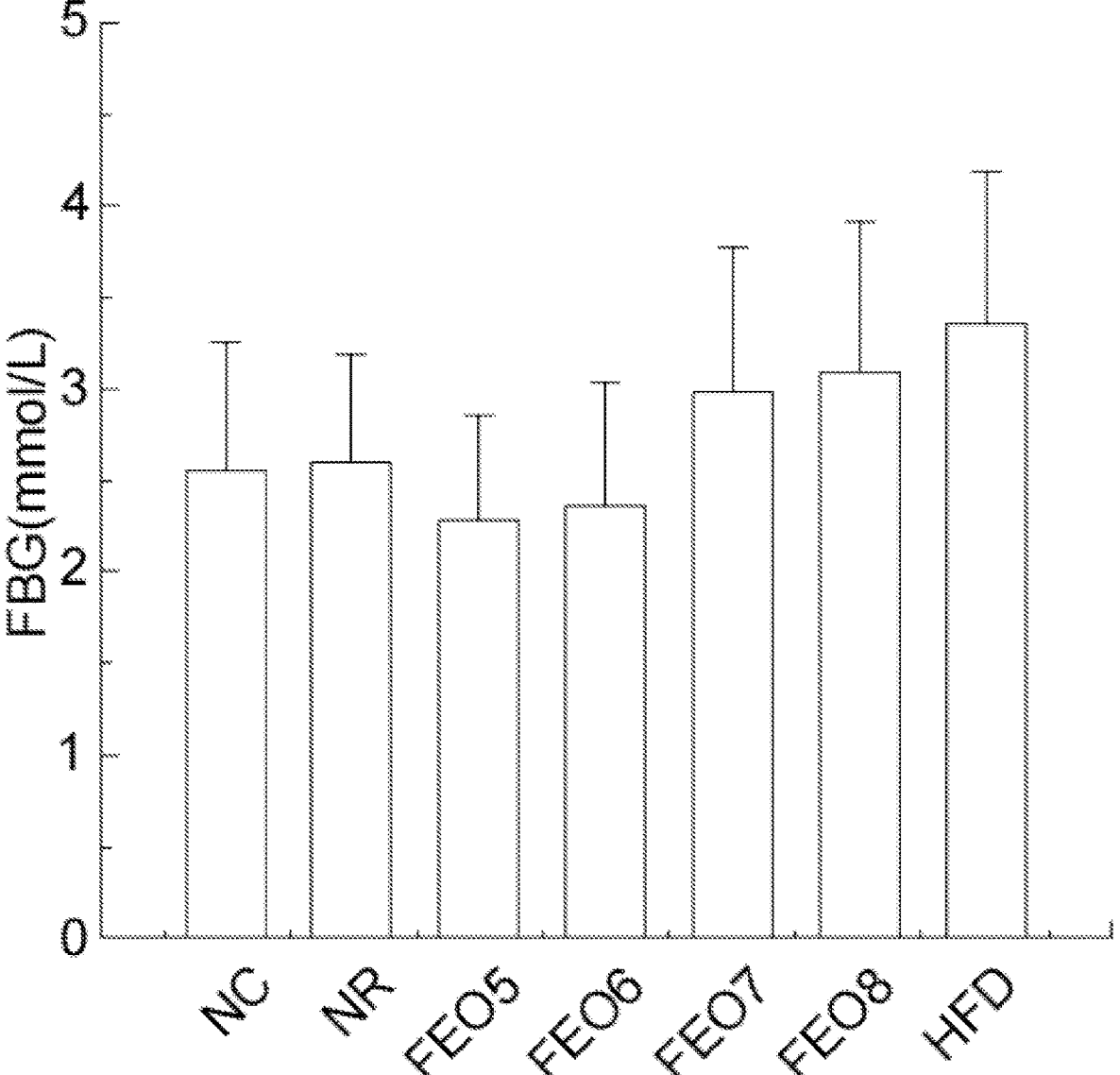
Figure 5D:
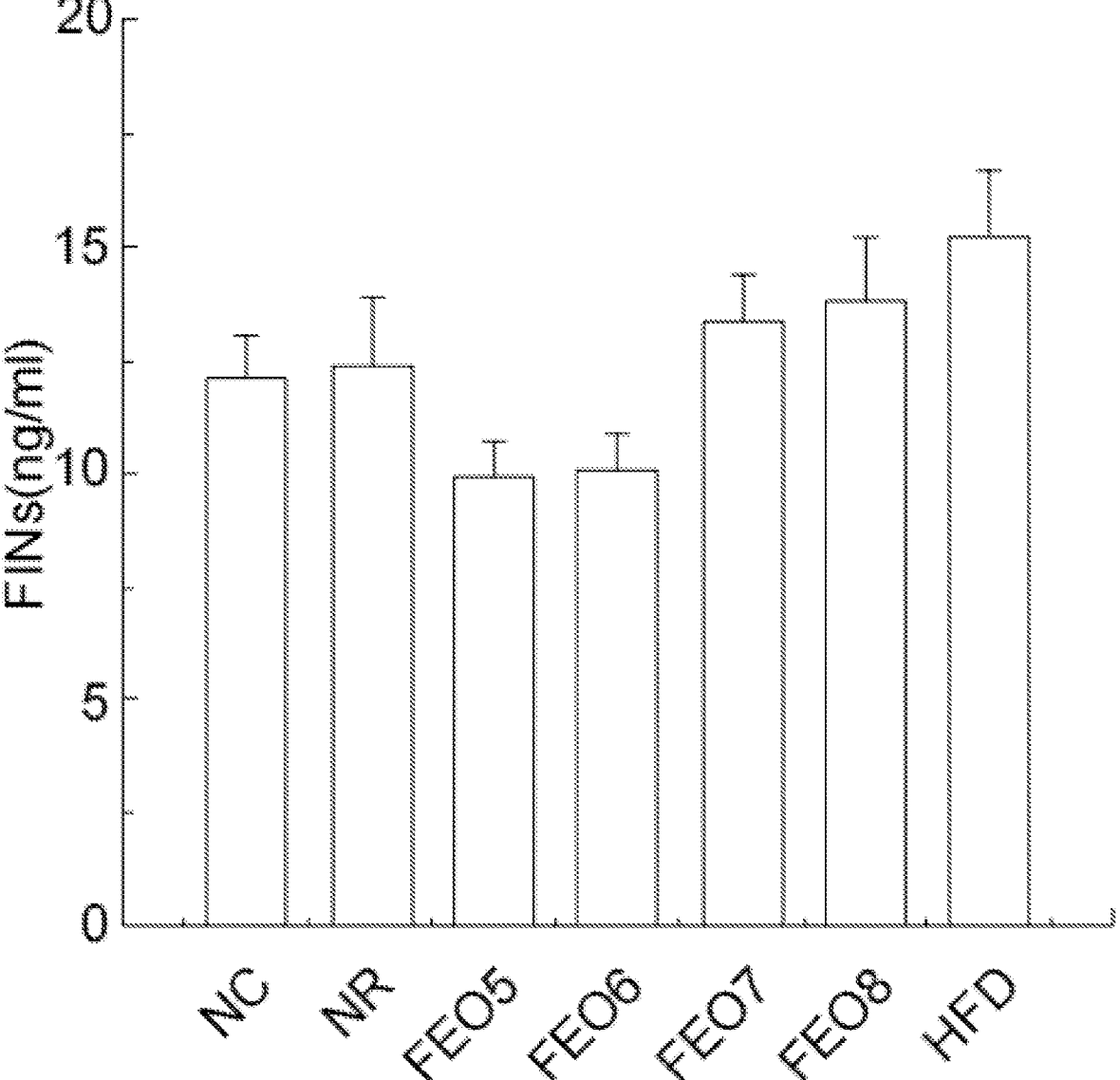

FIGS. 5A-5D shows effects of mass ratio of linoleic acid to linolenic acid in the FEO of Example 2 on various indexes in obese model mice, where FIG. 5A is the effect on serum LDL-C in mice; FIG. 5B is the effect on serum HDL-C in mice; FIG. 5C is the effect on serum FBG in mice; and FIG. 5D is the effect on fasting serum insulin (FINs) in mice.

Figure 6A:
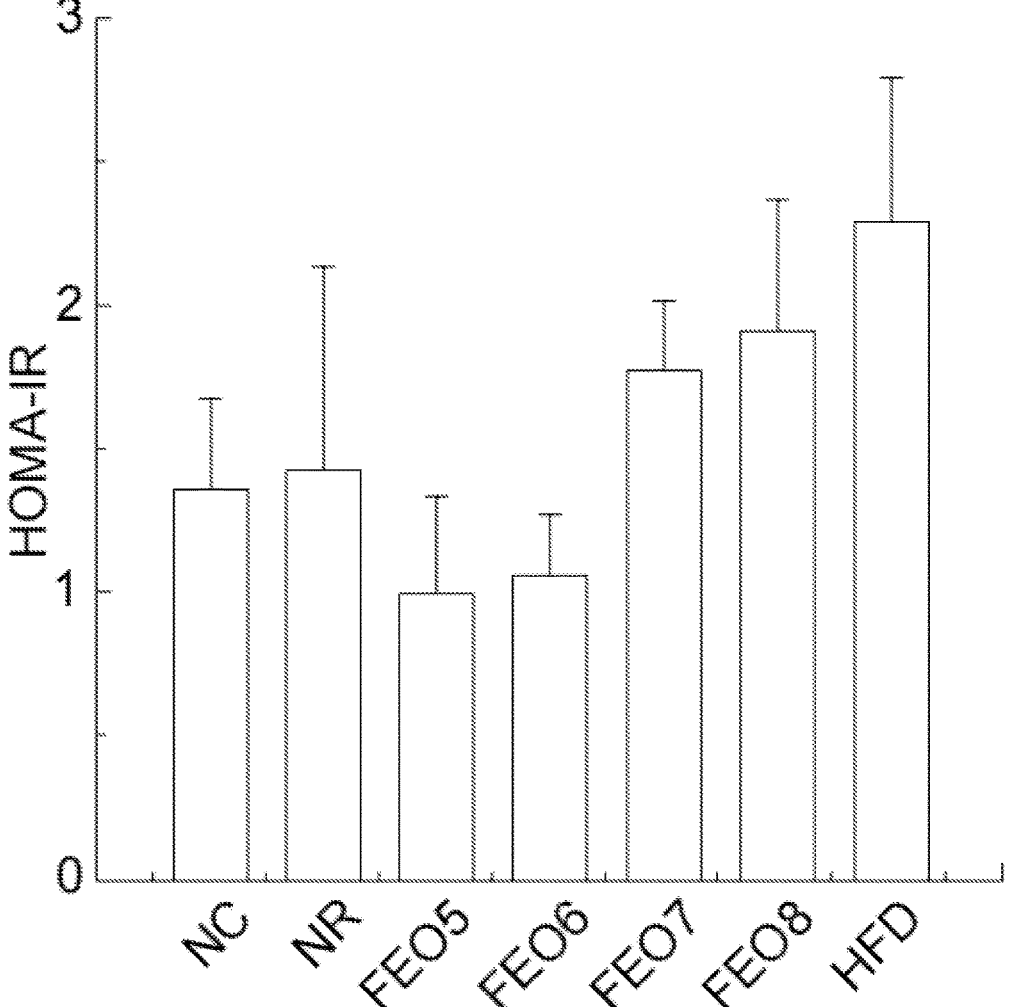
Figure 6B:
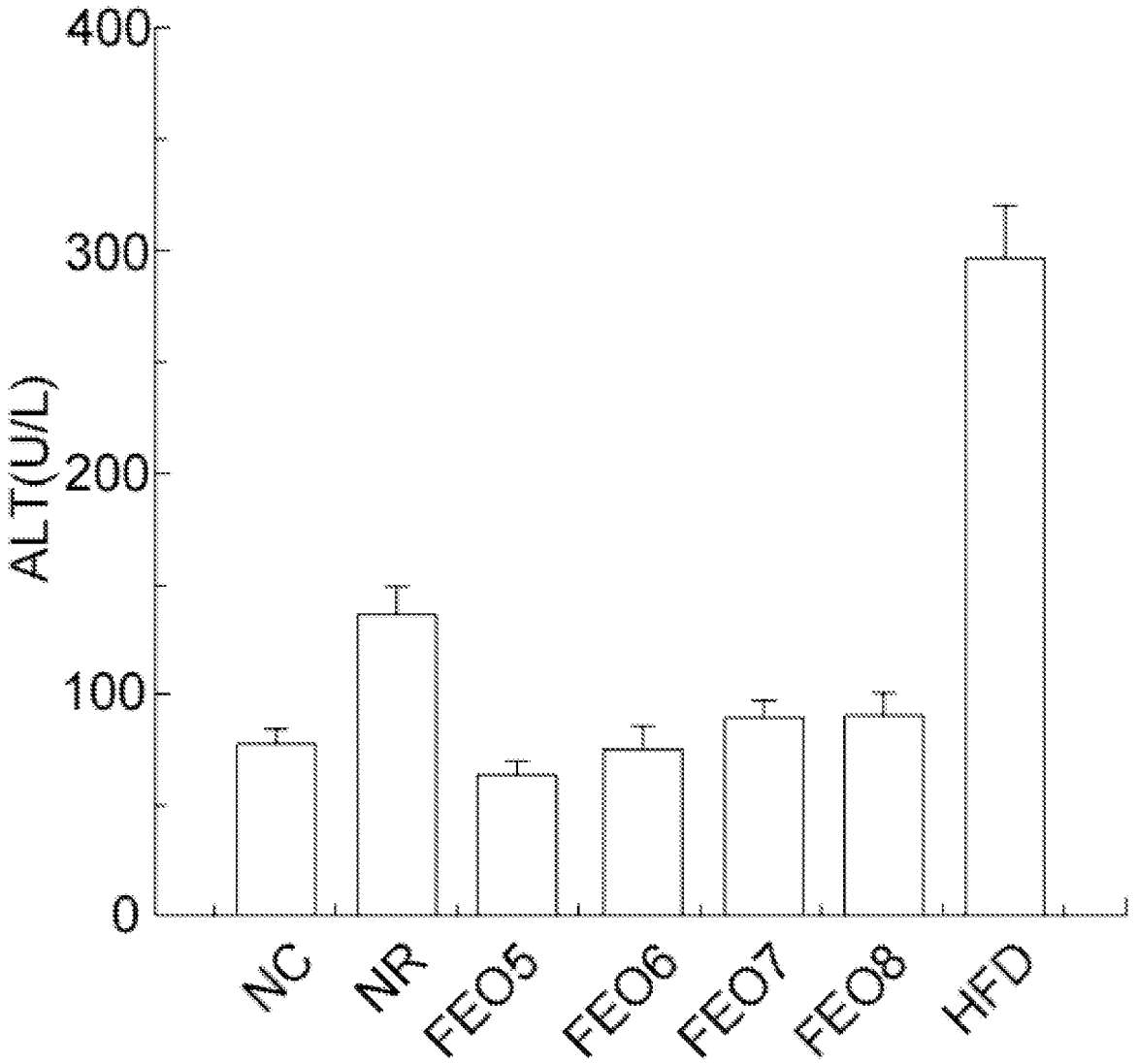
Figure 6C:
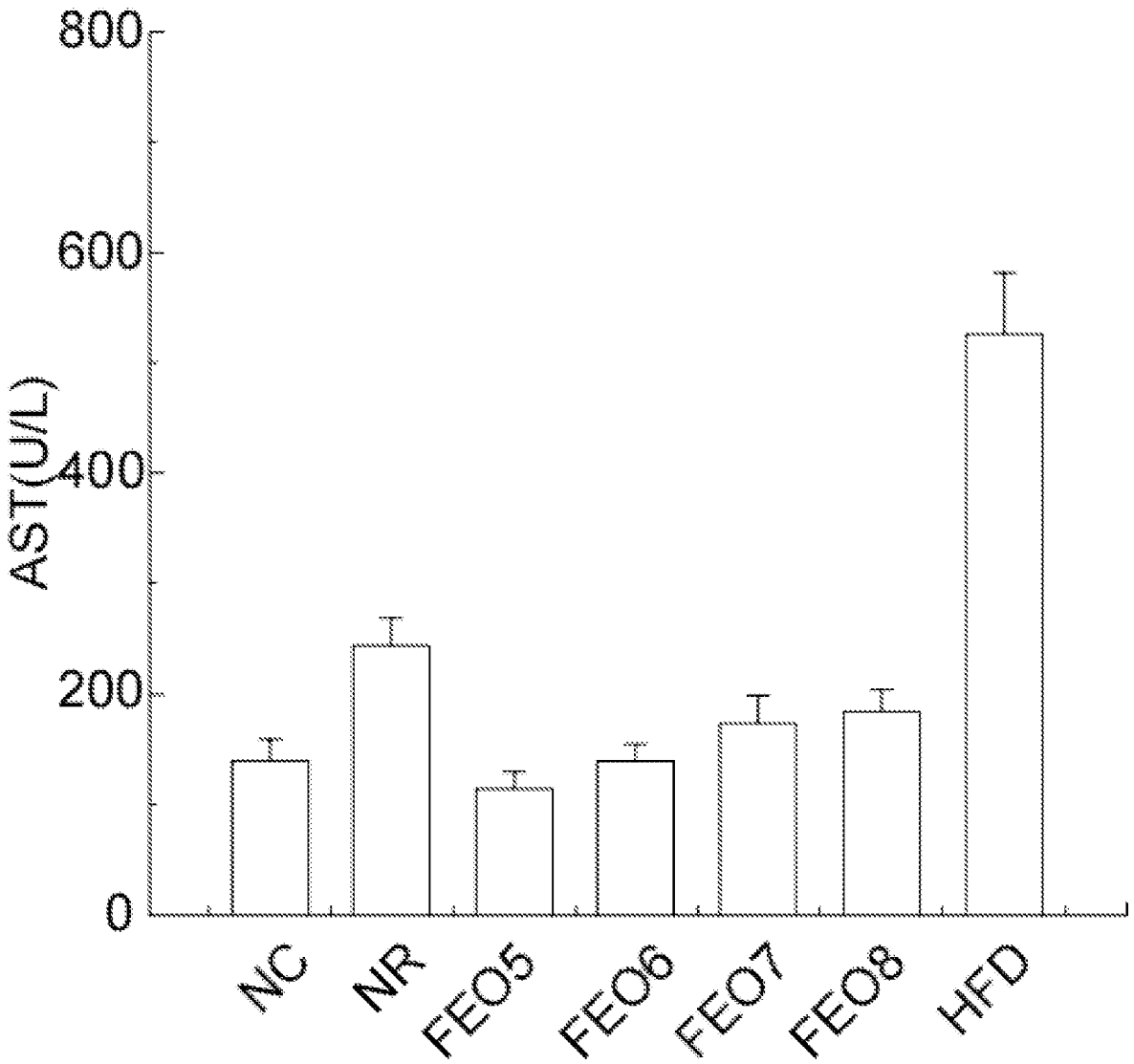

FIGS. 6A-6C shows effects of mass ratio of linoleic acid to linolenic acid in the FEO of Example 2 on various indicators in obese model mice, where FIG. 6A is the effect on HOMA-IR in mice; FIG. 6B is the effect on serum ALT in mice; FIG. 6C is the effect on serum AST in mice.

In FIGS. 4A-6C, L/Ln: mass ratio of linoleic acid to linolenic acid, H-FEO: high-fat functional edible oil diet, NC: normal chow (AIN-93M) group, NR: natural recovering group, HFD: high-fat diet (D12451) group, FEO5: H-FEO group with an L/Ln of 0.5, FEO6: H-FEO group with an L/Ln of 1.0, FEO7: H-FEO group with an L/Ln of 2.0, FEO8: H-FEO group with an L/Ln of 4.0.

Figure 7A:
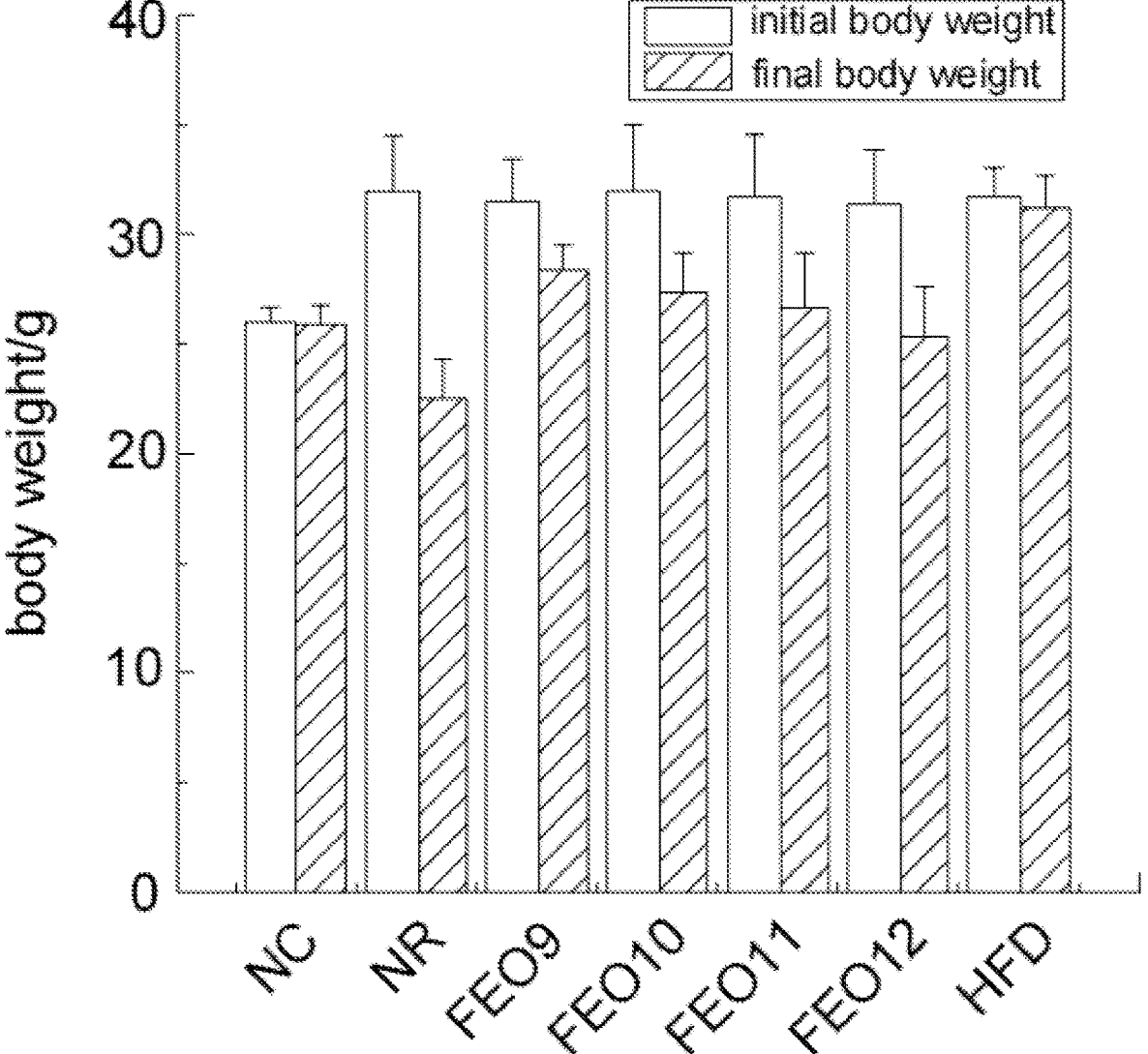
Figure 7B:
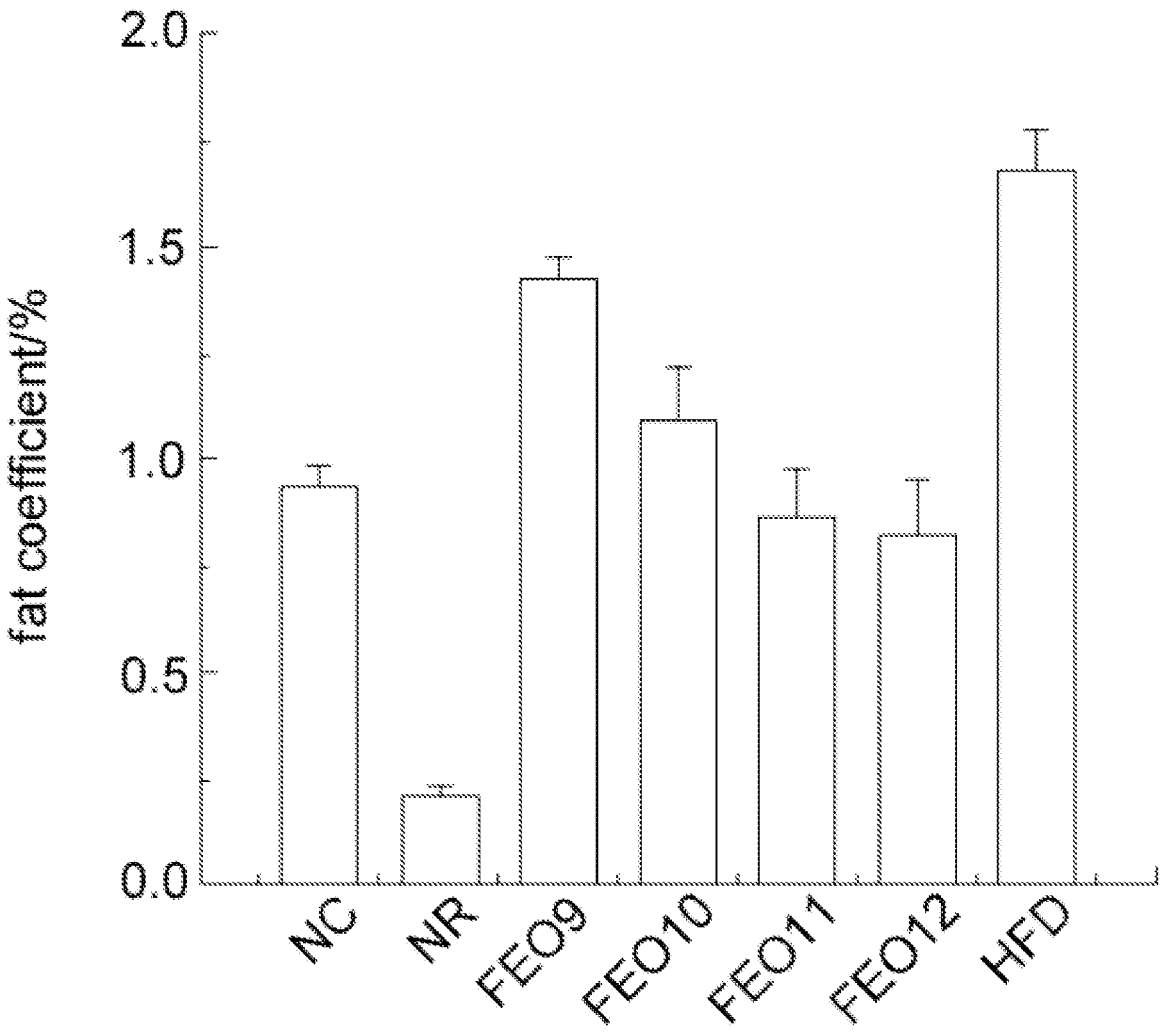
Figure 7C:
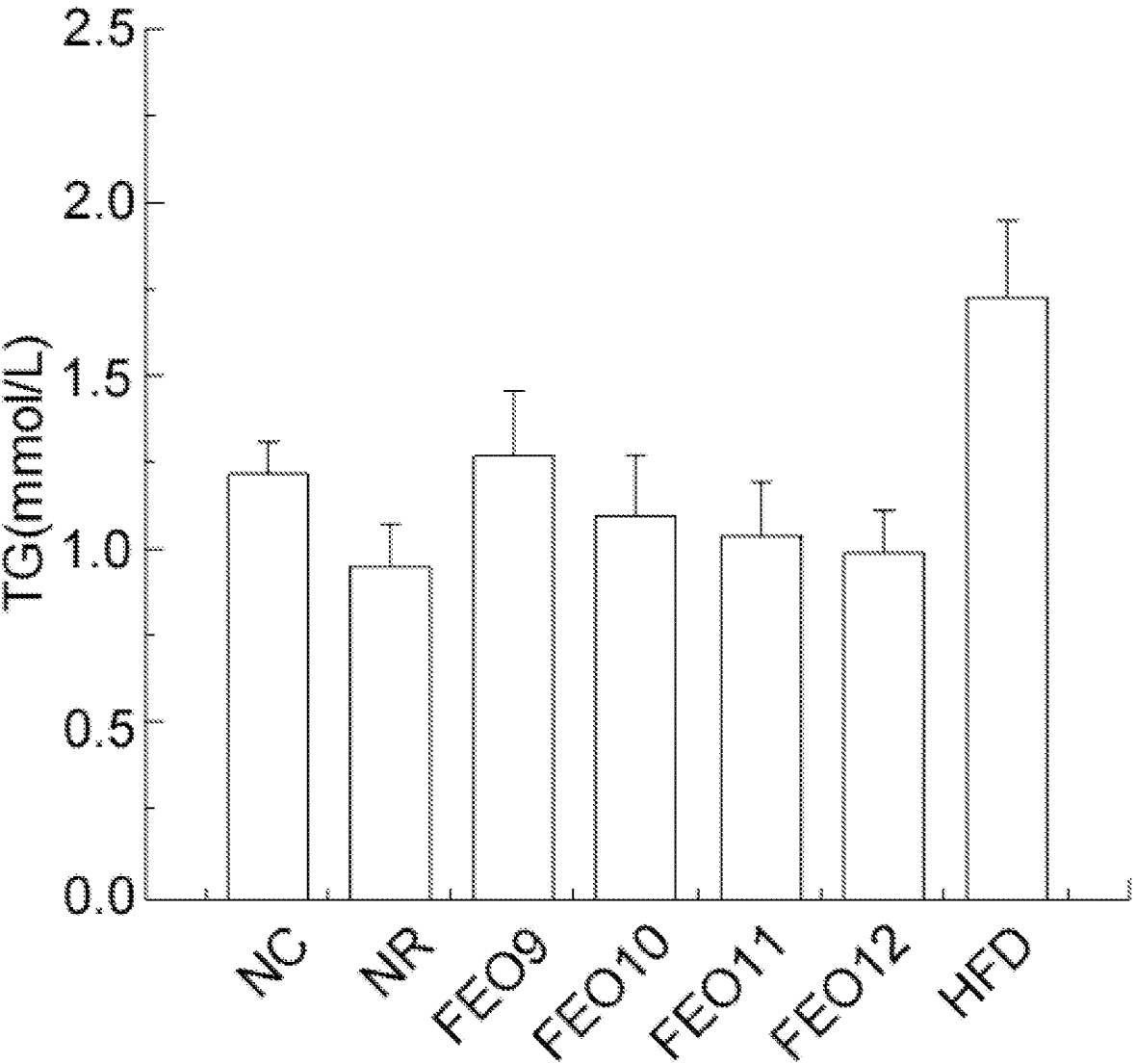
Figure 7D:
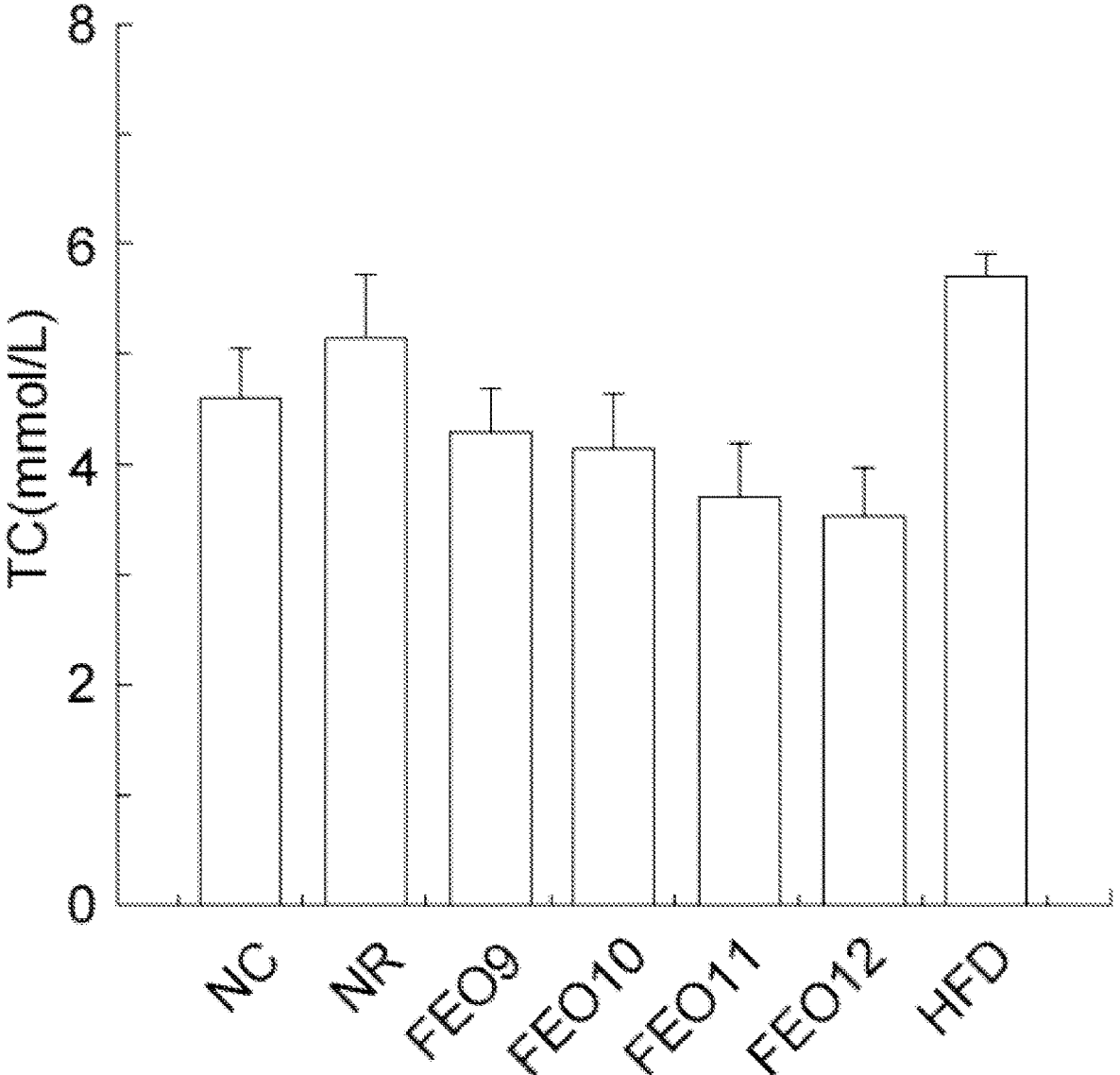

FIGS. 7A-7D shows effects of FEO addition in the feed on various indexes of obesity model mice in Example 3, where FIG. 7A is the effect on body weight of mice; FIG. B is the effect on fat coefficient of mice; FIG. C is the effect on serum TG of mice; and FIG. 7D is the effect on serum TC of mice.

Figure 8A:
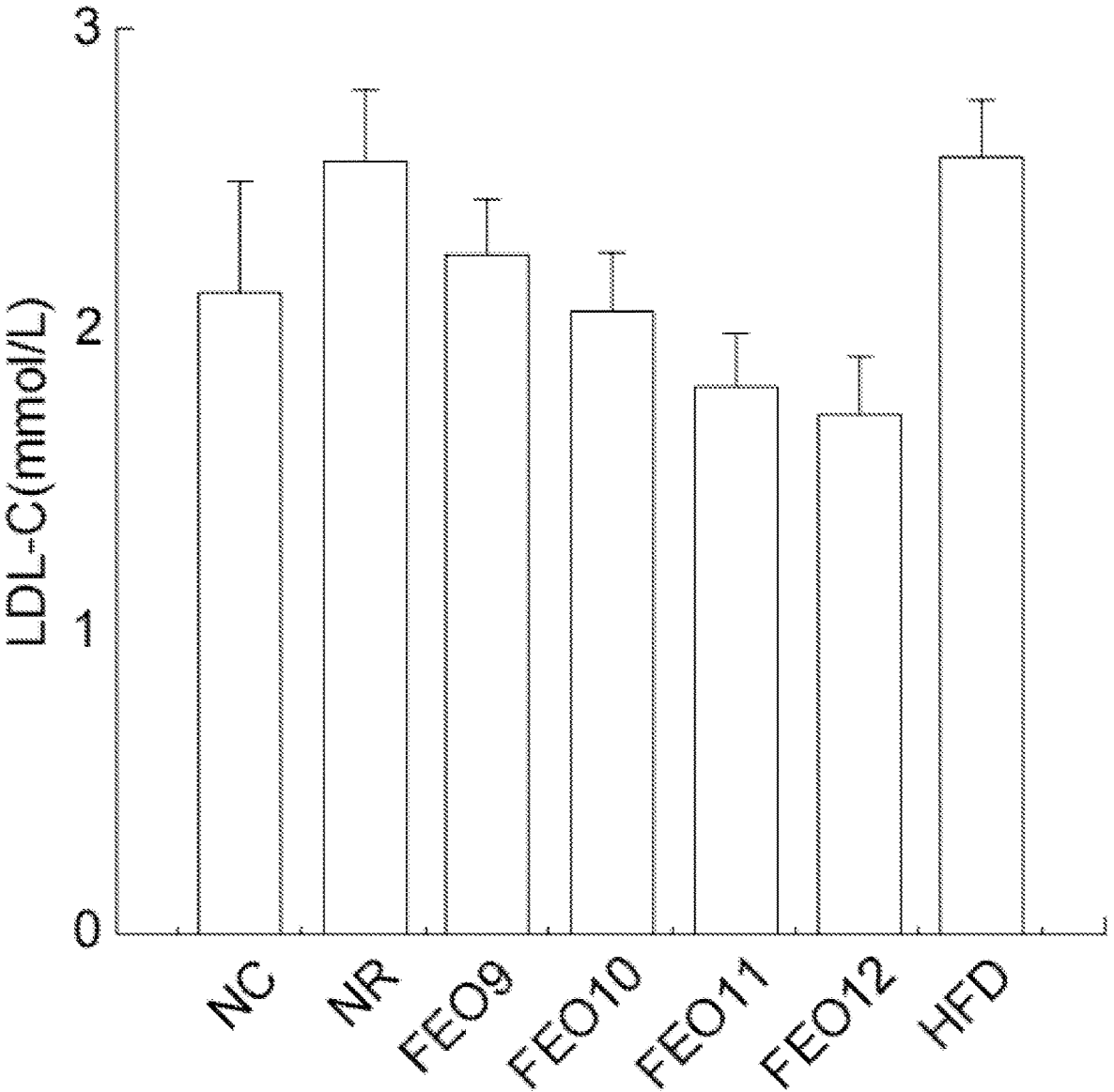
Figure 8B:
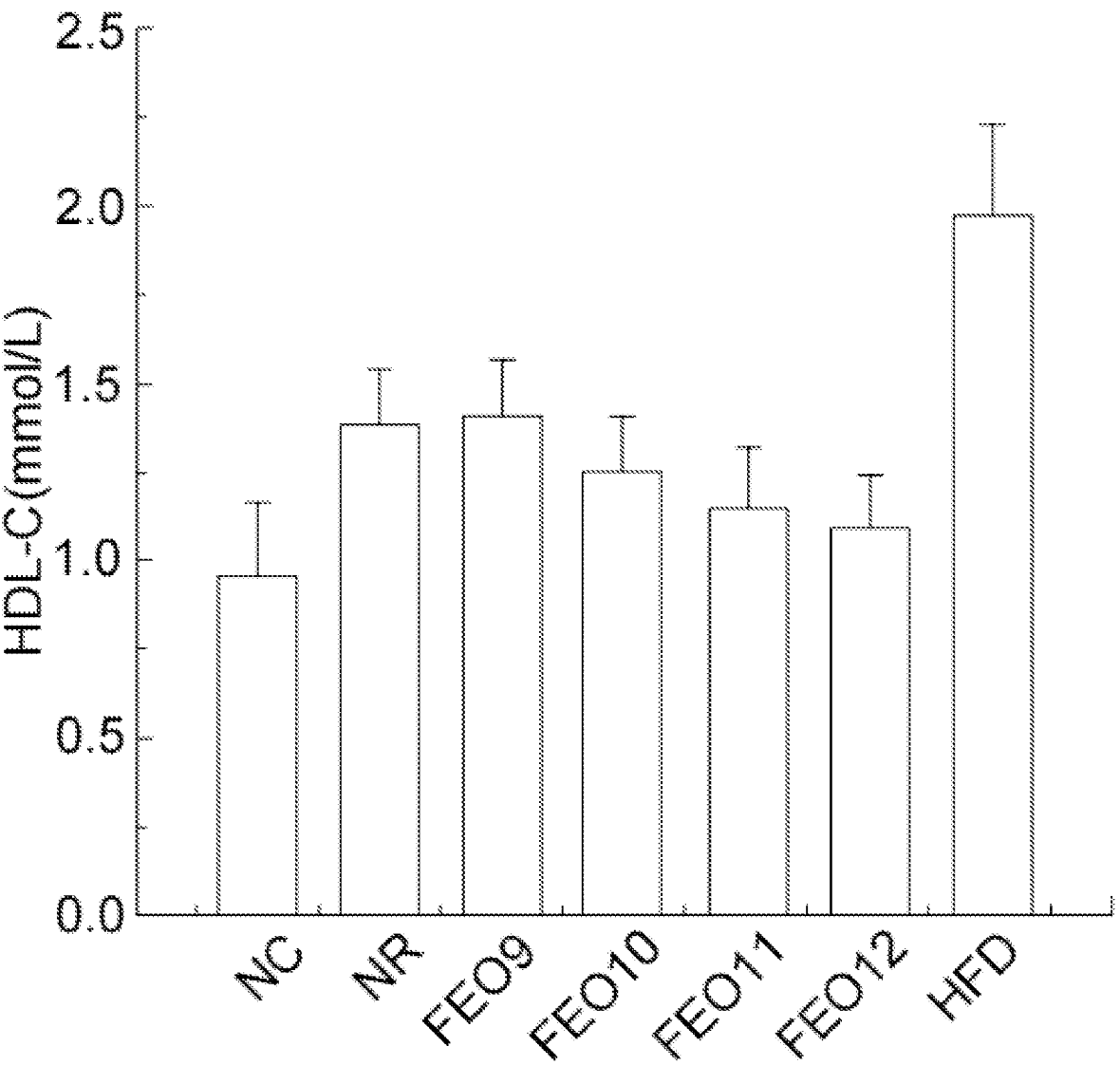
Figure 8C:
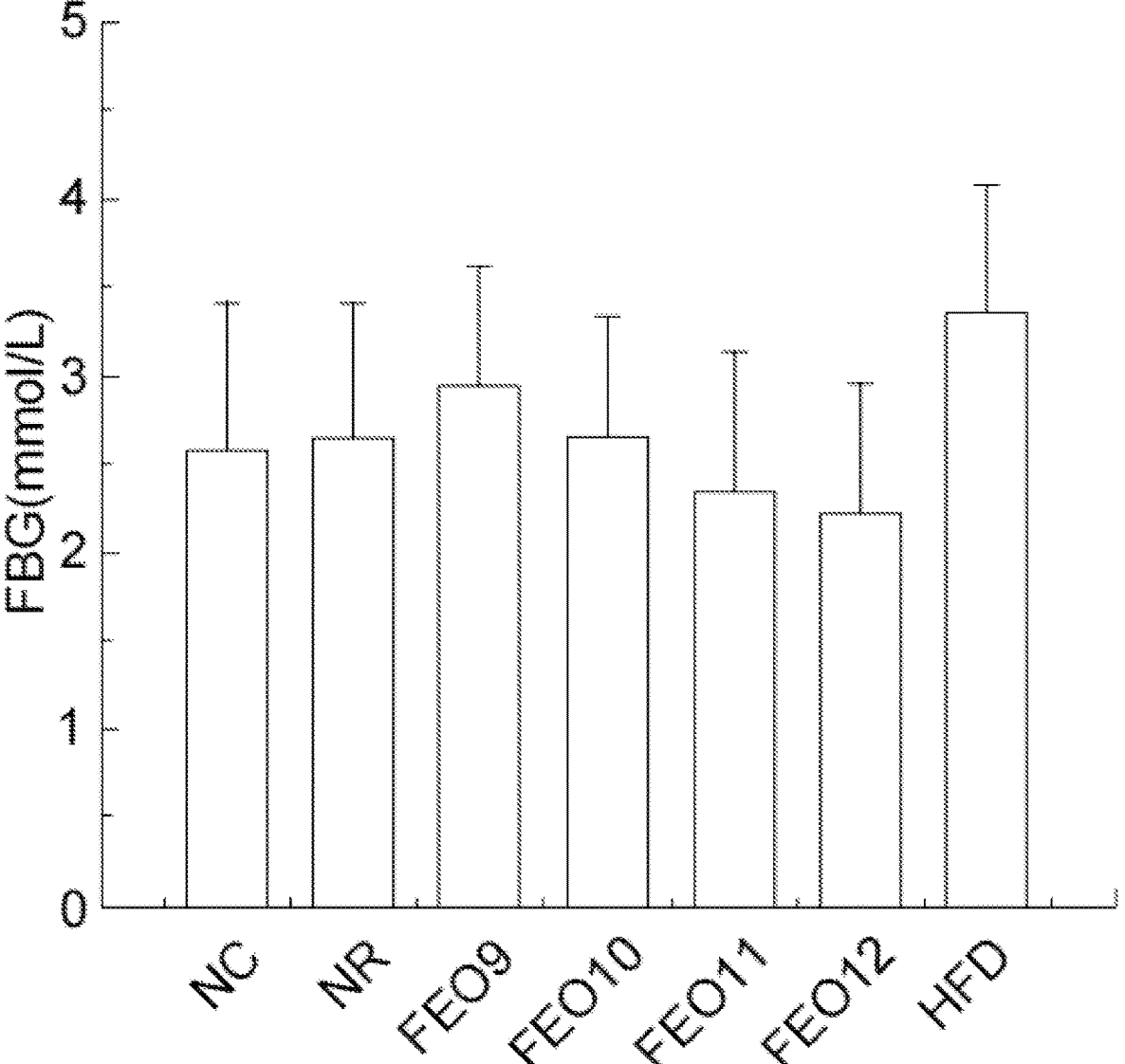
Figure 8D:
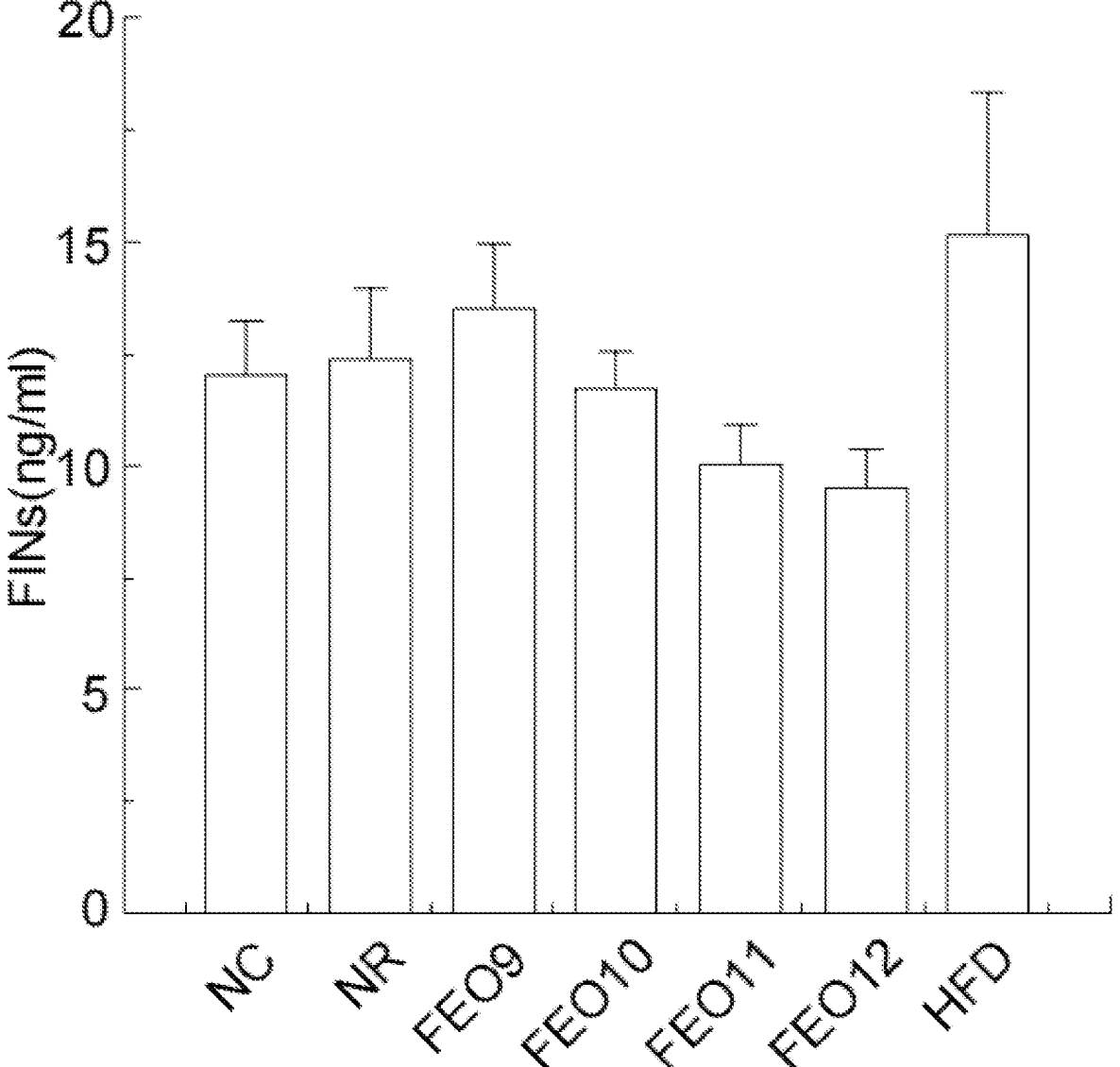

FIGS. 8A-8D shows effects of FEO addition to the feed on various indexes of obesity model mice in Example 3, where FIG. 8A is the effect on serum low-density lipoprotein (LDL-C) in mice; FIG. 8B is the effect on serum HDL-C in mice; FIG. 8C is the effect on serum FBG in mice; and FIG. 8D is the effect on FINs in mice.

Figure 9A:
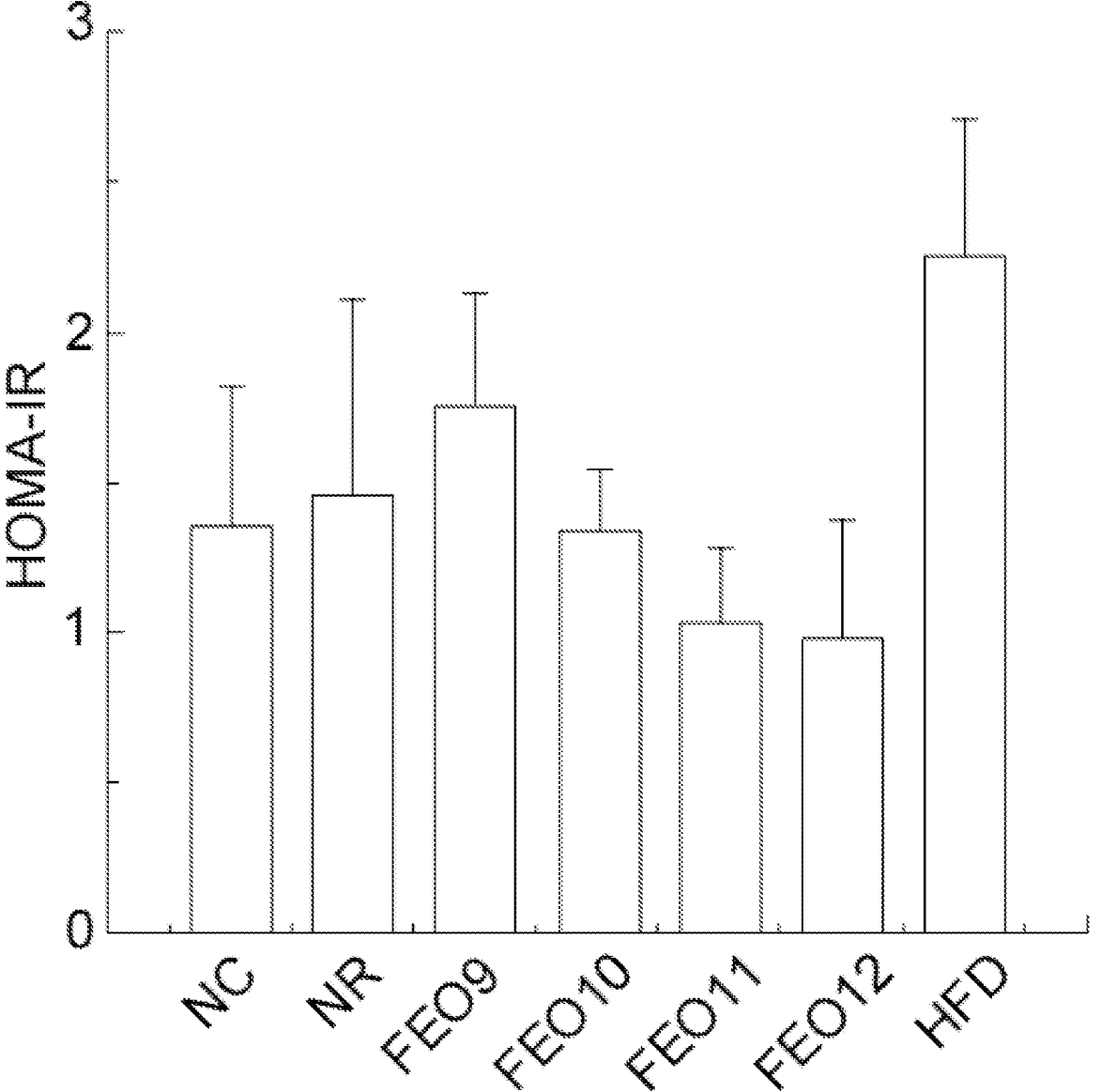
Figure 9B:
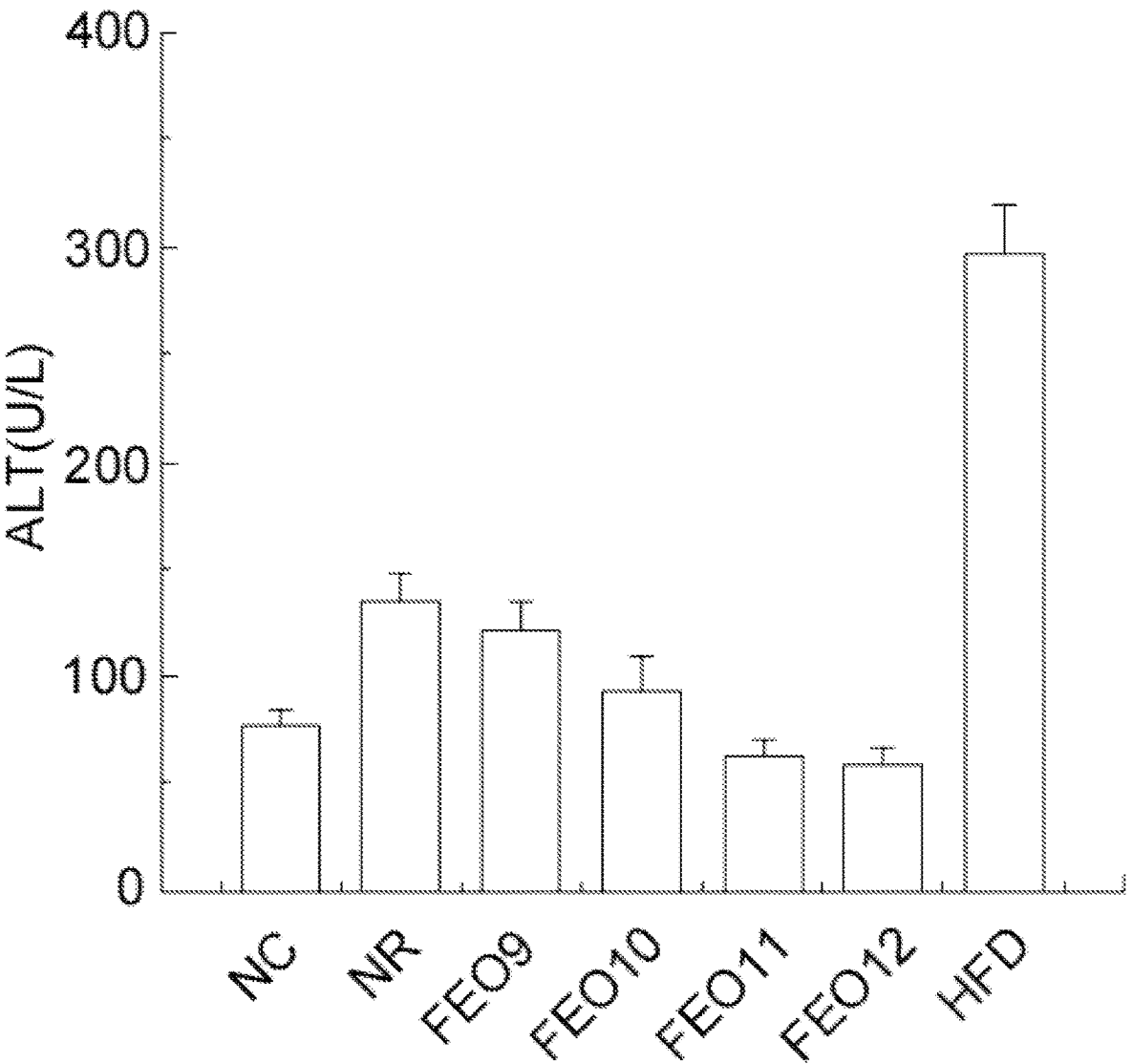
Figure 9C:
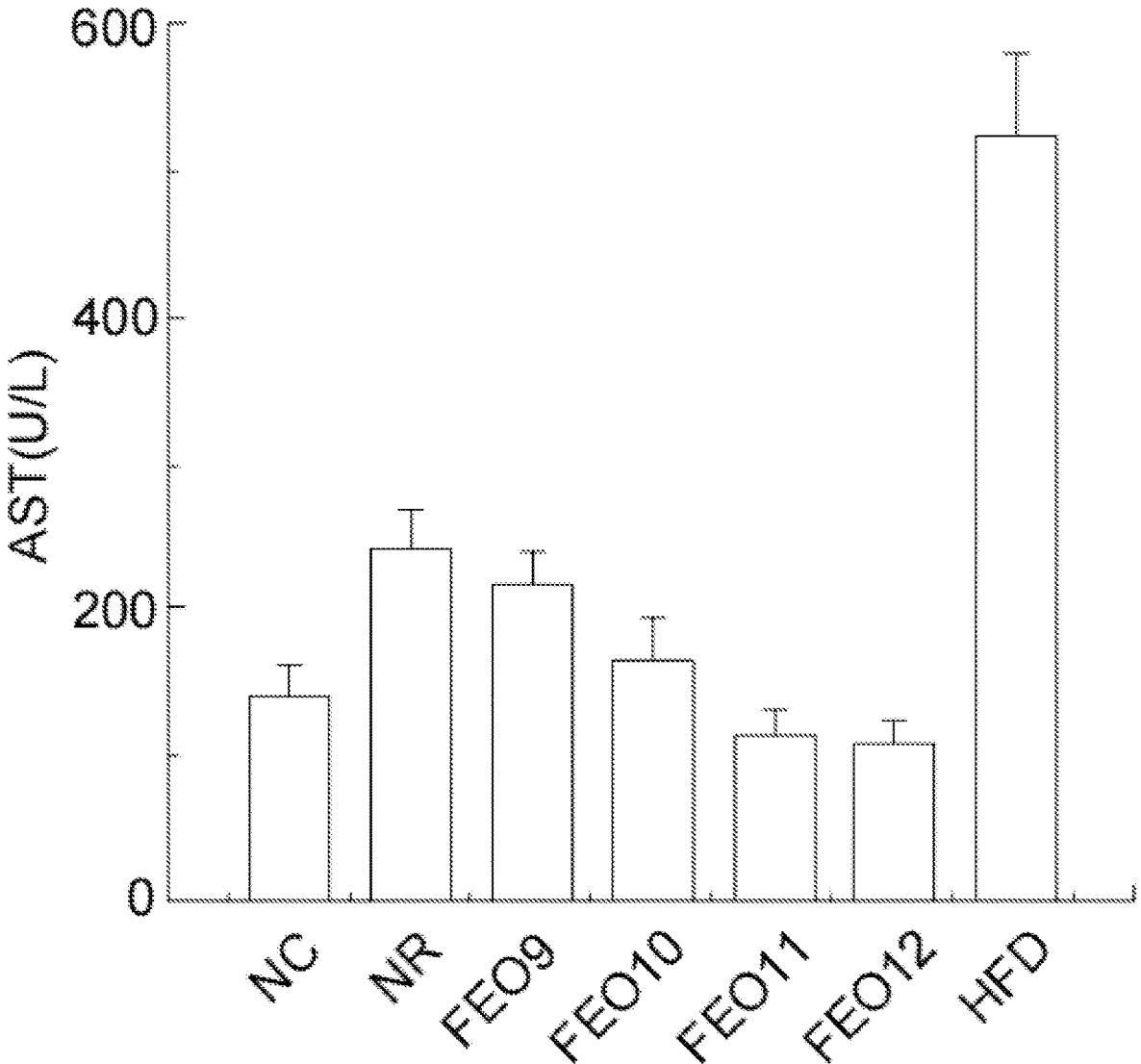

FIGS. 9A-9C shows effects of FEO addition in the feed on various indexes of obesity model mice in Example 3, where FIG. 9A is the effect on serum HOMA-IR of mice; FIG. 9B is the effect on serum ALT of mice; FIG. 9C is the effect on serum AST of mice.

In FIGS. 7A-9C, L/Ln: mass ratio of linoleic acid to linolenic acid, MCFA/LCFA: mass ratio of MCFAs to LCFAs, NC: normal chow (AIN-93M) group, NR: natural recovering group, HFD: high fat diet (D12451) group, FEO9: medium fat functional edible oil diet (M-FEO) with an MCFA/LCFA of 3.0 and an L/Ln of 0.5, FEO10: medium to high fat functional edible oil diet (MH-FEO) with an MCFA/LCFA of 3.0 and an L/Ln of 0.5, FEO11: high fat functional edible oil diet (H-FEO) with an MCFA/LCFA of 3.0 and an L/Ln of 0.5, FEO12: extremely-high-fat functional edible oil diet (EH-FEO) with an MCFA/LCFA of 3.0 and an L/Ln of 0.5.

Figure 10A:
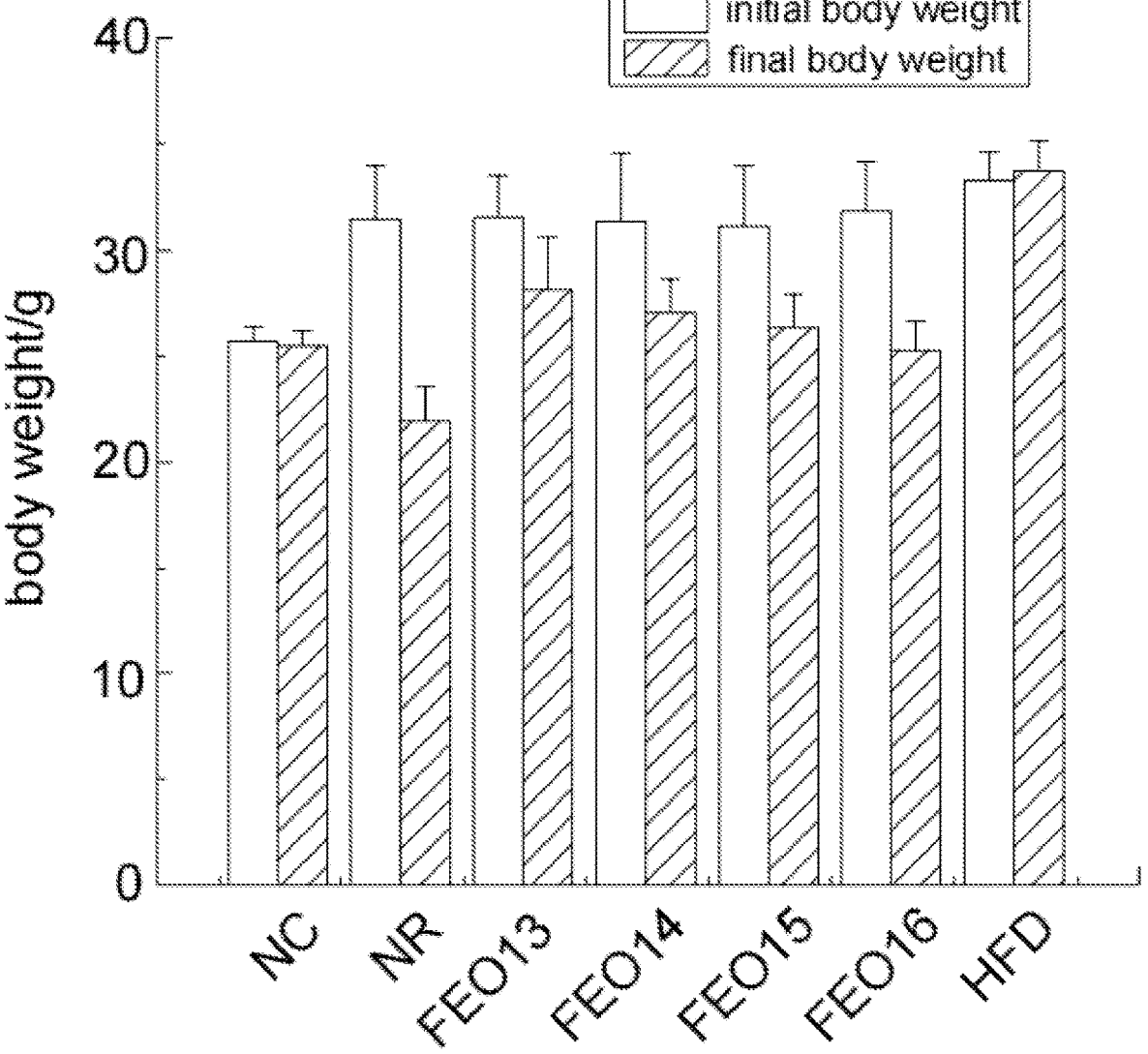
Figure 10B:
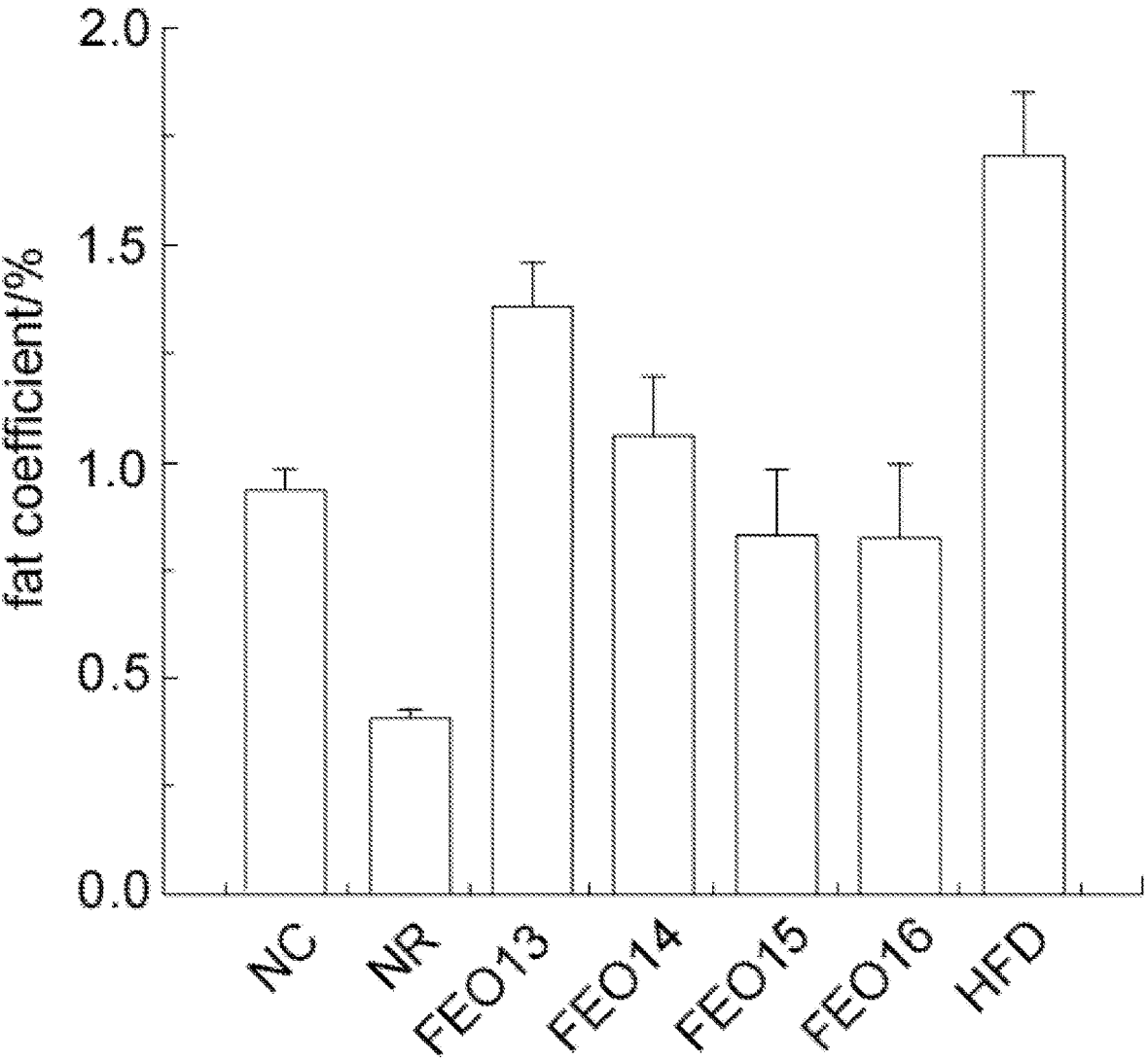
Figure 10C:
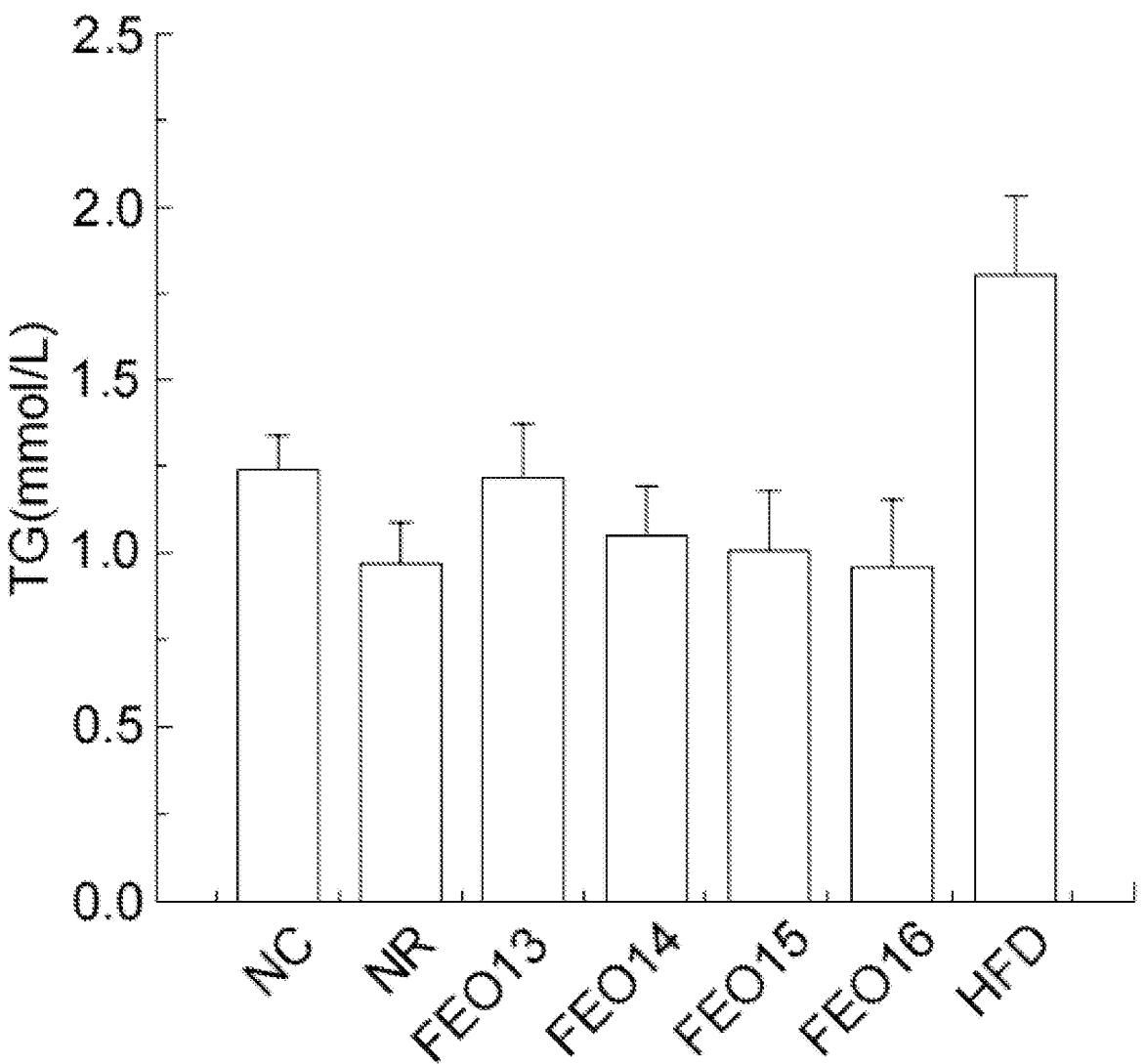
Figure 10D:
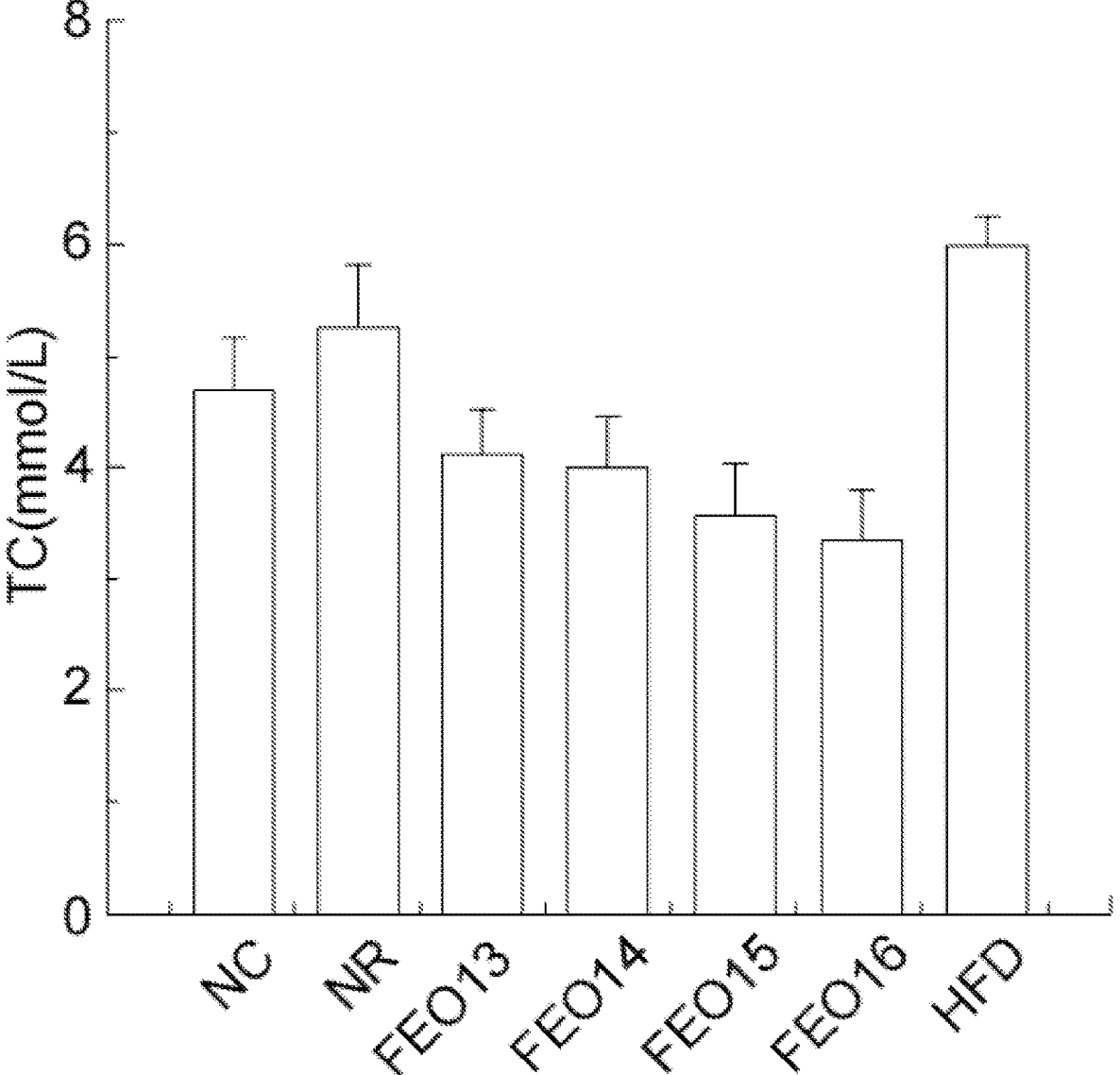

FIGS. 10A-10D shows effects of FEO addition in the feed on various indexes of obesity model mice in Example 4, where FIG. 10A is the effect on body weight of mice; FIG. 10B is the effect on fat coefficient of mice; FIG. 10C is the effect on serum TG of mice; and FIG. 10D is the effect on serum TC of mice.

Figure 11A:
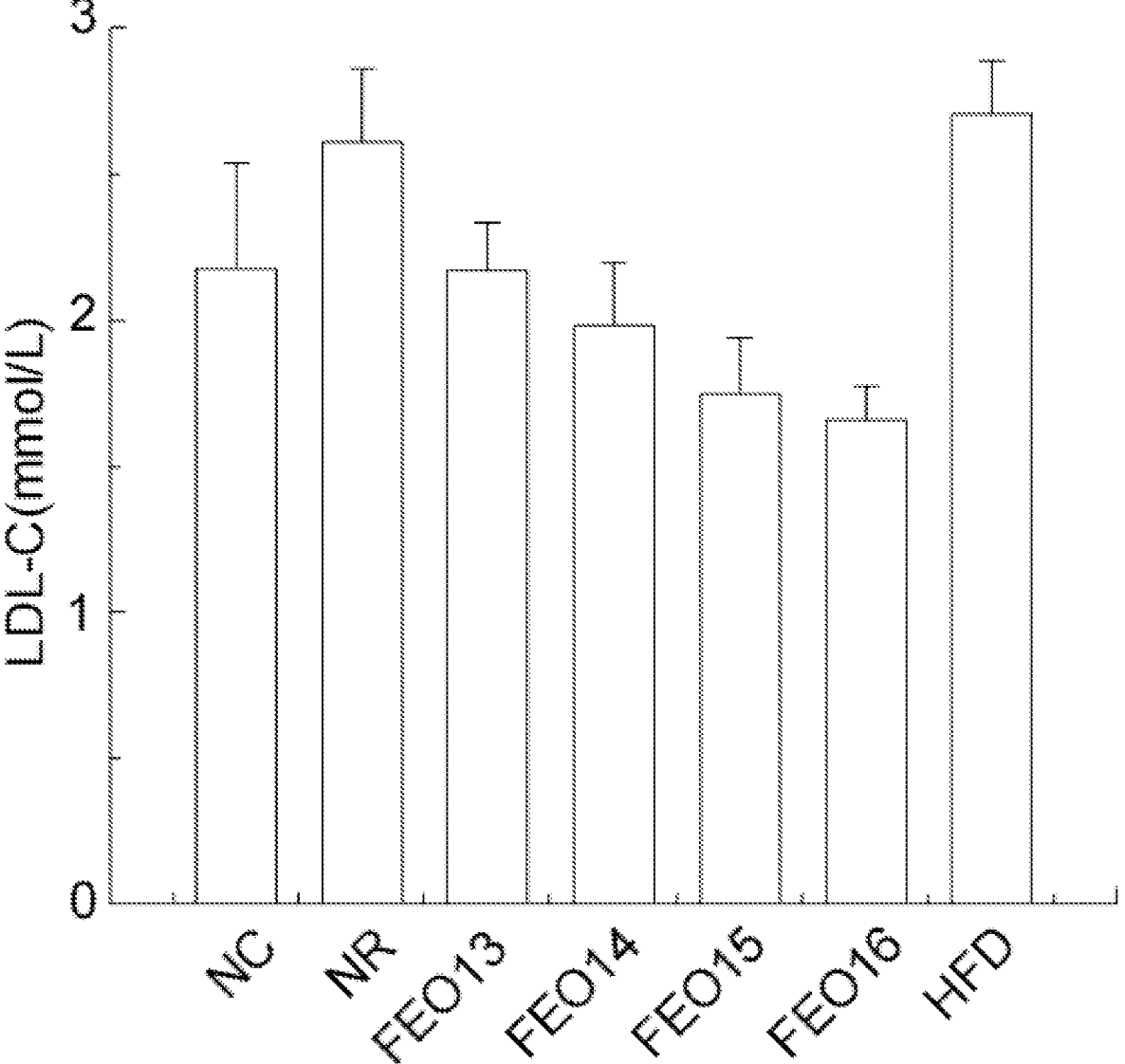
Figure 11B:
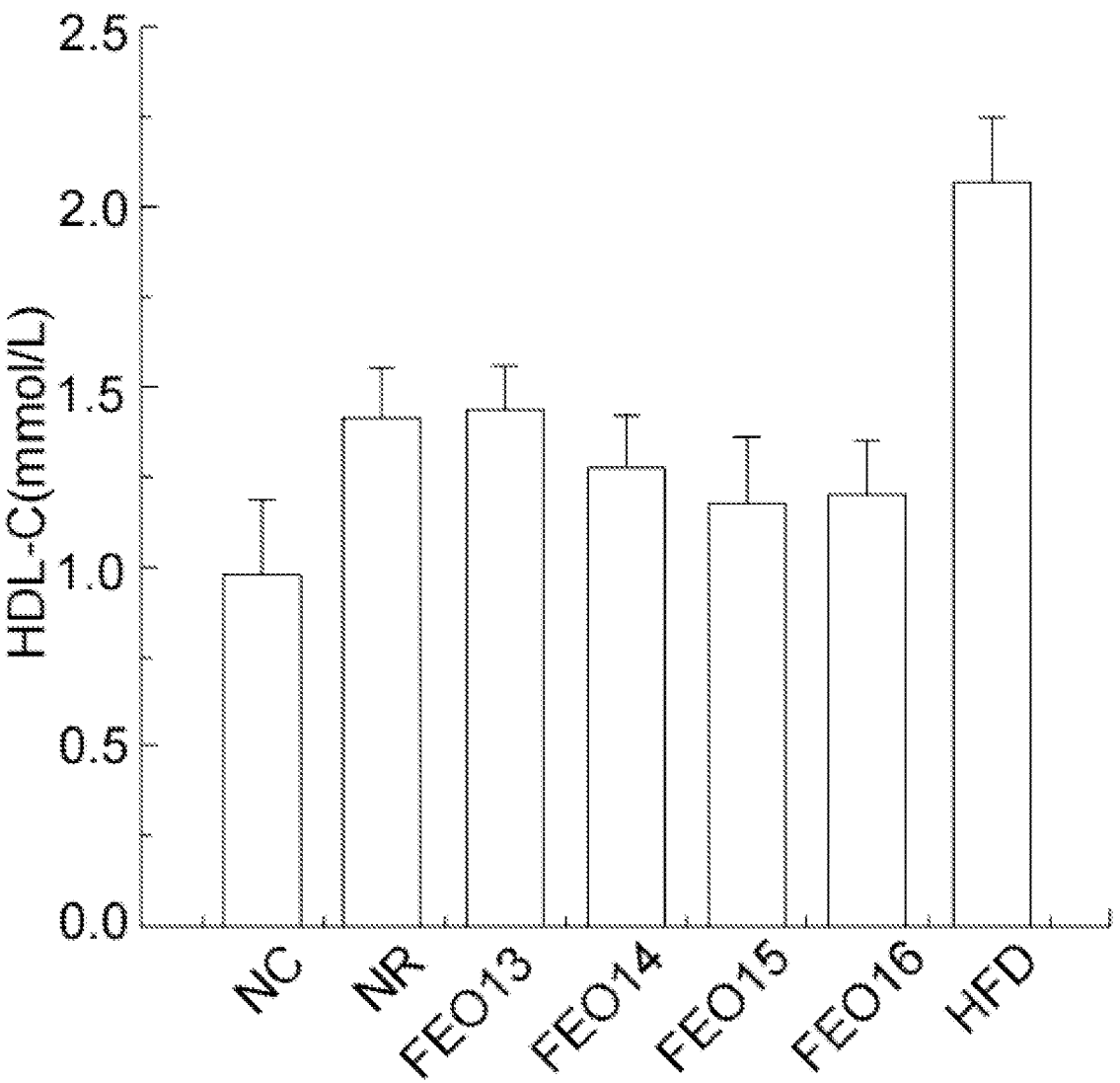
Figure 11C:
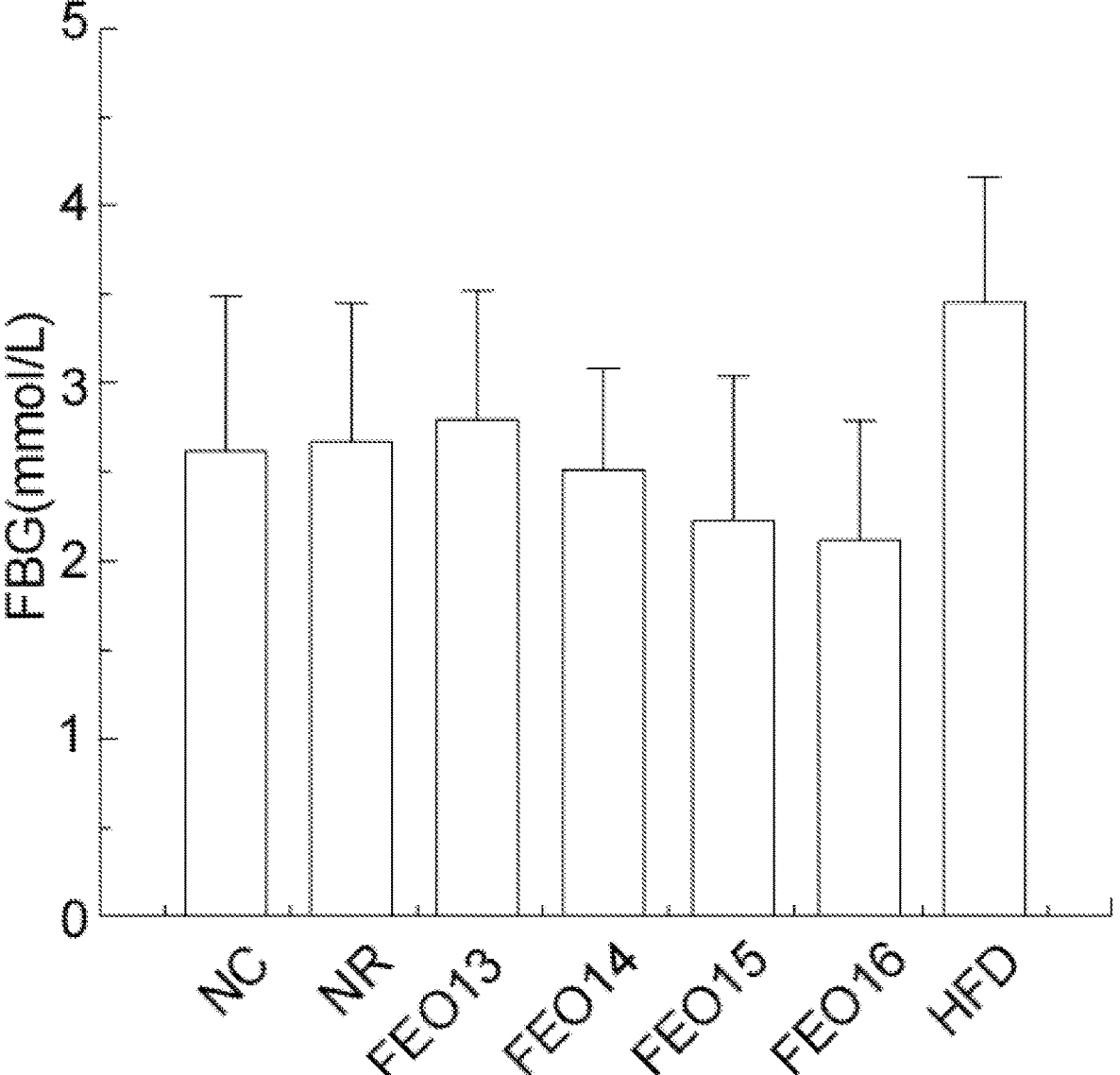
Figure 11D:
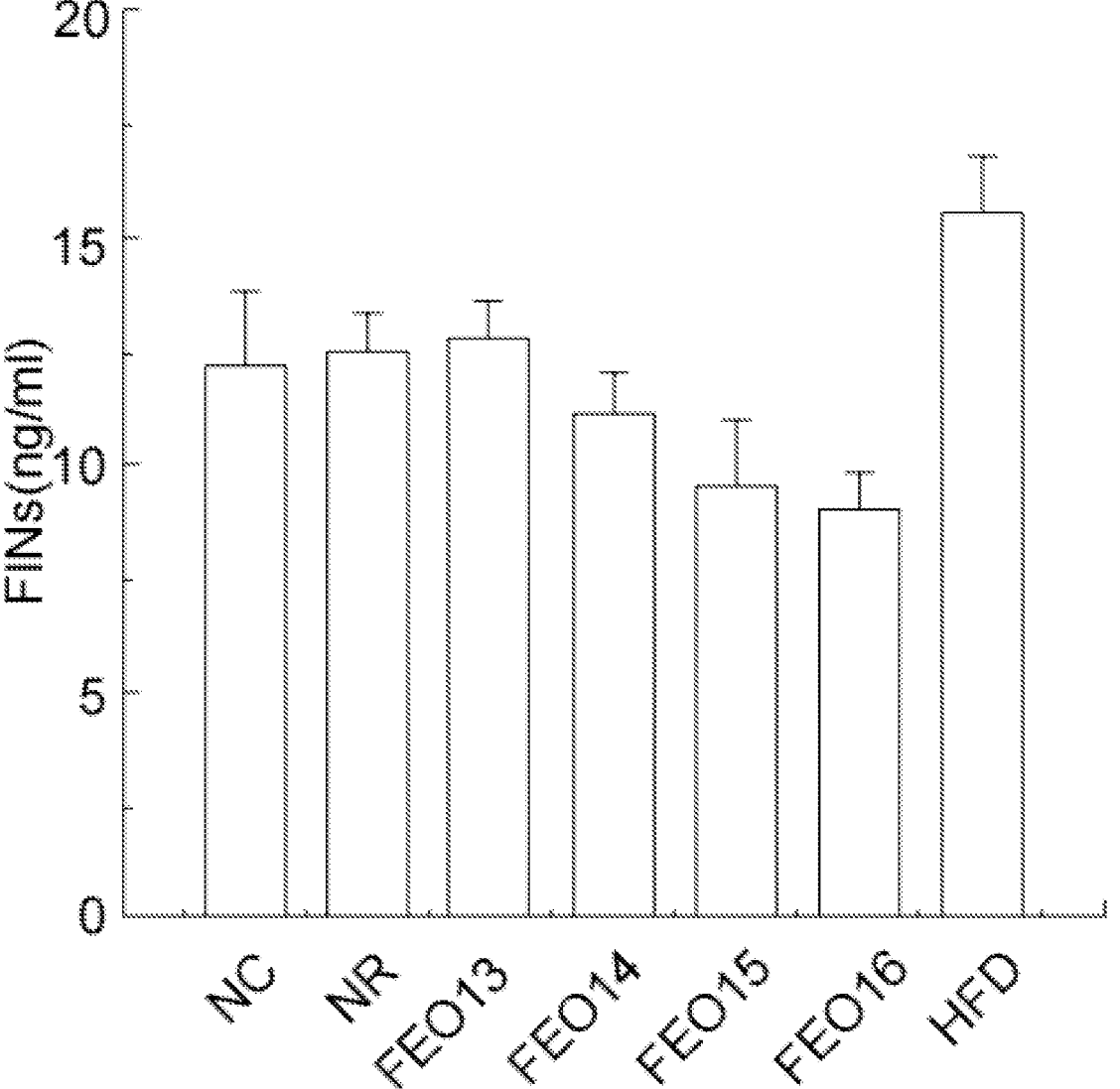

FIGS. 11A-11D shows effects of FEO addition to the feed in Example 4 on various indexes of obesity model mice, where FIG. 11A is the effect on serum LDL-C in mice; FIG. 11B is the effect on serum HDL-C in mice; FIG. 11C is the effect on serum FBG in mice; and FIG. 11D is the effect on FINs in mice.

Figure 12A:
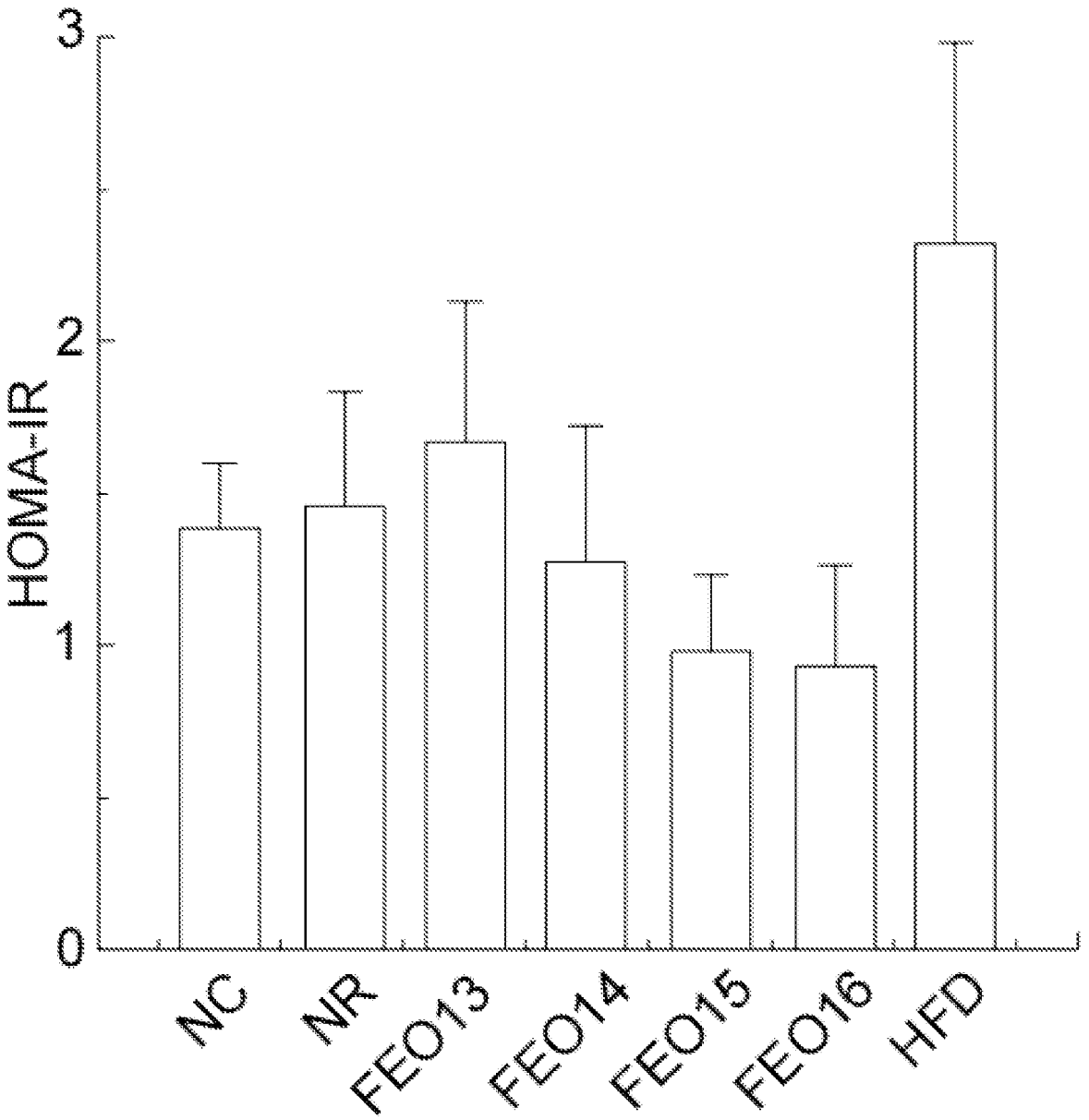
Figure 12B:
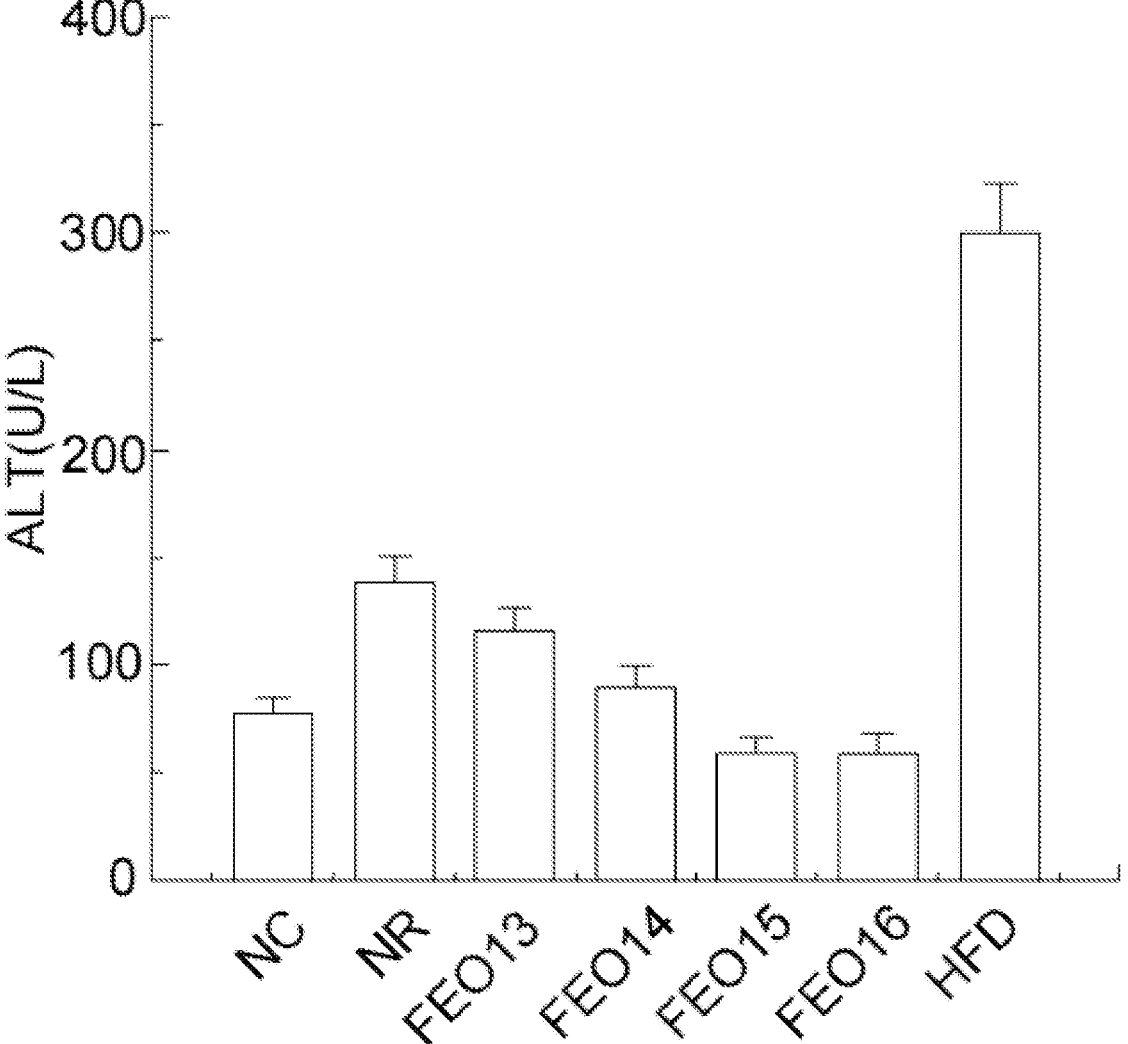
Figure 12C:
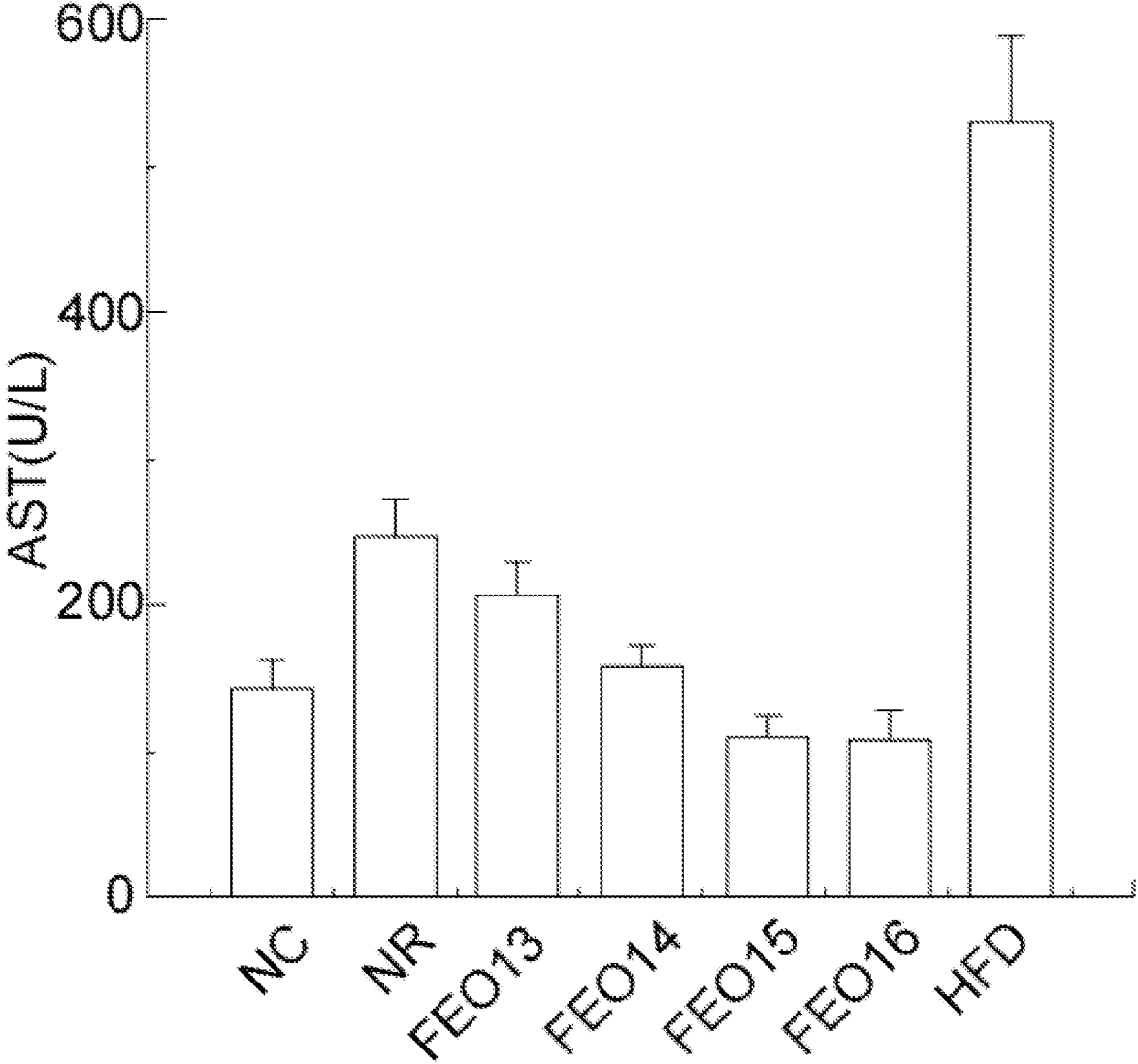

FIGS. 12A-12C shows effects of FEO addition in the feed on various indexes of obesity model mice in Example 4, where FIG. 12A is the effect on serum HOMA-IR of mice; FIG. 12B is the effect on serum ALT of mice; FIG. 12C is the effect on serum AST of mice.

In FIGS. 10A-12C, L/Ln: mass ratio of linoleic acid to linolenic acid, MCFA/LCFA: mass ratio of MCFAs to LCFAs, NC: normal chow (AIN-93M) group, NR: natural recovering group, HFD: high fat diet (D12451) group, FEO13: M-FEO with an MCFA/LCFA of 3.0 and an L/Ln of 0.5, FEO14: MH-FEO with an MCFA/LCFA of 3.0 and an L/Ln of 0.5, FEO15: H-FEO with an MCFA/LCFA of 3.0 and an L/Ln of 0.5, FEO16: EH-FEO with an MCFA/LCFA of 3.0 and an L/Ln of 0.5.

DETAILED DESCRIPTION OF THE EMBODIMENTS

The present disclosure is further described below in conjunction with specific examples.

Experimental methods for which specific conditions are not indicated in the following examples generally follow conventional conditions. Unless otherwise stated, all percentages, proportions, ratios, or percentile are calculated by mass.

Unless otherwise specified, all professional and scientific terms used in the examples have the same meaning as those known to those skilled in the art. In addition, any methods and materials similar or equivalent to those described herein may be used in the present disclosure. The preferred methods and materials described in the Examples are for demonstration purposes only.

The following are examples of the present disclosure.

The method of fatty acid content assay can be found in GB 5009.168-2016.

The method for detecting transesterification rate can be found in Characterization of medium-chain triglycerol (MCT)-enriched seed oil from *Cinnamomum camphora* (Lauraceae) and its oxidative stability, Journal of Agricultural and Food Chemistry, 2011, 59(9): 4771-4778.

The method for detecting fatty acid content at position Sn-2 can be found in national standards GB/T 24894-2010, GB 5009.168-2016.

The method for determining freezing point can be found in SN/T0801.17-2010.

Gas chromatography (GC): Agilent 7890B; column: DB-23 fused silica capillary column (30 m*0.25 mm*0.25 μm).

High performance liquid chromatography (HPLC): Agilent 1260; column: C18 column (5 μm*4.6 mm*200 mm).

In the following examples of the present disclosure, CCSKO was homemade, and the caprylic acid, caprilic/capric triglycerides, soybean oil, corn oil, sunflower seed oil, safflower seed oil, linseed oil, and *perilla* seed oil used were purchased from market; LIPOZYME® RM IM (lipase derived from *Rhizomucor miehei*) was purchased from Novozymes Biotechnology Co. Ltd. NOVOZYME® 435 (lipase derived from *Candida antarctica* lipase B) was purchased from Novozymes Biotechnology Ltd. and *Staphylococcus caprae* lipase was homemade In the four embodiments of the present disclosure, namely Examples 1, 2, 3 and 4, the feeds used in the animal tests were normal chow (AIN-93M), high-fat diet (D12451), extremely-high-fat functional edible oil diet (EH-FEO), high-fat functional edible oil diet (H-FEO), medium-high-fat functional edible oil diet (MH-FEO) and medium-fat functional edible oil diet (M-FEO), and their formulations and energy shares are detailed in Tables 1-1, 1-2 and 1-3.

TABLE 1-1

Formulations of normal chow and high-fat diet in animal experiments

| Engergy-producing component | Type of feed | | | |
| --- | --- | --- | --- | --- |
| | Normal chow (AIN-93M) | | High-fat diet (D12451) | |
| | gm % | Kcal % | gm % | Kcal % |
| Protein | 14.20 | 14.70 | 24.00 | 20.00 |
| Carbohydrates | 73.10 | 75.90 | 41.00 | 35.00 |
| Lipid | 4.00 | 9.40 | 24.00 | 45.00 |
| MCFAs | — | — | — | — |
| Ingredient | gm | Kcal | gm | Kcal |
| Casein | 140.00 | 560.00 | 233.06 | 932.24 |
| L-Cystine | 1.80 | 7.20 | 3.50 | 14.00 |
| Corn starch | 495.70 | 1983.00 | 84.83 | 339.32 |
| Maltodextrin 10 | 125.00 | 500.00 | 116.53 | 466.12 |
| Sucrose | 100.00 | 400.00 | 201.36 | 805.44 |
| Cellulose | 50.00 | — | 58.27 | — |
| Soybean oil | 40.00 | 360.00 | 29.13 | 262.17 |
| Lard | — | — | 206.84 | 1861.56 |
| Functional edible oil | — | — | — | |
| Mineral admixture | 35.00 | — | 11.65 | |
| Dicalcium phosphate | — | — | 15.15 | |
| Calcium carbonate | — | — | 6.41 | |
| Potassium citrate, 1H₂O | — | — | 19.23 | |
| Vitamin admixture | 10.00 | 40.00 | 11.65 | 46.60 |
| Choline bitartrate | 2.50 | — | 2.33 | — |
| Allura Red AC | — | — | 0.06 | — |
| Total | 1000.00 | 3850.00 | 1000.00 | 4727.45 |

TABLE 1-2

Formulations of EH-FEO and H-FEO in animal experiments

| Engergy-producing component | Type of feed | | | |
| --- | --- | --- | --- | --- |
| | EH-FEO | | H-FEO | |
| | gm % | Kcal % | gm % | Kcal % |
| Protein | 24.00 | 18.56 | 24.00 | 20.00 |
| Carbohydrates | 35.00 | 2738 | 41.00 | 35.00 |
| Lipid | 30.00 | 52.86 | 24.00 | 45.00 |
| MCFAs | 22.5 | 39.65 | 18.00 | 33.75 |
| Ingredient | gm | Kcal | gm | Kcal |
| Casein | 233.06 | 932.24 | 233.06 | 932.24 |
| L-Cystine | 3.50 | 14.00 | 3.50 | 14.00 |
| Corn starch | 72.41 | 289.63 | 84.83 | 339.32 |
| Maltodextrin 10 | 99.46 | 397.85 | 116.53 | 466.12 |
| Sucrose | 171.87 | 687.48 | 201.36 | 805.44 |
| Cellulose | 58.26 | — | 58.26 | — |
| Soybean oil | — | — | — | — |
| Lard | — | — | — | — |
| Functional edible oil | 294.96 | 2654.66 | 235.97 | 2123.73 |
| Mineral admixture | 11.65 | — | 11.65 | — |
| Dicalcium phosphate | 15.15 | — | 15.15 | — |
| Calcium carbonate | 6.41 | — | 6.41 | — |
| Potassium citrate, 1H₂O | 19.23 | — | 19.23 | |
| Vitamin admixture | 11.65 | 46.60 | 11.65 | 46.60 |
| Choline bitartrate | 2.33 | — | 2.33 | — |
| Allura Red AC | 0.06 | — | 0.06 | — |
| Total | 1000.00 | 5022.46 | 1000.00 | 4727.45 |

TABLE 1-3

Formulations of MH-FEO and M-FEO in animal experiments

| Engergy-producing | Type of feed | | | |
|---|---|---|---|---|
| | MH-FEO | | M-FEO | |
| component | gm % | Kcal % | gm % | Kcal % |
| Protein | 24.00 | 21.03 | 24.00 | 22.53 |
| Carbohydrates | 47.00 | 41.67 | 53.00 | 50.34 |
| Lipid | 18.00 | 35.93 | 12.00 | 25.66 |
| MCFAs | 13.50 | 26.95 | 9.00 | 19.25 |
| Ingredient | gm | Kcal | gm | Kcal |
| Casein | 233.06 | 932.24 | 233.06 | 932.24 |
| L-Cystine | 3.50 | 14.00 | 3.50 | 14.00 |
| Corn starch | 97.26 | 389.03 | 109.68 | 438.73 |
| Maltodextrin 10 | 133.60 | 534.41 | 150.67 | 602.69 |
| Sucrose | 230.86 | 923.44 | 260.36 | 1041.42 |
| Cellulose | 58.26 | — | 58.26 | — |
| Soybean oil | — | — | — | — |
| Lard | — | — | — | — |
| Functional edible oil | 176.98 | 1592.80 | 117.99 | 1061.87 |
| Mineral admixture | 11.65 | — | 11.65 | — |
| Dicalcium phosphate | 15.15 | — | 15.15 | — |
| Calcium carbonate | 6.41 | — | 6.41 | — |
| Potassium citrate, 1H$_2$O | 19.23 | — | 19.23 | — |
| Vitamin admixture | 11.65 | 46.60 | 11.65 | 46.60 |
| Choline bitartrate | 2.33 | — | 233 | — |
| Allura Red AC | 0.06 | — | 0.06 | — |
| Total | 1000.00 | 4432.52 | 1000.00 | 4137.55 |

In the four embodiments of the present disclosure, namely Examples 1, 2, 3 and 4, the FEO significantly improved the in vivo glucose and lipid metabolism disorder in mice compared with the obesity model mice fed high-fat diet, indicating an improvement by at least 20%, i.e. an increase or a decrease by at least 20% in adiposity, serum TG, TC, LDL-C, HDL-C, FGB, FINs, HOMA-IR (HOMA-IR= [(FBG (mmol/L)×FINs (ng/ml)]/22.5), AST and ALT.

Example 1

The fatty acids of CCSKO, soybean oil and linseed oil were used as raw materials in this example, the composition and distribution of which are detailed in Tables 2, 3 and 4. With a mass ratio of 0.5 for linoleic acid to linolenic acid and mass ratios of 1.9, 2.3, 3.0 and 4.0 for MCFAs to LCFAs (equivalent to the content of MCFAs of about 65% w/w, 70% w/w, 75% w/w and 80% w/w, respectively), appropriate amounts of CCSKO, soybean oil and linseed oil were weighed and put in different esterification reactors, and 10% (w/w) of *Staphylococcus capraelipase* with respect to the mass of the mixed oil was added. The reaction was performed at 40° C. for 4 h with stirring. After the ternary esterification reaction, the lipase was separated from the reaction solution, and the ternary esterification ratio, the ECN and the freezing point of the FEO were determined. The mass ratios of MCFAs to LCFAs were 1.9, 2.3, 3.0 and 4.0, and the mass ratio of linoleic acid to linolenic acid was 0.5. The ternary transesterification rates were 65.73%, 68.48%, 72.13%, 69.96%, respectively, the triglyceride content with an ECN of 34-44 was 63.74%, 64.28%, 64.83% and 63.55%, respectively, and the freezing points were 3.8° C., 5.3° C., 5.9° C. and 7.5° C., respectively, for a series of FEOs. The fatty acid composition and distribution of the FEOs with different mass ratios of MCFAs to LCFAs are shown in Tables 5-1, 5-2, 5-3 and 5-4.

TABLE 2

Fatty acid composition and distribution of CCSKO.

| Fatty acid | Content (%, w/w) CCSKO | | |
|---|---|---|---|
| | Total fatty acids | sn-2 | sn-1.3 |
| Capylic acid (C8:0) | 0.43 ± 0.02 | 0.50 ± 0.02 | 0.39 ± 0.01 |
| Capric acid (C10:0) | 61.18 ± 0.94 | 58.68 ± 0.79 | 62.43 ± 0.55 |
| Lauric acid (CC12:0) | 35.94 ± 0.73 | 37.21 ± 0.59 | 35.31 ± 036 |
| Myristic acid (C14:0) | 0.77 ± 0.02 | 1.02 ± 0.03 | 1.9 ± 0.02 |
| Palmitic acid (C16:0) | 0.18 ± 0.00 | 0.14 ± 0.01 | 0.20 ± 0.01 |
| Stearic acid (C18:0) | ND | ND | ND |
| Oleic acid (C18:1) | 1.18 ± 0.03 | 1.81 ± 0.28 | 4.01 ± 0.19 |
| Linoleic acid (C18:2) | 0.32 ± 0.00 | 0.64 ± 0.04 | 0.16 ± 0.02 |
| α-Linolenic acid (C18:3n-3) | ND | ND | ND |
| Saturated fat acid (ΣSFA) | 98.5 ± 0.14 | 97.55 ± 0.17 | 98.98 ± 0.25 |
| Unsaturated fatty acid (ΣUSFA) | 1.5 ± 0.01 | 2.45 ± 0.03 | 1.02 ± 0.01 |
| Medium-chain fatty acid (ΣMCFA) | 97.55 ± 0.22 | 96.39 ± 0.31 | 98.13 ± 0.19 |
| Long-chain fatty acid (ΣLCFA) | 2.45 ± 0.01 | 3.61 ± 0.02 | 1.87 ± 0.02 |

TABLE 3

Fatty acid composition and distribution of soybean oil

| Fatty acid | Content (%, w/w) Soybean oil | | |
|---|---|---|---|
| | Total fatty acids | sn-2 | sn-1.3 |
| Capylic acid (C8:0) | ND | ND | ND |
| Capric acid (C10:0) | ND | ND | ND |
| Lauric acid (CC12:0) | ND | ND | ND |
| Myristic acid (C14:0) | ND | ND | ND |
| Palmitic acid (C16:0) | 13.75 ± 0.19 | 12.93 ± 0.34 | 14.16 ± 0.18 |
| Stearic acid (C18:0) | 3.82 ± 0.12 | 3.61 ± 0.17 | 3.92 ± 0.11 |
| Oleic acid (C18:1) | 19.58 ± 0.35 | 17.80 ± 0.28 | 20.47 ± 0.16 |
| Linoleic acid (C18:2) | 54.05 ± 4.01 | 57.64 ± 0.77 | 52.26 ± 0.43 |
| α-Linolenic acid (C18:3n-3) | 8.80 ± 0.11 | 8.02 ± 0.09 | 9.19 ± 0.05 |
| Saturated fat acid (ΣSFA) | 17.57 ± 0.15 | 16.54 ± 0.09 | 18.08 ± 0.11 |
| Unsaturated fatty acid (ΣUSFA) | 82.43 ± 0.20 | 83.46 ± 0.13 | 81.92 ± 0.10 |
| Medium-chain fatty acid (ΣMCFA) | 0.00 | 0.00 | 0.00 |
| Long-chain fatty acid (ΣLCFA) | 100.00 | 100.00 | 100.00 |

TABLE 4

Fatty acid composition and distribution of linseed oil

| Fatty acid | Content (%, w/w) Linseed oil | | |
|---|---|---|---|
| | Total fatty acids | sn-2 | sn-1.3 |
| Capylic acid (C8:0) | ND | ND | ND |
| Capric acid (C10:0) | ND | ND | ND |
| Lauric acid (CC12:0) | ND | ND | ND |
| Myristic acid (C14:0) | ND | ND | ND |
| Palmitic acid (C16:0) | 9.97 ± 0.12 | 12.96 ± 0.26 | 8.48 ± 0.08 |
| Stearic acid (C18:0) | 5.08 ± 0.21 | 8.12 ± 0.02 | 3.56 ± 0.02 |
| Oleic acid (C18:1) | 20.59 ± 0.34 | 27.3 ± 0.18 | 17.23 ± 0.33 |
| Linoleic acid (C18:2) | 15.40 ± 0.28 | 15.40 ± 0.22 | 15.40 ± 0.11 |
| α-Linolenic acid (C18:3n-3) | 48.96 ± 4.01 | 36.21 ± 0.36 | 55.33 ± 0.76 |

TABLE 4-continued

Fatty acid composition and distribution of linseed oil

| Fatty acid | Content (%, w/w) Linseed oil | | |
|---|---|---|---|
| | Total fatty acids | sn-2 | sn-1.3 |
| Saturated fat acid (ΣSFA) | 15.05 ± 0.17 | 21.08 ± 0.14 | 12.04 ± 0.05 |
| Unsaturated fatty acid (ΣUSFA) | 84.95 ± 0.50 | 78.92 ± 0.25 | 87.96 ± 0.31 |
| Medium-chain fatty acid (ΣMCFA) | 0.00 | 0.00 | 0.00 |
| Long-chain fatty acid (ΣLCFA) | 100.00 | 100.00 | 100.00 |

TABLE 5-1

Fatty acid composition and distribution of
FEO with MCFA/LCFA of 1.9 ( L/Ln = 0.5)

| Fatty acid | Content (%, w/w) MCFA/LCFA = 1.9 | | |
|---|---|---|---|
| | Total fatty acids | sn-2 | sn-1.3 |
| Capylic acid (C8:0) | 0.31 ± 0.01 | 0.20 ± 0.01 | 0.36 ± 0.01 |
| Capric acid (C10:0) | 41.28 ± 1.33 | 21.03 ± 0.68 | 51.1 ± 0.72 |
| Lauric acid (CC12:0) | 23.37 ± 1.21 | 13.06 ± 0.36 | 28.52 ± 0.47 |
| Myristic acid (C14:0) | 0.53 ± 0.03 | 1.05 ± 0.01 | 0.27 ± 0.01 |
| Palmitic acid (C16:0) | 4.08 ± 0.48 | 10.58 ± 0.51 | 0.83 ± 0.02 |
| Stearic acid (C18:0) | 1.48 ± 0.05 | 2.19 ± 0.04 | 1.125 ± 0.03 |
| Oleic acid (C18:1) | 7.55 ± 0.58 | 15.53 ± 0.22 | 3.56 ± 0.13 |
| Linoleic acid (C18:2) | 7.26 ± 1.19 | 14.31 ± 0.84 | 3.74 ± 0.66 |
| α-Linolenic acid (C18:3n-3) | 14.14 ± 1.13 | 22.05 ± 0.03 | 10.19 ± 0.04 |
| Saturated fat acid (ΣSFA) | 71.05 ± 1.99 | 48.11 ± 0.17 | 82.52 ± 0.12 |
| Unsaturated fatty acid (ΣUSFA) | 28.95 ± 2.31 | 51.89 ± 0.38 | 17.48 ± 0.05 |
| Medium-chain fatty acid (ΣMCFA) | 64.96 ± 1.19 | 34.29 ± 0.11 | 80.29 ± 0.31 |
| Long-chain fatty acid (ΣLCFA) | 35.04 ± 2.32 | 65.71 ± 0.21 | 19.71 ± 0.15 |

Note:
MCFA/LCFA represents the mass ratio of MCFAs to LCFAs, and L/Ln represents the mass ratio of linoleic acid and linolenic acid.

TABLE 5-2

Fatty acid composition and distribution of
FEO with MCFA/LCFA of 2.3 ( L/Ln = 0.5)

| Fatty acid | Content (%, w/w) MCFA/LCFA = 2.3 | | |
|---|---|---|---|
| | Total fatty acids | sn-2 | sn-1.3 |
| Capylic acid (C8:0) | 0.33 ± 0.01 | 0.22 ± 0 | 0.38 ± 0.01 |
| Capric acid (C10:0) | 44.39 ± 1.69 | 23.93 ± 0.53 | 54.62 ± 0.58 |
| Lauric acid (CC12:0) | 25.26 ± 1.62 | 15.84 ± 0.33 | 29.97 ± 0.52 |
| Myristic acid (C14:0) | 0.57 ± 0.05 | 1.06 ± 0.01 | 0.32 ± 0.03 |
| Palmitic acid (C16:0) | 3.51 ± 0.42 | 7.93 ± 0.49 | 1.3 ± 0.05 |
| Stearic acid (C18:0) | 1.29 ± 0.06 | 2.11 ± 0.03 | 0.88 ± 0.02 |
| Oleic acid (C18:1) | 6.55 ± 0.55 | 14.63 ± 0.26 | 2.51 ± 0.1 |
| Linoleic acid (C18:2) | 6.13 ± 1.21 | 13.22 ± 0.94 | 2.59 ± 0.49 |
| α-Linolenic acid (C18:3n-3) | 11.97 ± 1.12 | 21.06 ± 0.08 | 7.43 ± 0.07 |
| Saturated fat acid (ΣSFA) | 75.35 ± 2.56 | 51.09 ± 0.19 | 87.48 ± 0.14 |
| Unsaturated fatty acid (ΣUSFA) | 24.65 ± 1.96 | 48.91 ± 0.24 | 12.52 ± 0.09 |

TABLE 5-2-continued

Fatty acid composition and distribution of
FEO with MCFA/LCFA of 2.3 ( L/Ln = 0.5)

| Fatty acid | Content (%, w/w) MCFA/LCFA = 2.3 | | |
|---|---|---|---|
| | Total fatty acids | sn-2 | sn-1.3 |
| Medium-chain fatty acid (ΣMCFA) | 69.98 ± 2.31 | 39.99 ± 0.13 | 84.97 ± 0.26 |
| Long-chain fatty acid (ΣLCFA) | 30.02 ± 1.96 | 60.01 ± 0.18 | 15.03 ± 0.19 |

Note:
MCFA/LCFA represents the mass ratio of MCFAs to LCFAs, and L/Ln represents the mass ratio of linoleic acid and linolenic acid.

TABLE 5-3

Fatty acid composition and distribution of
FEO with an MCFA/LCFA of 3.0 (L/Ln = 0.5)

| Fatty acid | Content (%, w/w) MCFA/LCFA = 3.0 | | |
|---|---|---|---|
| | Total fatty acids | sn-2 | sn-1.3 |
| Capylic acid (C8:0) | 0.34 ± 0.01 | 0.23 ± 0.01 | 0.39 ± 0 |
| Capric acid (C10:0) | 47.32 ± 2.45 | 26.17 ± 0.49 | 57.89 ± 0.61 |
| Lauric acid (CC12:0) | 26.79 ± 1.88 | 17.92 ± 0.35 | 31.22 ± 0.67 |
| Myristic acid (C14:0) | 0.56 ± 0.04 | 1.06 ± 0.03 | 0.31 ± 0.01 |
| Palmitic acid (C16:0) | 2.59 ± 0.55 | 6.11 ± 0.51 | 0.83 ± 0.03 |
| Stearic acid (C18:0) | 1.41 ± 0.02 | 2.22 ± 0.04 | 1.00 ± 0.01 |
| Oleic acid (C18:1) | 5.72 ± 0.49 | 12.95 ± 0.11 | 2.10 ± 0.09 |
| Linoleic acid (C18:2) | 5.30 ± 1.76 | 12.47 ± 0.76 | 1.7 ± 0.56 |
| α-Linolenic acid (C18:3n-3) | 9.97 ± 1.33 | 20.87 ± 0.05 | 4.52 ± 0.05 |
| Saturated fat acid (ΣSFA) | 79.01 ± 2.78 | 53.71 ± 0.22 | 91.66 ± 0.18 |
| Unsaturated fatty acid (ΣUSFA) | 20.99 ± 2.01 | 46.29 ± 0.27 | 8.34 ± 0.11 |
| Medium-chain fatty acid (ΣMCFA) | 74.45 ± 1.98 | 44.32 ± 0.15 | 89.5 ± 0.22 |
| Long-chain fatty acid (ΣLCFA) | 25.55 ± 1.76 | 55.68 ± 0.21 | 10.49 ± 0.22 |

Note:
MCFA/LCFA represents the mass ratio of MCFAs to LCFAs, and L/Ln represents the mass ratio of linoleic acid and linolenic acid.

TABLE 5-4

Fatty acid composition and distribution of
FEO with an MCFA/LCFA of 4.0 (L/Ln = 0.5).

| Fatty acid | Content (%, w/w) MCFA/LCFA = 4.0 | | |
|---|---|---|---|
| | Total fatty acids | sn-2 | sn-1.3 |
| Capylic acid (C8:0) | 0.37 ± 0.01 | 0.27 ± 0.02 | 0.42 ± 0.01 |
| Capric acid (C10:0) | 50.32 ± 1.87 | 28.53 ± 0.61 | 61.21 ± 0.44 |
| Lauric acid (CC12:0) | 29.27 ± 1.11 | 19.35 ± 0.32 | 34.23 ± 0.36 |
| Myristic acid (C14:0) | 0.66 ± 0.04 | 1.21 ± 0.02 | 0.38 ± 0.01 |
| Palmitic acid (C16:0) | 2.19 ± 0.38 | 6.07 ± 0.51 | 0.25 ± 0.03 |
| Stearic acid (C18:0) | 0.79 ± 0.08 | 1.72 ± 0.01 | 0.33 ± 0.01 |
| Oleic acid (C18:1) | 4.63 ± 0.44 | 12.11 ± 0.31 | 0.89 ± 0.15 |
| Linoleic acid (C18:2) | 3.94 ± 1.16 | 10.83 ± 0.87 | 0.50 ± 0.53 |
| α-Linolenic acid (C18:3n-3) | 7.83 ± 1.22 | 19.91 ± 0.09 | 1.79 ± 0.06 |
| Saturated fat acid (ΣSFA) | 83.60 ± 2.67 | 57.15 ± 0.22 | 96.82 ± 0.19 |

TABLE 5-4-continued

Fatty acid composition and distribution of
FEO with an MCFA/LCFA of 4.0 (L/Ln = 0.5).

| | Content (%, w/w) MCFA/LCFA = 4.0 | | |
| --- | --- | --- | --- |
| Fatty acid | Total fatty acids | sn-2 | sn-1.3 |
| Unsaturated fatty acid (ΣUSFA) | 16.40 ± 2.04 | 42.85 ± 0.27 | 3.18 ± 0.06 |
| Medium-chain fatty acid (ΣMCFA) | 79.96 ± 2.12 | 48.15 ± 0.12 | 95.86 ± 0.23 |
| Long-chain fatty acid (ΣLCFA) | 20.04 ± 1.88 | 51.85 ± 0.15 | 4.14 ± 0.12 |

Note:
MCFA/LCFA represents the mass ratio of MCFAs to LCFAs, and L/Ln represents the mass ratio of linoleic acid and linolenic acid.

3-4-week-old male C57BL/6 mice weighing 13-16 grams were used for the experiment. During the experiment, the mice were fed in standard cages with free access to food and water, in 12 h/12 h day/night light cycle, at 23±2° C. and 40-60% humidity. After one week of acclimatisation, the mice were randomly divided into two groups: 10 mice were fed AIN-93M as the normal chow (NC) group and 60 mice were fed D12451 as the high fat diet (HFD) group. After 8 weeks of feeding, the mice were weighed for recording. The mice in the HFD group that were at least 20% heavier than the average weight of the mice in the NC group were selected as the nutritional obesity model mice and used in the subsequent experiments.

After the modeling, the mice in the HFD group were randomly divided into 6 groups according to their body weight, namely the HFD group, the natural recovering (NR) group, and 4 FEO groups (FEO1, FEO2, FEO3 and FEO4), and the mice were fed continuously for 10 weeks. The mice in groups FEO1, FEO2, FEO3 and FEO4 were fed high-fat functional edible oil (H-FEO) diet with mass ratios of 1.9, 2.3, 3.0 and 4.0 for MCFAs to LCFAs, respectively, and a mass ratio of 0.5 for linoleic acid to linolenic acid in LCFAs. The mice in NC group were fed normal chow AIN-93M until the end of the experiment. The specific feed formulations used during the experiment are shown in Tables 1-1, 1-2 and 1-3.

At the end of the experiment, the final body weight of the mice was weighed and recorded, the blood was collected, and serum was separated. The levels of TG, TC, LDL-C, HDL-C, FBG, FINs, glutamic-pyruvic transaminase (also known as alanine transaminase, ALT), glutamic-oxaloacetic transaminase (also known as aspartate transaminase, AST) and other indicators were measured. The peri-testicular fat and peri-renal fat were separated and weighed, and the sum of peri-testicular fat and peri-renal fat was used as the abdominal fat mass. The fat coefficient (percentage of fat to body weight) and homeostatic model assessment of insulin resistance (HOMA-IR=[(FBG (mmol/L)×FINs (ng/ml)]/22.5) were calculated.

The data were processed using the SPSS 19.0 statistical package (SPSS Inc., Chicago, IL, USA). Results of animal experiments are shown in Tables 6 and 7 and FIGS. 1A to 3C.

TABLE 6

Serum fatty acid composition of mice in NC, NR and HFD groups

| | Content (%, w/w) | | |
| --- | --- | --- | --- |
| Fatty acid | NC | NR | HFD |
| Caprylic acid (C8:0) | 0.00 ± 0 | 0.00 ± 0 | 0.00 ± 0 |
| Capric acid (C10:0) | 0.00 ± 0 | 0.00 ± 0 | 0.00 ± 0 |
| Lauric acid (CC12:0) | 0.00 ± 0 | 0 ± 0 | 0.00 ± 0 |
| Myristic acid (C14:0) | 1.31 ± 0.09 | 1.45 ± 0.11 | 0.67 ± 0/04 |
| Palmitic acid (C16:0) | 24.21 ± 1.21 | 25.35 ± 1.35 | 32.72 ± 1.83 |
| Stearic acid (C18:0) | 13.98 ± 0.98 | 14.09 ± 0.11 | 15.36 ± 1.43 |
| Oleic acid (C18:1) | 13.49 ± 1.73 | 13.56 ± 1.18 | 14.4 ± 1.66 |
| Linoleic acid (C18:2) | 22.92 ± 2.02 | 22.17 ± 2.14 | 13.18 ± 2.11 |
| α-Linolenic acid (C18:3n-3) | 0.63 ± 0.04 | 0.64 ± 0.03 | 0.57 ± 0.02 |
| Eicosatrienoic acid (C20:2) | 0.31 ± 0.01 | 0.24 ± 0.01 | 0.45 ± 0.01 |
| Eicosatrienoic acid (C20:3) | 1.01 ± 0.05 | 0.99 ± 0.11 | 1.2 ± 0.23 |
| Arachidonic acid (ARA) (C20:4) | 13.66 ± 1.45 | 13.43 ± 1.21 | 14.07 ± 1.42 |
| Eicosapentaenoic acid (EPA) (C20:5) | 1.33 ± 0.06 | 1.02 ± 0.04 | 1.71 ± 0.04 |
| Docosadienoic Acid (C22:2) | 0.23 ± 0.03 | 0.19 ± 0.01 | 0.44 ± 0.03 |
| Docosatetraenoic acid (C22:4) | 0.58 ± 0.05 | 0.44 ± 0.07 | 1.32 ± 0.11 |
| Docosapentaenoic Acid (C22:5) | 1.03 ± 0.12 | 0.92 ± 0.09 | 1.65 ± 0.07 |
| Docosahexaenoic Acid (DHA) (C22:6) | 5.31 ± 0.12 | 5.51 ± 0.15 | 2.25 ± 0.11 |

TABLE 7

Effects of MCFA/LCFA of FEO on serum fatty acids in obese model mice

| | Content (%, w/w) | | | |
| --- | --- | --- | --- | --- |
| Fatty acid | FEO1 (MCFA/ LCFA = 1.9) | FEO2 (MCFA/ LCFA = 2.3) | FEO3 (MCFA/ LCFA = 3.0) | FEO4 (MCFA/ LCFA = 4.0) |
| Capylic acid (C8:0) | 0.01 ± 0.01 | 0.03 ± 0.01 | 0.04 ± 0 | 0.05 ± 0.01 |
| Capric acid (C10:0) | 25.32 ± 3.23 | 28.92 ± 3.16 | 32.53 ± 3.19 | 35.97 ± 3.21 |
| Lauric acid (CC12:0) | 13.16 ± 2.08 | 15.78 ± 2.06 | 18.33 ± 2.07 | 20.91 ± 2.11 |
| Myristic acid (C14:0) | 0.56 ± 0.01 | 0.44 ± 0.01 | 0.27 ± 0.0.1 | 0.15 ± 0.02 |

TABLE 7-continued

Effects of MCFA/LCFA of FEO on serum fatty acids in obese model mice

| | Content (%, w/w) | | | |
|---|---|---|---|---|
| Fatty acid | FEO1 (MCFA/ LCFA = 1.9) | FEO2 (MCFA/ LCFA = 2.3) | FEO3 (MCFA/ LCFA = 3.0) | FEO4 (MCFA/ LCFA = 4.0) |
| Palmitic acid (C16:0) | 4.32 ± 052 | 4.05 ± 0.74 | 3.66 ± 0 · 66 | 3.4 ± 0.27 |
| Stearic acid (C18:0) | 2.83 ± 017 | 2.52 ± 0.25 | 2.12 ± 0.32 | 1.97 ± 0.26 |
| Oleic acid (C18:1) | 7.32 ± 0.87 | 6.24 ± 0.42 | 4.86 ± 0.64 | 2.62 ± 0.52 |
| Linoleic acid (C18:2) | 734 ± 0.69 | 6.85 ± 0.47 | 6.42 ± 0.54 | 5.61 ± 0.25 |
| α-Linolenic acid (C18:3n-3) | 15.02 ± 1.55 | 12.51 ± 1.76 | 11.96 ± 1.32 | 10.97 ± 1.8 |
| Eicosatrienoic acid (C20:2) | 0.21 ± 0.01 | 0.16 ± 0.02 | 0.14 ± 0.04 | 0.07 ± 03 |
| Eicosatrienoic acid (C20:3) | 0.37 ± 0.02 | 0.29 ± 0.11 | 0.21 ± 0.12 | 0.18 ± 0.03 |
| Arachidonic acid (ARA) (C20:4) | 4.06 ± 0.35 | 3.69 ± 0.34 | 2.93 ± 0.47 | 2.74 ± 0.39 |
| Eicosapentaenoic acid (EPA) (C20:5) | 5.21 ± 0.13 | 4.92 ± 0.17 | 4.81 ± 0.15 | 4.78 ± 0.12 |
| Docosadienoic Acid (C22:2) | 0.2 ± 0.02 | 0.17 ± 0.01 | 0.16 ± 0.02 | 0.12 ± 0.01 |
| Docosatetraenoic acid (C22:4) | 0.93 ± 0.08 | 0.75 ± 0.07 | 0.49 ± 0.03 | 0.46 ± 0.04 |
| Docosapentaenoic Acid (C22:5) | 4.33 ± 0.13 | 4.09 ± 0.15 | 3.71 ± 0.14 | 3.35 ± 0.12 |
| Docosahexaenoic Acid (DHA) (C22:6) | 8.8 ± 0.16 | 8.59 ± 0.14 | 7.36 ± 0.15 | 6.64 ± 0.17 |

Note:
MCFA/LCFA represents the mass ratio of MCFAs to LCFAs.

Figure 1A:
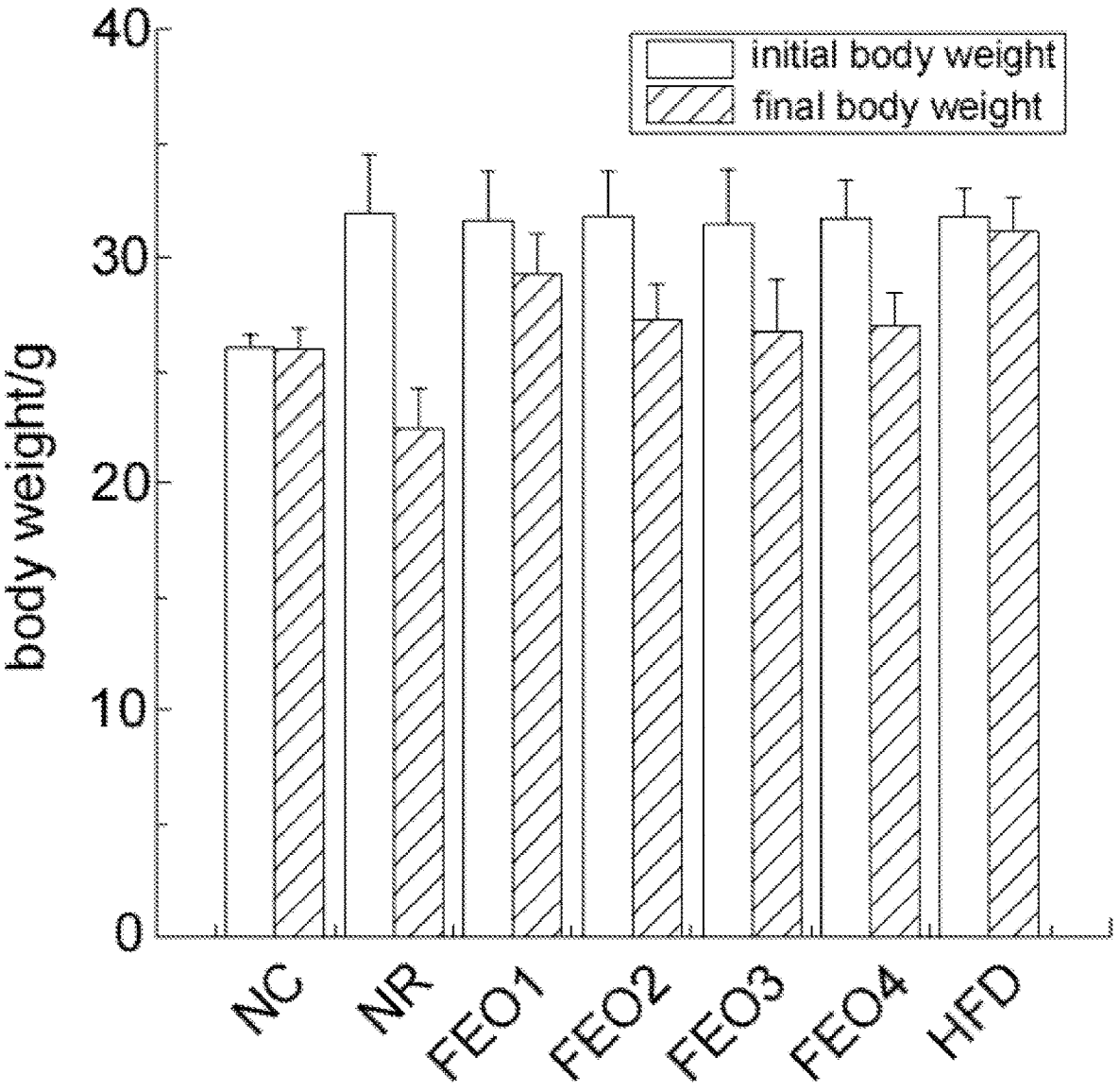
FIGS. 1A-1D shows effects of the mass ratio of MCFAs to LCFAs in the FEO of Example 1 on various indexes of mice in the obesity model, where
Figure 1B:
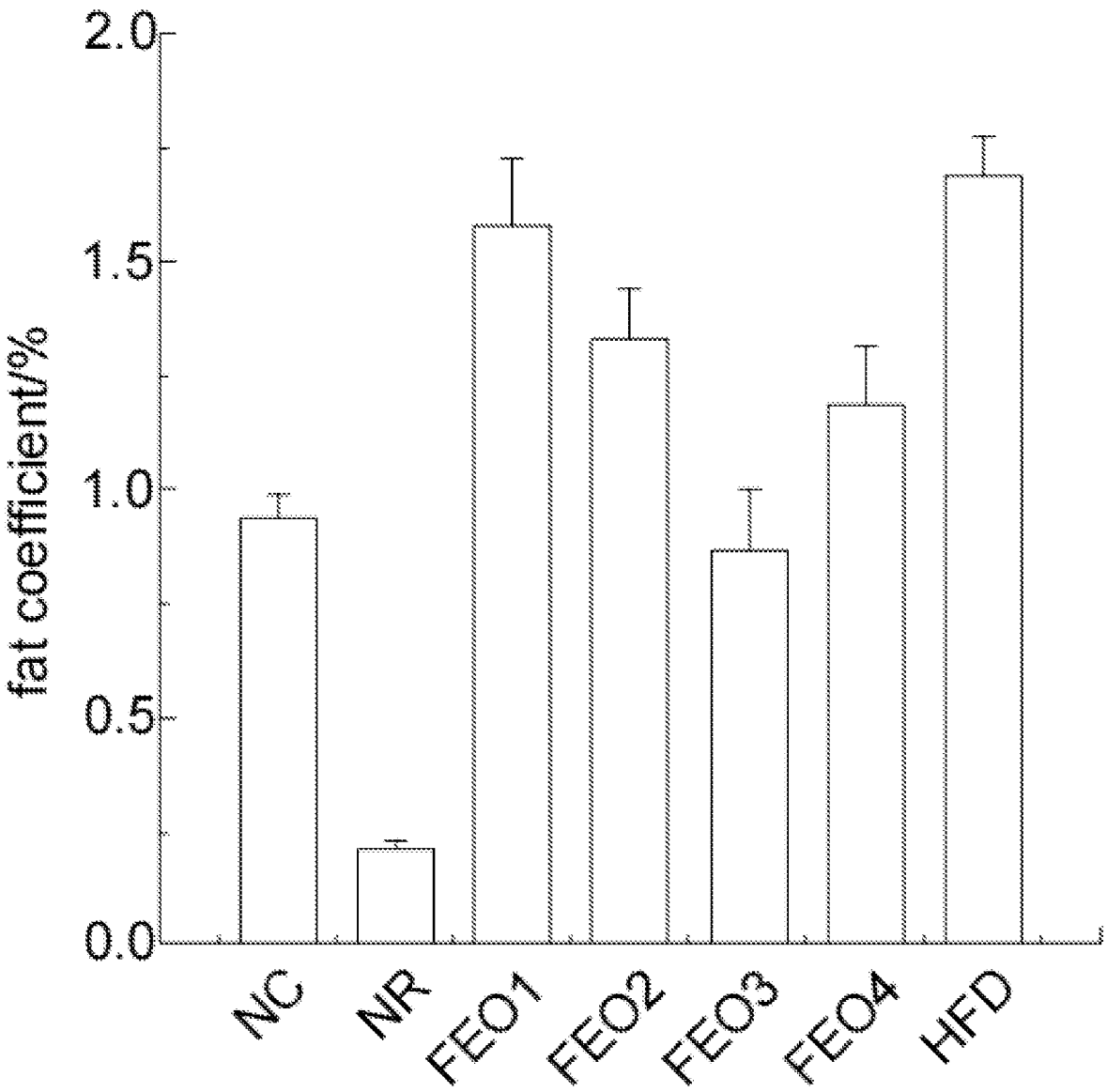
Figure 1C:
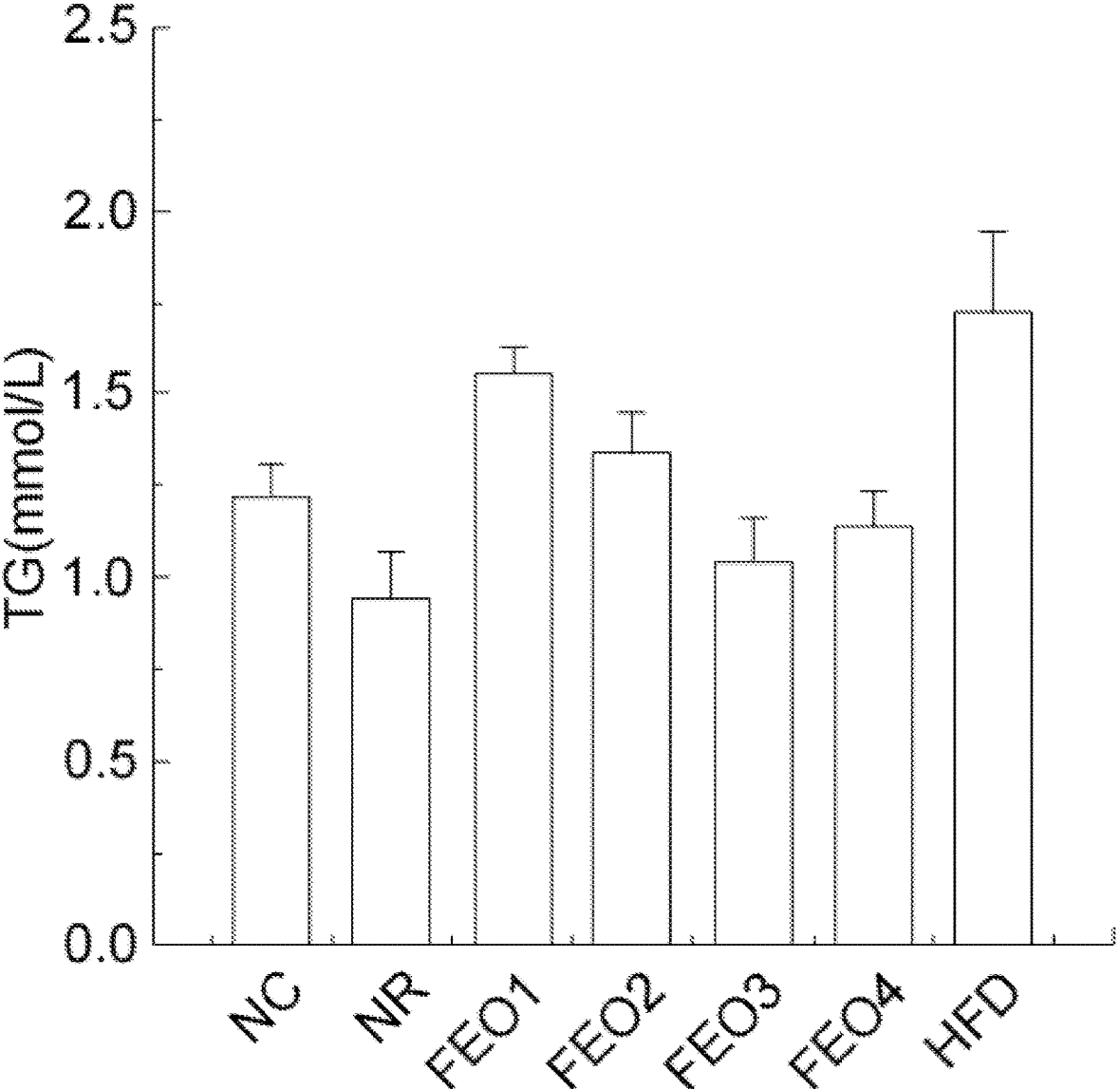
Figure 1D:
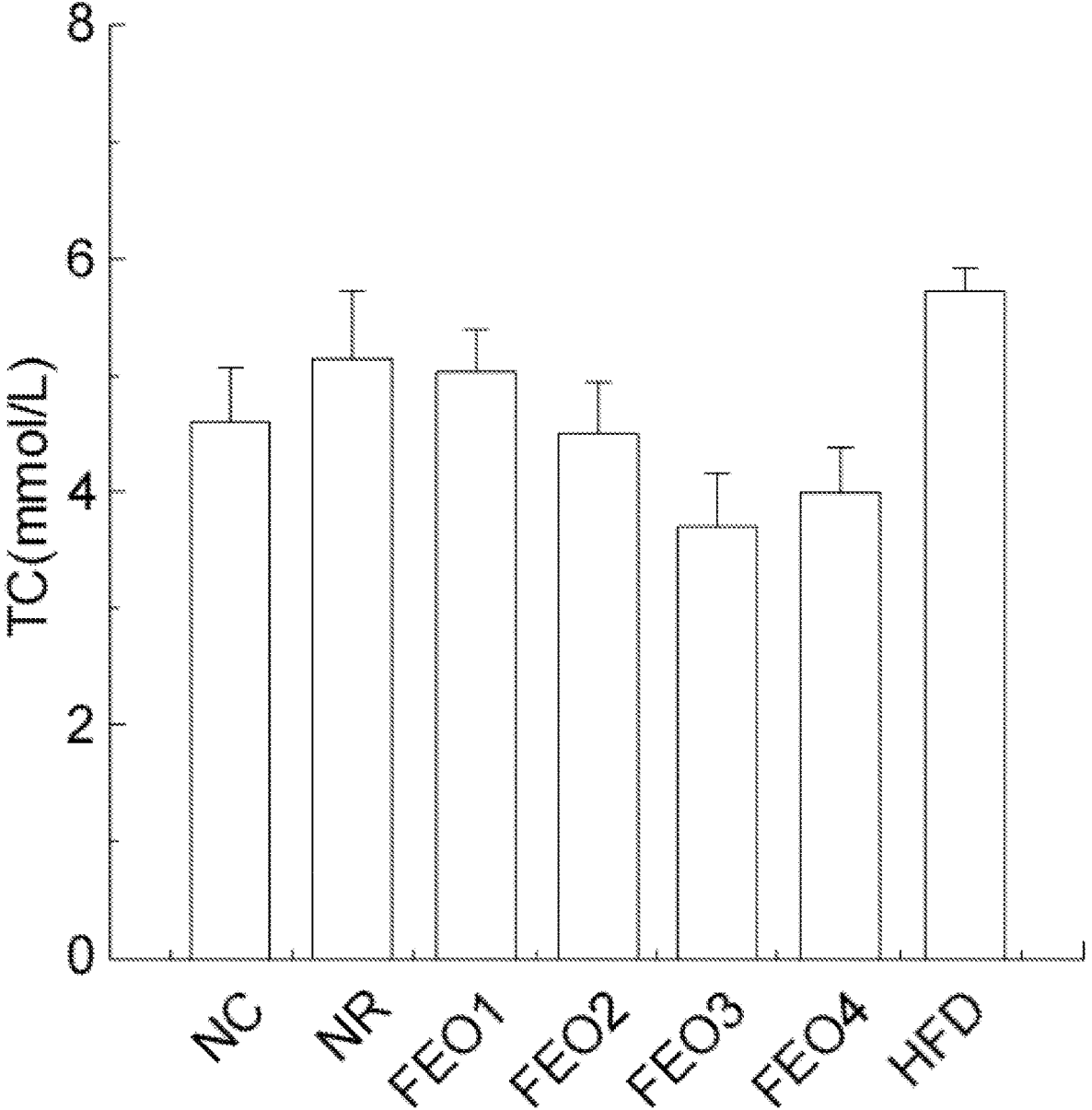
Figure 2A:
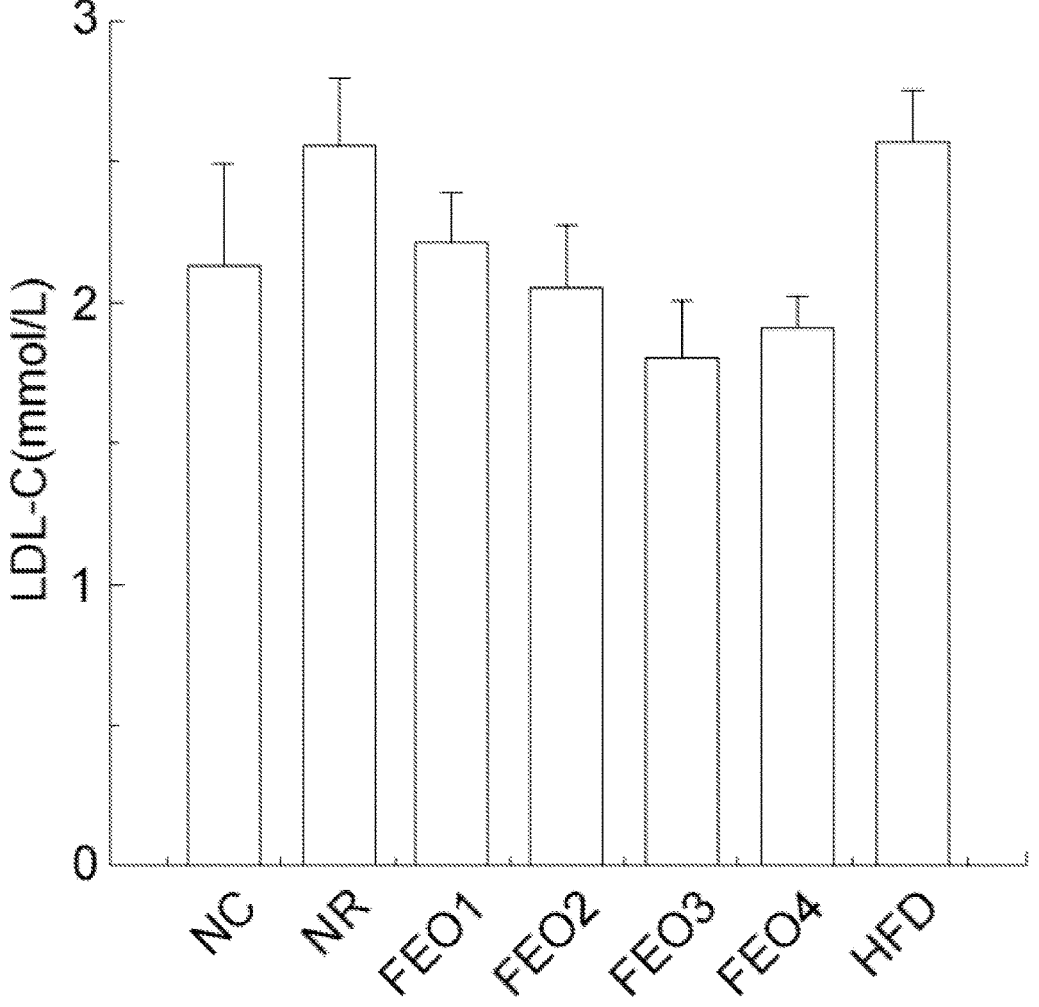
FIGS. 2A-2D shows effects of the mass ratio of MCFAs to LCFAs in the FEO of Example 1 on various indexes in obese model mice, where
Figure 2B:
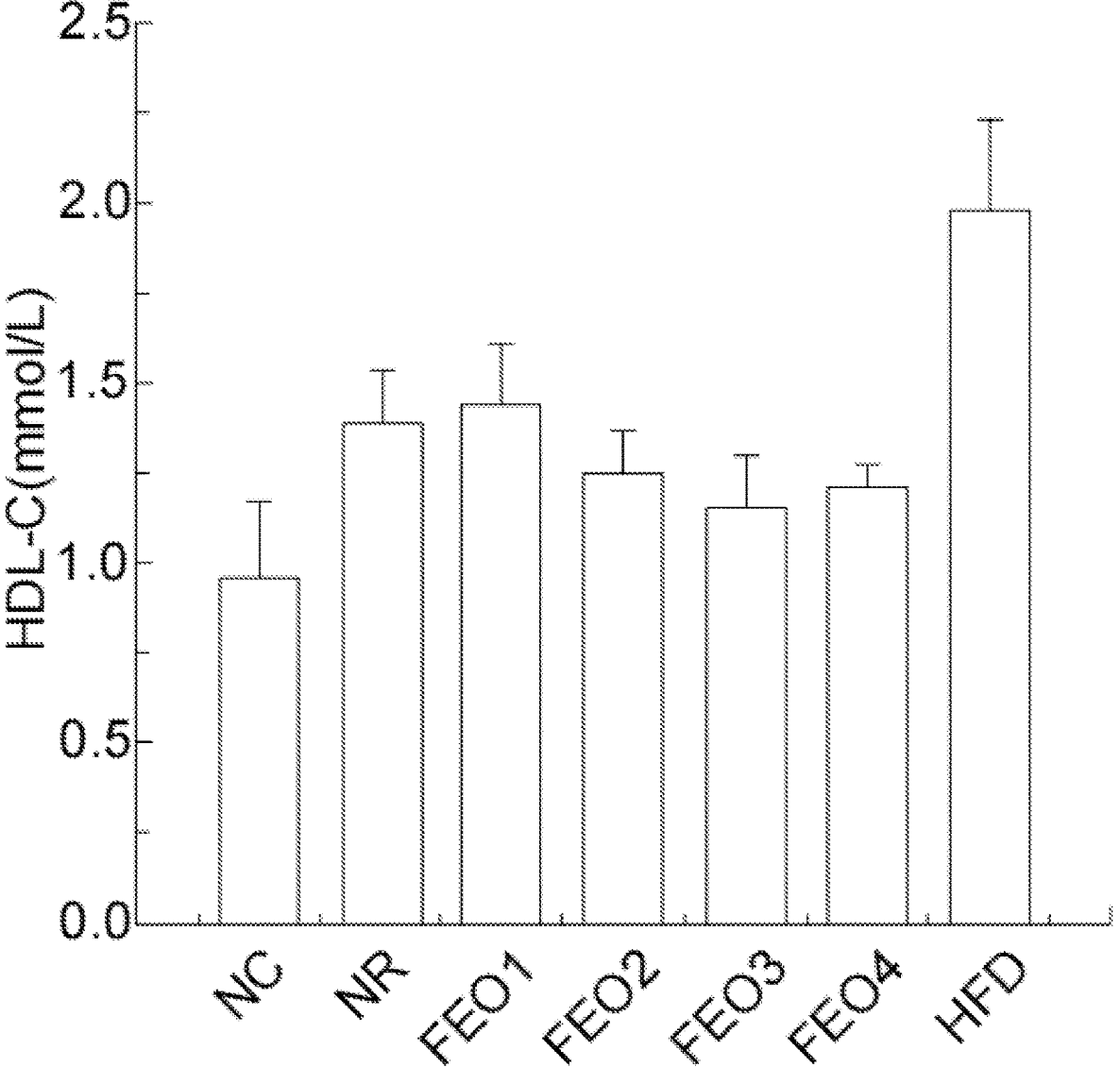
Figure 2C:
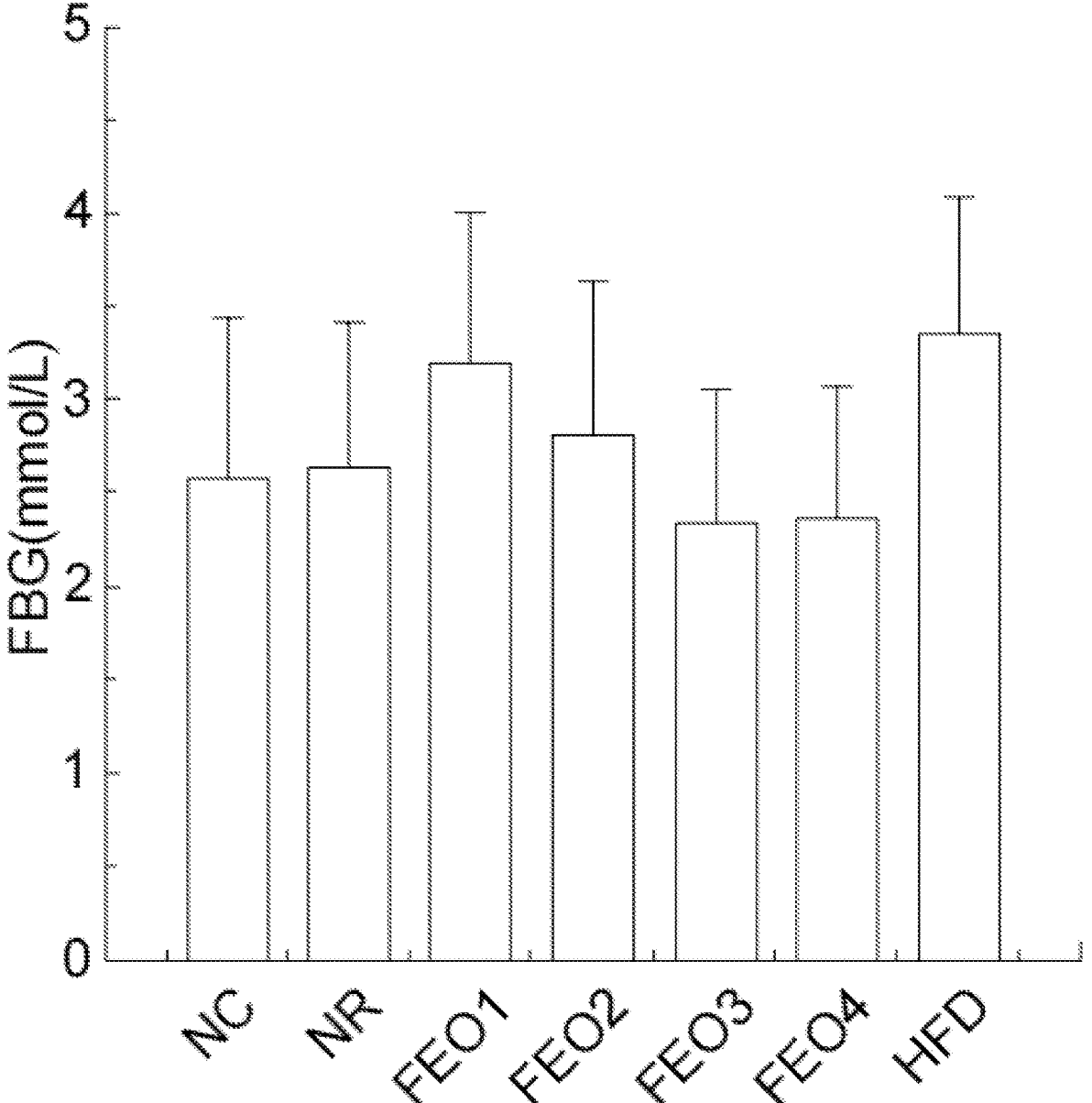
Figure 2D:
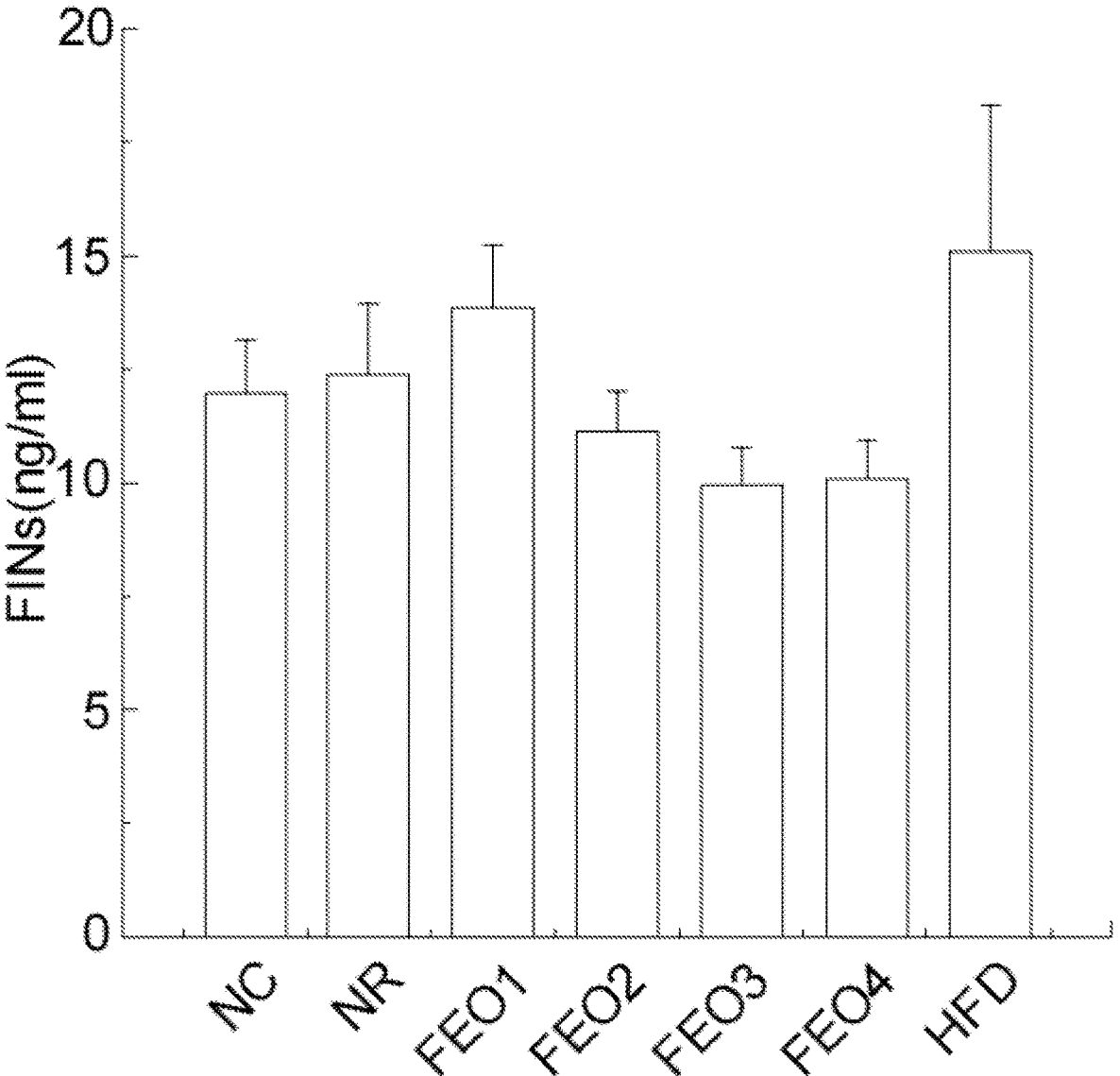

As can been seen from FIG. 1A and FIG. 1B, the fat coefficients of mice in the NC group, NR group, and the FEO4, FEO3, and FEO2 groups were at a low level. The fat coefficient of mice in the FEO4 group was 29.8% lower than in the HFD group, that in the FEO3 group was 48.8% lower than in the HFD group, and that in the FEO3 group was 21.4% lower than in the HFD group, indicating that the FEOs with mass ratios of 4.0, 3.0 and 2.3 for MCFAs to LCFAs, and a mass ratio of 0.5 for linoleic acid to linolenic acid in LCFAs had a significant effect of reducing fat in the body. In the HFD and FEO1 groups, the fat coefficients were at a high level. The decrease of fat coefficient in the FEO1 group was less than 20.0% compared with that in the HFD group, indicating that the effects of the FEOs with a mass ratio of 1.9 for MCFAs to LCFAs and a mass ratio of 0.5 for linoleic acid to linolenic acid in LCFAs in the mice were not significant in decreasing the body fat.

As can be seen from FIG. 1C to FIG. 2B, the effects of the FEOs were greater in mice regarding serum TG, TC and LDL-C levels. The TG, TC and LDL-C levels of mice in the NC group, the NR group, and the FEO4, FEO3 and FEO2 groups were all at low levels. The TG, TC and LDL-C levels of mice in the FEO4 group were 30.3%, 33.3% and 25.7% lower than in the HFD group, respectively, those in the FEO3 group were 35.4%, 39.1% and 29.6% lower than in the HFD group, respectively, and those in the FEO2 group were 21.5%, 22.4% and 20.2% lower than in the HFD group, respectively, indicating that the FEOs with mass ratios of 4.0, 3.0 and 2.3 for MCFAs to LCFAs and a mass ratio of linoleic acid to linolenic acid in LCFAs of 0.5 had a significant effect on lowering blood lipids in mice. The TG, TC and LDL-C levels of mice in the HFD group and the FEO1 group were all at a high level. The decrease in TG, TC and LDL-C levels of mice in the FEO1 group were less than 20.0% compared with those in the HFD group, indicating that the blood lipid lowering effect of the FEO with a mass ratio of 1.9 for MCFAs to LCFAs and a mass ratio of 0.5 for linoleic acid to linolenic acid in LCFAs was not significant.

Glycometabolism is closely related to lipid metabolism, and disorders of lipid metabolism can easily cause disorders of glucometabolism. From FIG. 2C to FIG. 3A, it can be seen that the serum levels of FBG, FINs and HOMA-IR index of mice in the NC group, NR group, FEO4 group, FEO3 group and FEO2 group were all at a normal but low level without significant difference. The levels of FBG, FINs and HOMA-IR index in the FEO4 group were 27.7%, 19.8% and 40.4% lower than in the HFD group, respectively, those in the FEO3 group were 28.6%, 20.8% and 41.9% lower than in the HFD group, respectively, and those in the FEO2 group were 19.5%, 18.8% and 22.7% lower than in the HFD group, respectively, suggesting that FEOs with mass ratios of 4.0, 3.0 and 2.3 for MCFAs to LCFAs and a mass ratio of 0.5 for linoleic to linolenic acid in LCFAs had a significant effect of improving the glucose metabolism in mice. However, the levels of FBG, FINs and HOMA-IR of the mice in the HFD group and the FEO1 group were all at high levels, and the decreases in the levels of FBG and FINs of the mice in the FEO1 group were less than 20.0% compared with those in the HFD group, indicating that the FEOs with a mass ratio of 1.9 for MCFAs to LCFAs, and a mass ratio of 0.5 for linoleic acid to linolenic acid in LCFAs, did not have a significant effect of lowering the blood glucose levels in mice.

Figure 3A:
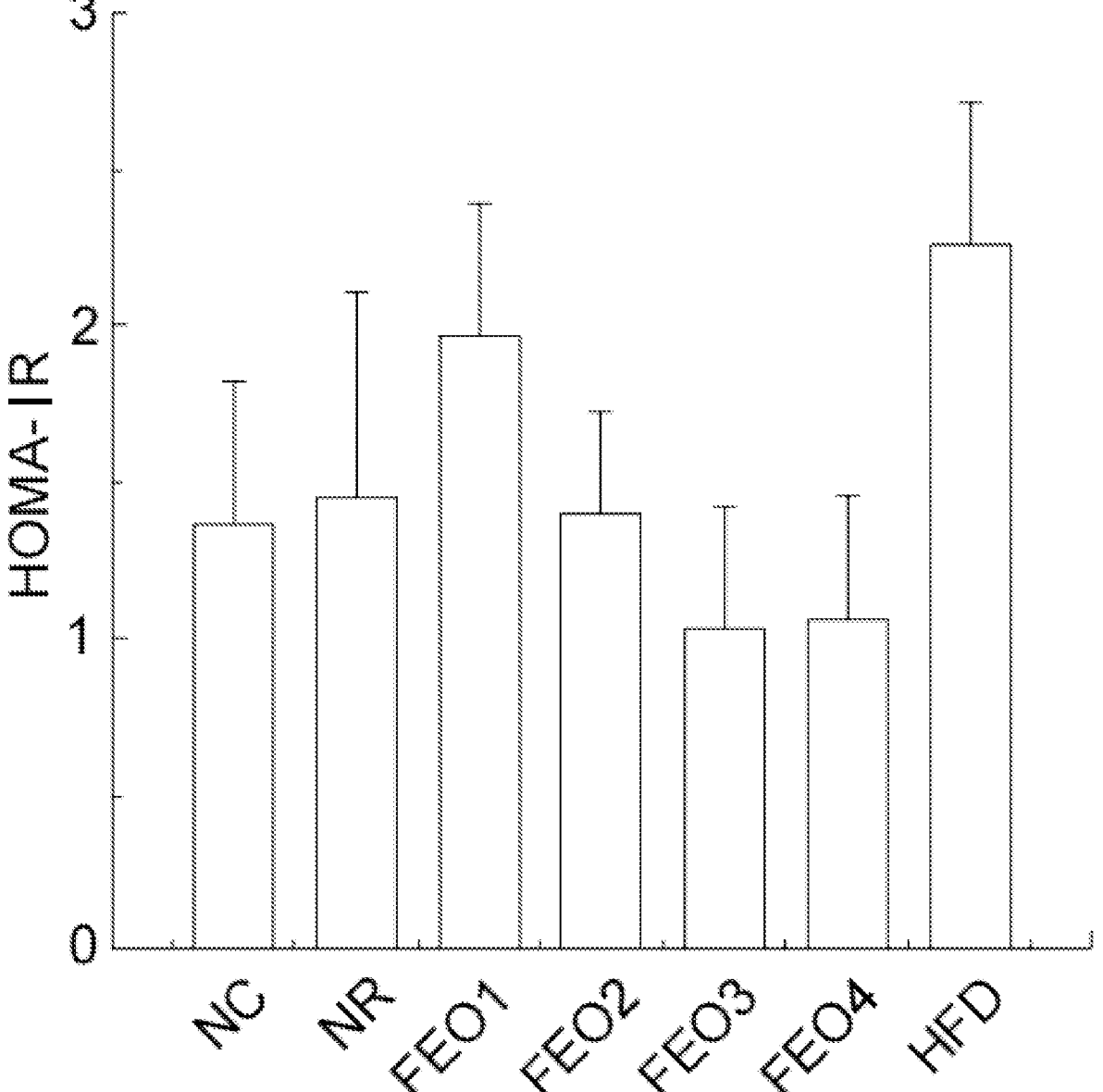
FIGS. 3A-3C shows effects of the mass ratio of MCFAs to LCFAs in the FEO of Example 1 on various indexes of mice in the obesity model, where
Figure 3B:
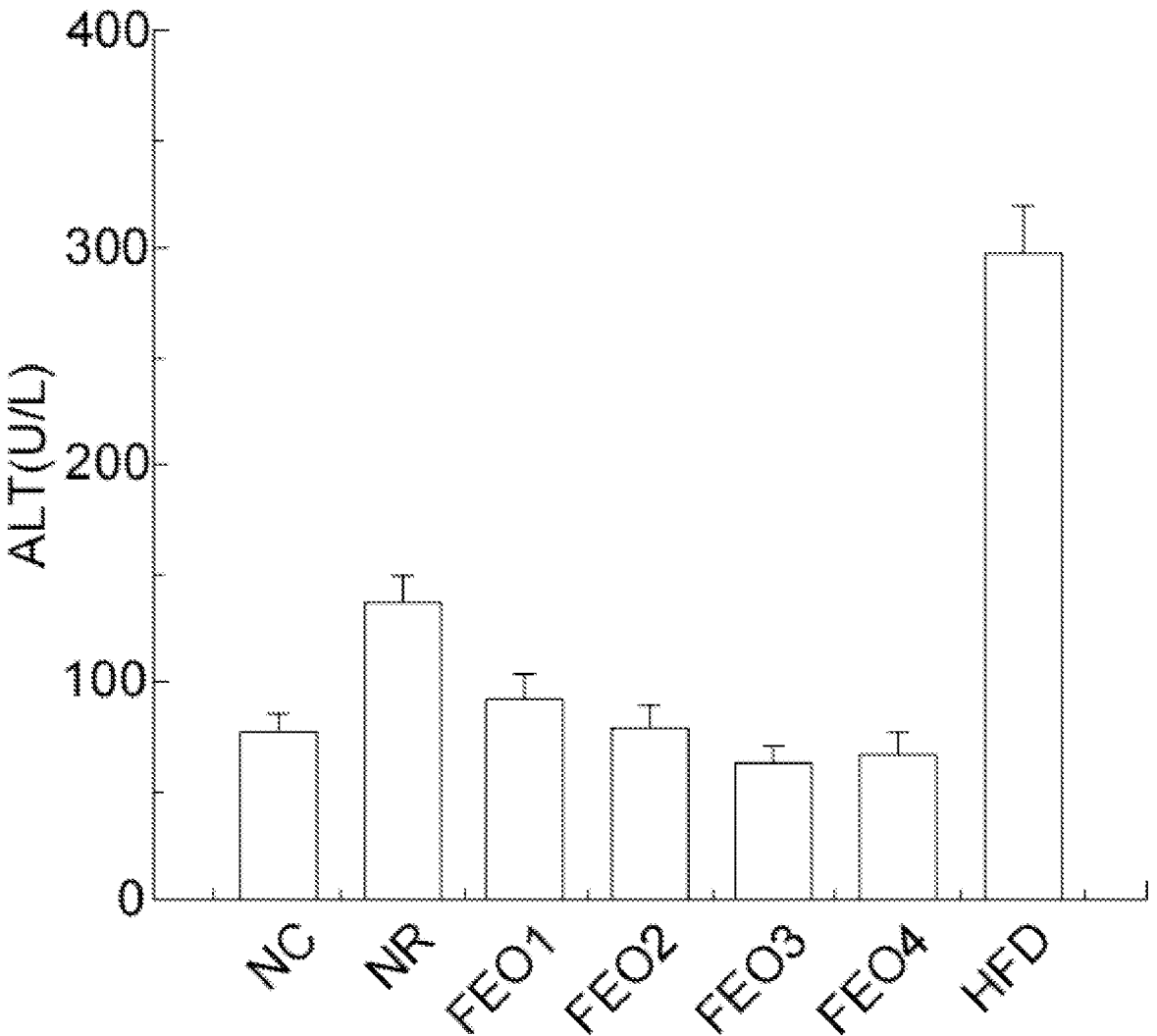
Figure 3C:
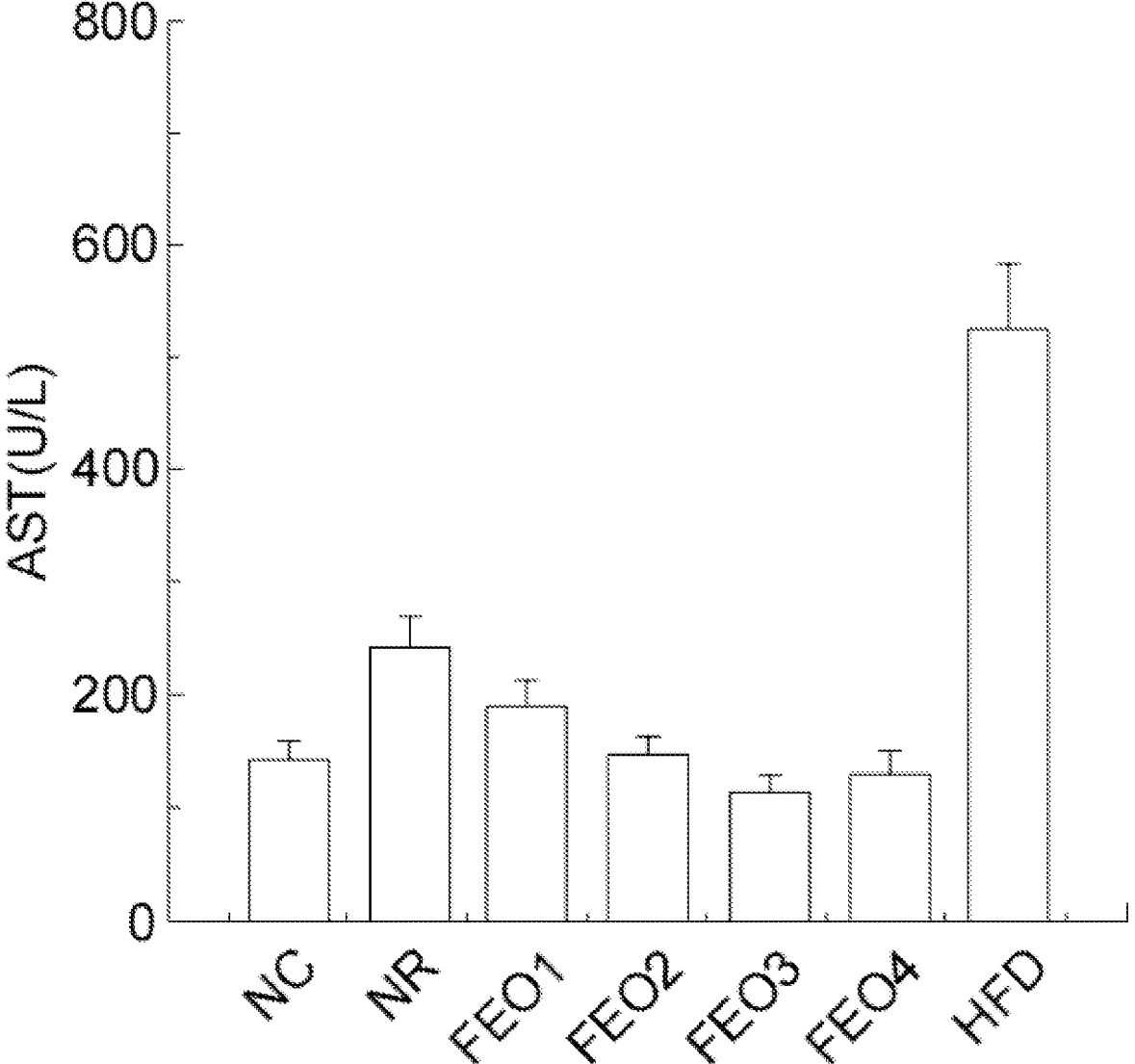

As can be seen from FIGS. 3B and 3C, the FEOs had great effects on serum ALT and AST levels in mice. The ALT and AST levels of mice in the NC group, the NR group and the FEO4, FEO3, FEO2 and FEO1 groups were all at a low level. The ALT and AST levels of mice in the FEO4 group were 77.8% and 75.3% lower than in the HFD group, respectively, those in the FEO3 group were 79.2% and 78.3% lower than in the HFD group, respectively, those in the FEO2 group were 73.9% and 72.1% lower than in the HFD group, respectively, and those in the FEO1 group were 69.4% and 64.3% lower than in the HFD group, respectively, indicating the FEOs with mass ratios of 4.0, 3.0, 2.3, 1.9 for MCFAs to LCFAs and a mass ratio of 0.5 for linoleic acid to linolenic acid in LCFAs had significant effects of repairing the liver injury in mice.

From the comprehensive analysis of FIGS. 1A to 3C, it can be concluded that the FEOs with mass ratios 2.3 to 4.0 for MCFAs to LCFAs and a mass ratio of 0.5 for linoleic acid to linolenic acid in LCFAs 0.5 have significant effects of improving the disorders of glucose and lipid metabolism in mice, in which the FEOs with mass ratios of 3.0-4.0 for MCFAs to LCFAs and a mass ratio of 0.5 for linoleic acid to linolenic acid in LCFAs have the most significant effects on the disorders of glucose and lipid metabolism in mice.

As shown in Tables 6 and 7, the composition of fatty acids in the serum of the obesity model mice was affected by the ratio of MCFAs to LCFAs in the FEOs.

The serum contents of linoleic acid, linolenic acid, ARA, EPA, docosapentaenoic acid (DPA), and docosahexaenoic acid (DHA) in the FEO1, FEO2, FEO3, and FEO4 groups increased by −57.44% to −44.31%, 1824.56% to 2535.09%, −80.53% to −71.14%, 179.53% to 204.68%, 103.03% to 162.42%, and 195.11% to 291.56%, respectively, compared with those in the HFD group.

The serum contents of linoleic acid, linolenic acid, ARA, EPA, DPA, and docosahexaenoic acid (DHA) in the FEO1, FEO2, FEO3, and FEO4 groups increased by −75.52% to −67.98%, 1,641.27% to 2,284.12%, −79.94% to 70.28%, 259.40% to 291.73%, 225.24% to 320.39%, and 25.05% to 65.91%, respectively, compared with those in the NC group.

The above demonstrates that the FEOs with mass ratios of 1.9, 2.3, 3.0, 4.0 for MCFAs to LCFAs and a mass ratio of 0.5 for linoleic acid to linolenic acid in LCFAs may not only regulate the content of linoleic acid and ARA in the serum of mice, but also substantially increase the content of linolenic acid, DPA, EPA, and DHA in the serum of mice. It can efficiently replenish EFAs, and can also be effectively converted into polyunsaturated EFAs and functional fatty acids in the mouse body, thus efficiently supplementing the mouse body with EFAs and functional fatty acids.

After comprehensive comparison of effects of FEOs as to improving the disorders of fat metabolism and efficiently replenishing EFAs and functional fatty acids in mice, it is determined that the mass ratio of MCFAs to LCFAs for FEOs is preferably from 2.3 to 4.0, and the mass ratio of linoleic acid to linolenic acid for FEOs is preferably between 3.0 and 4.0.

Example 2

In this example, with a mass ratio of 3.0 for MCFAs to LCFAs and mass ratios of 0.5, 1.0, 2.0, 4.0 for linoleic acid to linolenic acid, appropriate amounts of CCSKO, soybean oil and linseed oil were weighed and put in different esterification reactors, and 10% (w/w) of *Staphylococcus* caprae-lipase with respect to the mass of the mixed oil was added. The reaction was performed at 40° C. for 4 h with stirring.

After the ternary esterification reaction, the lipase was separated from the reaction solution, and the ternary esterification ratio, the ECN and the freezing point of the FEO were determined. The mass ratio of MCFAs to LCFAs was 3.0, and the mass ratios of linoleic acid to linolenic acid were 0.5, 1.0, 2.0, 4.0, respectively. The ternary transesterification rates were 72.13%, 71.78%, 71.33%, and 70.92%, respectively, the triglyceride content with an ECN of 34-44 was 65.92%, 64.78%, 63.82%, and 65.11%, respectively, and the freezing points were 5.9° C., 6.1° C., 6.4° C., and 6.7° C., respectively, for a series of FEOs. The fatty acid composition and distribution of the FEOs with different mass ratios of MCFAs to LCFAs are shown in Tables 8-1, 8-2, 8-3 and 8-4.

TABLE 8-1

Fatty acid composition and distribution of
FEOs with L/Ln of 0.5 (MCFA/LCFA of 3.0)

| Fatty acid | Content (%, w/w) L/Ln = 0.5 | | |
| --- | --- | --- | --- |
| | Total fatty acids | sn-2 | sn-1,3 |
| Capylic acid (C8:0) | 0.34 ± 0.01 | 0.23 ± 0.01 | 0.40 ± 0.01 |
| Capric acid (C10:0) | 47.32 ± 0.66 | 26.17 ± 0.71 | 57.89 ± 0.53 |
| Lauric acid (CC12:0) | 26.79 ± 0.32 | 17.92 ± 0.25 | 31.23 ± 0.24 |
| Myristic acid (C14:0) | 0.56 ± 0.01 | 1.06 ± 0.02 | 0.31 ± 0.02 |
| Palmitic acid (C16:0) | 2.59 ± 0.04 | 6.11 ± 0.04 | 0.83 ± 0.01 |
| Stearic acid (C18:0) | 1.41 ± 0.02 | 2.22 ± 0.01 | 1.01 ± 0.01 |
| Oleic acid (C18:1) | 5.72 ± 0.08 | 12.95 ± 0.16 | 2.10 ± 0.19 |
| Linoleic acid (C18:2) | 5.30 ± 0.12 | 12.47 ± 0.13 | 1.71 ± 0.02 |
| α-Linolenic acid (C18:3n-3) | 9.97 ± 0.54 | 20.87 ± 0.02 | 4.52 ± 0.08 |
| Saturated fat acid (ΣSFA) | 79.01 ± 0.12 | 53.71 ± 0.21 | 91.66 ± 0.26 |
| Unsaturated fatty acid (ΣUSFA) | 20.99 ± 0.09 | 46.29 ± 0.03 | 8.34 ± 0.02 |
| Medium-chain fatty acid (ΣMCFA) | 74.45 ± 0.16 | 44.32 ± 0.18 | 89.52 ± 0.18 |
| Long-chain fatty acid (ΣLCFA) | 25.55 ± 0.01 | 55.68 ± 0.01 | 10.48 ± 0.02 |

Note:
L/Ln represents the mass ratio of linoleic acid and linolenic acid, and MCFA/LCFA represents the mass ratio of MCFAs to LCFAs.

TABLE 8-2

Fatty acid composition and distribution of
FEOs with L/Ln of 1.0 (MCFA/LCFA of 3.0)

| Fatty acid | Content (%, w/w) L/Ln = 1.0 | | |
| --- | --- | --- | --- |
| | Total fatty acids | sn-2 | sn-1,3 |
| Capylic acid (C8:0) | 0.31 ± 0.01 | 0.21 ± 0.01 | 0.36 ± 0 |
| Capric acid (C10:0) | 46.94 ± 2.45 | 26.39 ± 0.49 | 57.21 ± 0.61 |
| Lauric acid (CC12:0) | 27.73 ± 1.88 | 18.15 ± 0.35 | 32.52 ± 0.67 |
| Myristic acid (C14:0) | 0.57 ± 0.04 | 1.07 ± 0.03 | 0.32 ± 0.01 |
| Palmitic acid (C16:0) | 2.91 ± 0.55 | 7.39 ± 0.51 | 0.67 ± 0.03 |
| Stearic acid (C18:0) | 1.15 ± 0.02 | 2.08 ± 0.04 | 0.68 ± 0.01 |
| Oleic acid (C18:1) | 5.86 ± 0.49 | 13.59 ± 0.11 | 1.99 ± 0.09 |
| Linoleic acid (C18:2) | 7.37 ± 1.76 | 15.65 ± 0.76 | 3.23 ± 0.56 |
| α-Linolenic acid (C18:3n-3) | 7.16 ± 1.33 | 15.47 ± 0.05 | 3.01 ± 0.05 |
| Saturated fat acid (ΣSFA) | 79.61 ± 2.78 | 55.29 ± 0.22 | 91.77 ± 0.18 |
| Unsaturated fatty acid (ΣUSFA) | 20.39 ± 2.01 | 44.71 ± 0.27 | 8.23 ± 0.11 |

TABLE 8-2-continued

Fatty acid composition and distribution of
FEOs with L/Ln of 1.0 (MCFA/LCFA of 3.0)

| | Content (%, w/w) | | |
| | L/Ln = 1.0 | | |
| Fatty acid | Total fatty acids | sn-2 | sn-1,3 |
| --- | --- | --- | --- |
| Medium-chain fatty acid (ΣMCFA) | 74.98 ± 1.98 | 44.75 ± 0.15 | 90.09 ± 0.22 |
| Long-chain fatty acid (ΣLCFA) | 25.02 ± 1.76 | 55.25 ± 0.21 | 9.91 ± 0.22 |

Note:
L/Ln represents the mass ratio of linoleic acid and linolenic acid, and MCFA/LCFA represents the mass ratio of MCFAs to LCFAs.

TABLE 8-3

Fatty acid composition and distribution of
FEOs with L/Ln of 2.0 (MCFA/LCFA of 3.0)

| | Content (%, w/w) | | |
| | L/Ln = 2.0 | | |
| Fatty acid | Total fatty acids | sn-2 | sn-1,3 |
| --- | --- | --- | --- |
| Capylic acid (C8:0) | 0.32 ± 0.02 | 0.26 ± 0.01 | 0.35 ± 0.01 |
| Capric acid (C10:0) | 47.02 ± 0.66 | 26.31 ± 0.59 | 57.37 ± 0.39 |
| Lauric acid (CC12:0) | 27.51 ± 0.41 | 18.47 ± 0.41 | 32.03 ± 0.31 |
| Myristic acid (C14:0) | 0.57 ± 0.01 | 1.04 ± 0.02 | 0.34 ± 0.03 |
| Palmitic acid (C16:0) | 2.91 ± 0.02 | 7.34 ± 0.05 | 0.70 ± 0.02 |
| Stearic acid (C18:0) | 0.95 ± 0.03 | 1.99 ± 0.02 | 0.43 ± 0.01 |
| Oleic acid (C18:1) | 5.49 ± 0.09 | 12.17 ± 0.31 | 2.15 ± 0.19 |
| Linoleic acid (C18:2) | 10.2 ± 0.72 | 21.06 ± 0.12 | 4.77 ± 0.11 |
| α-Linolenic acid (C18:3n-3) | 5.03 ± 0.24 | 11.36 ± 0.01 | 1.86 ± 0.07 |
| Saturated fat acid (ΣSFA) | 79.28 ± 0.11 | 55.41 ± 0.17 | 91.21 ± 0.18 |
| Unsaturated fatty acid (ΣUSFA) | 20.72 ± 0.05 | 44.59 ± 0.02 | 8.79 ± 0.03 |
| Medium-chain fatty acid (ΣMCFA) | 74.85 ± 0.21 | 45.04 ± 0.27 | 89.75 ± 0.13 |
| Long-chain fatty acid (ΣLCFA) | 25.15 ± 0.01 | 54.96 ± 0.01 | 10.25 ± 0.01 |

Note:
L/Ln represents the mass ratio of linoleic acid and linolenic acid, and MCFA/LCFA represents the mass ratio of MCFAs to LCFAs.

TABLE 8-4

Fatty acid composition and distribution of
FEOs with L/Ln of 4.0 (MCFA/LCFA of 3.0)

| | Content (%, w/w) | | |
| | L/Ln = 4.0 | | |
| Fatty acid | Total fatty acids | sn-2 | sn-1,3 |
| --- | --- | --- | --- |
| Capylic acid (C8:0) | 0.32 ± 0.01 | 0.23 ± 0.01 | 0.36 ± 0.01 |
| Capric acid (C10:0) | 47.03 ± 0.57 | 26.41 ± 0.72 | 57.34 ± 0.53 |
| Lauric acid (CC12:0) | 27.79 ± 0.44 | 18.71 ± 0.51 | 32.33 ± 0.39 |
| Myristic acid (C14:0) | 0.54 ± 0.02 | 1.05 ± 0.01 | 0.29 ± 0.02 |
| Palmitic acid (C16:0) | 3.31 ± 0.02 | 8.18 ± 0.05 | 0.87 ± 0.02 |
| Stearic acid (C18:0) | 0.96 ± 0.01 | 1.97 ± 0.06 | 0.45 ± 0.03 |
| Oleic acid (C18:1) | 5.52 ± 0.08 | 12.81 ± 0.31 | 1.88 ± 0.16 |
| Linoleic acid (C18:2) | 11.52 ± 0.65 | 23.88 ± 0.19 | 5.34 ± 0.09 |
| α-Linolenic acid (C18:3n-3) | 3.01 ± 0.13 | 6.76 ± 0.02 | 1.14 ± 0.03 |
| Saturated fat acid (ΣSFA) | 79.95 ± 0.17 | 56.55 ± 0.13 | 91.65 ± 0.16 |

TABLE 8-4-continued

Fatty acid composition and distribution of
FEOs with L/Ln of 4.0 (MCFA/LCFA of 3.0)

| | Content (%, w/w) | | |
| | L/Ln = 4.0 | | |
| Fatty acid | Total fatty acids | sn-2 | sn-1,3 |
| --- | --- | --- | --- |
| Unsaturated fatty acid (ΣUSFA) | 20.05 ± 0.03 | 43.45 ± 0.03 | 8.35 ± 0.05 |
| Medium-chain fatty acid (ΣMCFA) | 75.14 ± 0.15 | 45.35 ± 0.19 | 90.03 ± 0.13 |
| Long-chain fatty acid (ΣLCFA) | 24.86 ± 0.01 | 54.65 ± 0.02 | 9.97 ± 0.03 |

Note:
L/Ln represents the mass ratio of linoleic acid and linolenic acid, and MCFA/LCFA represents the mass ratio of MCFAs to LCFAs.

3-4-week-old male C57BL/6 mice weighing 13-16 grams were used for the experiment. During the experiment, the mice were fed in standard cages with free access to food and water, in 12 h/12 h day/night light cycle, at 23±2° C. and 40-60% humidity. After one week of acclimatisation, the mice were randomly divided into two groups: 10 mice were fed AIN-93M as the NC group and 60 mice were fed D12451 as the HFD group. After 8 weeks of feeding, the mice were weighed for recording. The mice in the HFD group that were at least 20% heavier than the average weight of the mice in the NC group were selected as the nutritional obesity model mice and used in the subsequent experiments.

After the modeling, the mice in the HFD group were randomly divided into 6 groups according to their body weight, namely the HFD group, the NR group, and 4 FEO groups with a mass ratio of 3.0 for MCFAs to LCFAs and mass ratios of 0.5, 1.0, 2.0, and 4.0 for linoleic acid to linolenic acid, respectively (FEO5, FEO6, FEO7, FEO8), and the mice were fed continuously for 10 weeks. The HFD group was fed high-fat diet continuously, the NR group was fed normal chow, and the four FEO groups were fed high-fat functional edible oil diet (H-FEO) with a mass ratio of 3.0 for MCFAs to LCFAs and mass ratios of 0.5, 1.0, 2.0, and 4.0 for linoleic acid to linolenic acid in LCFAs, respectively. The mice in NC group were fed normal chow AIN-93M until the end of the experiment. The specific feed formulations used during the experiment are shown in Tables 1-1, 1-2 and 1-3.

At the end of the experiment, the final body weight of the mice was weighed and recorded, the blood was collected, and serum was separated. Serum concentrations of TG, TC, LDL-C, HDL-C, as well as levels of FBG and FINs, etc., were measured. Peritesticular fat and perirenal fat were separated and weighed, and the sum of peritesticular fat and perirenal fat was taken as the abdominal fat mass, and the fat coefficient (percentage of fat to body weight) and HOMA-IR (HOMA-IR=[(FBG (mmol/L)×FINs (ng/ml)]/22.5) were calculated.

At the end of the animal test, liver and adipose tissues of mice in the NC, HFD and FEO5 groups were promptly extracted. Factors or proteins affecting triglyceride and fatty acid synthesis, and those related to triglyceride catabolism, to fatty acid β-oxidation, and to browning/beiging of white adipose tissue was determined and analyzed by molecular biology and biochemistry assays to identify the pathways and mechanisms by which the function edible oils improve glucose and lipid metabolism disorders.

The data were processed using the SPSS19.0 statistical software package (SPSS Inc., Chicago, IL, USA), and the results of the animal experiments are shown in Tables 6 and 9 and FIGS. 4A through 6C.

TABLE 9

Effect of L/Ln of FEOs on serum fatty acids in obesity model mice

| | Content (%, w/w) | | | |
|---|---|---|---|---|
| Fatty acid | FEO5 (L/Ln = 0.5) | FEO6 (L/Ln = 1.0) | FEO7 (L/Ln = 2.0) | FEO8 (L/Ln = 4.0) |
| Capylic acid (C8:0) | 0.04 ± 0.01 | 0.03 ± 0.01 | 0.04 ± 0.01 | 0.03 ± 0.01 |
| Capric acid (C10:0) | 32.53 ± 3.13 | 33.11 ± 4.17 | 32.16 ± 3.15 | 31.47 ± 5.12 |
| Lauric acid (CC12:0) | 18.33 ± 2.11 | 17.27 ± 4.12 | 19.04 ± 3.13 | 18.36 ± 2.14 |
| Myristic acid (C14:0) | 0.27 ± 0.01 | 0.36 ± 0.02 | 0.26 ± 0.01 | 0.15 ± 0.03 |
| Palmitic acid (C16:0) | 3.66 ± 0.14 | 4.46 ± 0.28 | 4.03 ± 0.21 | 3.98 ± 0.52 |
| Stearic acid (C18:0) | 2.12 ± 0.12 | 2.23 ± 0.17 | 1.96 ± 0.24 | 2.37 ± 0.15 |
| Oleic acid (C18:1) | 4.86 ± 0.22 | 5.17 ± 0.21 | 5.57 ± 0.38 | 5.62 ± 0.36 |
| Linoleic acid (C18:2) | 6.42 ± 1.02 | 9.55 ± 145 | 12.12 ± 1.96 | 14.15 ± 2.28 |
| α-Linolenic acid (C18:3n-3) | 11.96 ± 0.44 | 8.94 ± 0.31 | 6.19 ± 0.27 | 4.62 ± 0.24 |
| Eicosatrienoic acid (C20:2) | 0.14 ± 0.03 | 0.21 ± 0.02 | 0.36 ± 0.06 | 0.72 ± 0.05 |
| Eicosatrienoic acid (C20:3) | 0.21 ± 0.04 | 0.47 ± 0.06 | 0.17 ± 0.07 | 0.96 ± 0.05 |
| Arachidonic acid (ARA) (C20:4) | 2.93 ± 1.14 | 4.29 ± 0.26 | 5.39 ± 0.23 | 6.71 ± 0.11 |
| Eicosapentaenoic acid (EPA) (C20:5) | 4.81 ± 0.66 | 3.82 ± 0.83 | 2.78 ± 0.76 | 2.32 ± 0.57 |
| Docosadienoic Acid (C22:2) | 0.16 ± 0.05 | 0.21 ± 0.06 | 0.36 ± 0.04 | 0.47 ± 0.05 |
| Docosatetraenoic acid (C22:4) | 0.49 ± 0.08 | 0.53 ± 0.09 | 0.73 ± 0.05 | 0.92 ± 0.04 |
| Docosapentaenoic Acid (C22:5) | 3.71 ± 0.27 | 3.14 ± 0.29 | 2.82 ± 0.25 | 2.42 ± 0.23 |
| Docosahexaenoic Acid (DHA) (C22:6) | 7.36 ± 0.12 | 6.51 ± 0.45 | 5.42 ± 0.66 | 4.73 ± 0.53 |

Note:
L/Ln represents the mass ratio of linoleic acid and linolenic acid.

As can been seen from FIG. 4A and FIG. 4B, the fat coefficients of mice in the NC, NR, FEO5, FEO6, FEO7, and FEO8 groups were at a low level. The fat coefficient of mice in the FEO8 group was 21.4300 lower than in the HFD group, that in the FEO7 group was 36.1300 lower than in the HFD group, that in the FEO6 group was 42.86% lower than in the HFD group, and that in the FEO6 group was 48.81% lower than in the HFD group, indicating that the FEOs with a mass ratio of 3.0 for MCFAs to LCFAs and mass ratios of 4.0, 2.0, 1.0 and 0.5 for linoleic acid to linolenic acid in LCFAs, had a significant effect of reducing fat in the mouse body.

As can be seen from FIG. 4C to FIG. 5B, the effects of the FEOs were greater in mice regarding serum TG, TC and LDL-C levels. The TG, TC and LDL-C levels of mice in the NC, NR, FEO5, and FEO6 groups were all at a low level. The TG, TC and LDL-C levels of mice in the FEO5 group were 30.2%, 30.0% and 44.7% lower than in the HFD group, respectively, and those in the FEO6 group were 29.2%, 29.4% and 42.8% lower than in the HFD group, respectively, indicating that FEOs with a mass ratio of 3.0 for MCFAs to LCFAs and mass ratios of 0.5 and 1.0 for linoleic acid to linolenic acid in LCFAs, had a significant effect on lowering blood lipids in mice. The decrease in TG and TC levels of mice in the FEO7 group were less than 20.0% compared with those in the HFD group. The TG, TC and LDL-C levels of mice in the FEO8 group were all at a high level, and decreased less than 20.0% compared with those in the HFD group. These indicated that the blood lipid lowering effect of the FEOs with a mass ratio of 3.0 for MCFAs to LCFAs and mass ratios of 2.0 and 4.0 for linoleic acid to linolenic acid in LCFAs was not significant.

As can be seen from FIGS. 6B and 6C, the FEOs had great effects on serum ALT and AST levels in mice. The ALT and AST levels of mice in the NC group, the NR group and the FEO5, FEO6, FEO7 and FEO8 groups were all at a low level. The ALT and AST levels of mice in the FEO5 group were 79.2% and 78.3% lower than in the HFD group, respectively, those in the FEO6 group were 75.2% and 73.5% lower than in the HFD group, respectively, those in the FEO7 group were 70.2% and 66.8% lower than in the HFD group, respectively, and those in the FEO8 group were 69.8% and 65.0% lower than in the HFD group, respectively, indicating the FEOs with a mass ratio of 3.0 for MCFAs to LCFAs and mass ratios of 0.5 to 4.0 for linoleic acid to linolenic acid in LCFAs had significant effects of repairing the liver injury in mice.

Glycometabolism is closely related to lipid metabolism, and disorders of lipid metabolism can easily cause disorders of glucometabolism. From FIG. 5C, 5D and FIG. 6A, it can be seen that the serum levels of FBG, FINs and HOMA-IR index of mice in the NC, NR, FEO5, and FEO6 groups were all at normal but low levels without significant difference. The levels of FBG, FINs and HOMA-IR index in the FEO5 group were 30.1%, 34.2% and 54.1% lower than in the HFD group, respectively, and those in the FEO6 group were 26.6%, 28.11% and 47.2% lower than in the HFD group, respectively, suggesting that FEOs with a mass ratio of 3.0 for MCFAs to LCFAs and mass ratios of 0.5 and 1.0 for linoleic acid to linolenic acid in LCFAs had a significant effect of improving the glucose metabolism in mice. However, the levels of FBG, FINs and HOMA-IR of the mice in the HFD, FEO7 and FEO8 groups were all at high levels, and the decreases in the levels of FBG and FINs were less than 20.0% compared with those in the HFD group, indicating that the FEOs with a mass ratio of 3.0 for MCFAs to LCFAs and mass ratios of 2.0 and 4.0 for linoleic acid to linolenic acid in LCFAs, did not have a significant effect of lowering the blood glucose levels in mice.

From the comprehensive analysis of FIGS. 4A to 6C, it can be concluded that the FEOs with a mass ratio of 3.0 for MCFAs to LCFAs and mass ratios of 0.5 to 2.0 for linoleic acid to linolenic acid in LCFAs have significant effects of improving the disorders of glucose and lipid metabolism in mice, in which the FEOs with a mass ratio of 3.0 for MCFAs to LCFAs and a mass ratio of 0.5 for linoleic acid to linolenic acid in LCFAs have the most significant effects on the disorders of glucose and lipid metabolism in mice.

As shown in Tables 6 and 9, the composition of fatty acids in the serum of the obesity model mice was affected by the FEOs.

The serum contents of linoleic acid, linolenic acid, ARA, EPA, DPA, and DHA in the FEO1, FEO2, FEO3, and FEO4 groups increased by −51.29% to 7.36%, 710.53% to 1998.25%, −79.18% to −52.31%, 35.67% to 181.29%, 46.67% to 124.85%, and 110.22% to 227.11%, respectively, compared with those in the HFD group.

The serum contents of linoleic acid, linolenic acid, ARA, EPA, DPA, and docosahexaenoic acid (DHA) in the FEO1, FEO2, FEO3, and FEO4 groups increased by −71.99% to −38.26%, 633.33% to 1798.41%, 78.55% to 50.88%, 74.44% to 261.65%, 134.95% to 260.19%, and −10.92% to 38.61%, respectively, compared with those in the NC group.

The above demonstrates that the FEOs with a mass ratio of 3.0 for MCFAs to LCFAs and mass ratios of 0.5, 1.0, 2.0, and 4.0 for linoleic acid to linolenic acid in LCFAs may not only regulate the content of linoleic acid and ARA in the serum of mice, but also substantially increase the content of linolenic acid, DPA, EPA, and DHA in the serum of mice. It can efficiently replenish EFAs, and can also be effectively converted into polyunsaturated EFAs and functional fatty acids in the mouse body, thus efficiently supplementing the mouse body with EFAs and functional fatty acids.

After comprehensive comparison of effects of FEOs as to improving the disorders of fat metabolism and efficiently replenishing EFAs and functional fatty acids in mice, it is determined that the mass ratio of MCFAs to LCFAs for FEOs is preferably from 0.5 to 2.0, and the mass ratio of linoleic acid to linolenic acid for FEOs is preferably between 0.5 to 1.0.

The results of the molecular biological and biochemical experiments showed that the secretion of norepinephrine (NE) in the serum of the FEO5 group was 90.91% higher; the expression of brain-derived neurotrophic factor (BDNF) in the hypothalamus of the FEO5 group was 39.92% higher; in interscapular adipose tissue (brown adipose tissue), inguinal adipose tissue (beige adipose tissue) and epididymal adipose tissue (white adipose tissue) of the FEO5 group, the expressions of the browning-associated protein, uncoupling protein 1 (UCP1), were 44.66%, 39.06% and 8.04% higher, respectively, the expressions of iodothyronine deiodinase II (Dio2) in the FEO5 group were 48.20%, 42.83% and 30.06% higher, respectively, the expressions of PR structural domain protein 16 (PRDM16) were 24.84%, 22.20% and 79.71% higher, respectively, the expressions of cell death-induced DFFA-like effector protein A (CIDEA) were 63.14%, −6.88% and 14.19% higher, respectively; the expressions of TBX1 in interscapular adipose tissue (brown adipose tissue), inguinal adipose tissue (beige adipose tissue) and epididymal adipose tissue (white adipose tissue) of the FEO5 group mice were 49.01% and 88.29% higher, respectively; the expressions of β3-adrenergic receptor (β3-AR) in interscapular adipose tissue (brown adipose tissue), groin adipose tissue t (beige adipose tissue) and epididymal fat (white adipose tissue) of the FEO5 group mice were 78.63%, 10.19% and 35.71% higher, respectively; in the livers of mice in the FEO5 group, the expressions of the proteins affecting the synthesis of triglycerides and fatty acids, namely, sterol regulatory element binding proteins-1c (SREBP-1c), acetyl-coA carboxylase 1 (ACC1), and fatty acid synthase (FAS), were reduced by 53.26%, 108.46%, and 92.40%, respectively, the expressions of proteins affecting the breakdown of triglycerides, namely triglyceride lipase (ATGL), hormone-sensitive lipase (HSL), and lipoprotein lipase (LPL), were increased by 36.32%, 22.70%, and 39.15%, respectively, and the expressions of fatty acid β-oxidation related proteins, namely peroxisome proliferator-activated receptor a (PPARα) and carnitine palmitoyl-transferase 1α (CPT-1α) were increased by 27.71% and 49.92%, respectively; in the adipose tissue of the FEO5 group, the expressions of SREBP-1c and ACC1, and FAS, proteins affecting the synthesis of triglycerides and fatty acids, decreased by 29.34%, 14.32%, and 22.34%, respectively, the expressions of the proteins affecting the catabolism of triglyceride, namely ATGL, HSL, and LPL increased by 19.89%, 13.95%, 24.90%, respectively, and the expressions of PPARα and CPT-1α, which are proteins affecting the fatty acid β-oxidation, were increased by 13.40%, and 31.83%, respectively, as compared with those in the HFD group.

Example 3

In this example, with a mass ratio of 3.0 for MCFAs to LCFAs and a mass ratio of 0.5 for linoleic acid to linolenic acid, appropriate amounts of CCSKO, soybean oil and linseed oil were weighed and put in different esterification reactors, and 10% (w/w) of *Staphylococcus caprae* lipase with respect to the mass of the mixed oil was added. The reaction was performed at 40° C. for 4 h with stirring. After the ternary esterification reaction, the lipase in the reaction solution was separated, and an FEO with a mass ratio of 3.0 for MCFAs to LCFAs and a mass ratio of 0.5 for linoleic acid to linolenic acid, was obtained.

3-4-week-old male C57BL/6 mice weighing 13-16 grams were used for the experiment. During the experiment, the mice were fed in standard cages with free access to food and water, in 12 h/12 h day/night light cycle, at 23±2° C. and 40-60% humidity. After one week of acclimatisation, the mice were randomly divided into two groups: 10 mice were fed AIN-93M as the NC group and 50 mice were fed D12451 as the HFD group. After 8 weeks of feeding, the mice were weighed for recording. The mice in the HFD group that were at least 20% heavier than the average weight of the mice in the NC group were selected as the nutritional obesity model mice and used in the subsequent experiments.

After the modeling, the mice in the HFD group were randomly divided into 6 groups according to their body weight, namely the HFD group, the NR group, and 4 FEO groups (FEO9, FEO10, FEO11, FEO12), and the mice were fed continuously for 10 weeks. The HFD group was fed high-fat diet continuously, the NR group was fed normal chow, the FEO9 group was fed medium-fat functional edible oil diet (M-FEO), the FEO10 group was fed medium-high-fat functional edible oil diet (MH-FEO), the FEO11 group was fed high-fat functional edible oil diet (H-FEO), and the FEO12 group was fed extremely-high-fat functional edible oil diet (EH-FEO). The mice in NC group were fed normal chow AIN-93M until the end of the experiment. The specific feed formulations used during the experiment are shown in Tables 1-1, 1-2 and 1-3.

At the end of the experiment, the final body weight of the mice was weighed and recorded, the blood was collected, and serum was separated. Serum concentrations of TG, TC, LDL-C, HDL-C, as well as levels of FBG, FINs, etc., were measured. Peritesticular fat and perirenal fat were separated and weighed, and the sum of peritesticular fat and perirenal fat was taken as the abdominal fat mass, and the fat coefficient (percentage of fat to body weight) and HOMA-IR (HOMA-IR=[(FBG (mmol/L)×FINs (ng/ml)]/22.5) were calculated.

The data were processed using the SPSS19.0 statistical software package (SPSS Inc., Chicago, IL, USA), and the results of the animal experiments are shown in FIGS. 7A to 9C.

The results are shown in FIGS. 7A to 9C.

As can be seen from FIGS. 7A to 9C, the fat coefficient, TG, TC, LDL-C, HDL-C, FBG, FINs, HOMA-IR, ALT, and AST levels of mice in the FEO9 group were reduced by 15.48%, 26.74%, 25.39%, 12.84%, 28.93%, 12.65%, 11.05%, 22.37%, 59.11%, and 58.93% respectively, as compared with those of the mice in the HFD group, respectively. The decreases (improvements) in TG, TC, HDL-C, HOMA-IR, ALT, and AST levels were all over 20%, which was a significant difference, while the decreases (improvements) in fat coefficient, LDL-C, FBG, and FINs levels were less than 20%, which was not a significant difference. Compared with the NC group, the FEO9 group showed high body fat coefficient, ALT, AST, and no significant difference in the levels of TG, TC, LDL-C, HDL-C, FBG, FINs, and HOMA-IR. Compared with the mice in the NR group, there was no significant difference in the levels of TG, LDL-C, HDL-C, FBG, FINs, HOMA-IR, ALT and AST in the FEO9 group, the levels of body fat coefficient of the FEO9 group were high, and the levels of serum TC were low. The results of animal experiments showed that the medium fat functional edible oil feed (M-FEO) (the contents of FEO and energy-producing components were 12.00% and 25.66%, respectively) significantly repaired the liver injury caused by excessive intake of LCTs, and improved liver function. However, it did not significantly reduce the levels of body fat and blood glucose (less than 20%), and it did not significantly improve the disorders of lipid metabolism and glucose metabolism caused by excessive intake of LCTs.

The body fat coefficient, TG, TC, LDLC, HDL-C, FBG, FINs, HOMA-IR, ALT and AST levels of the FEO10 group were reduced by 35.12%, 36.63%, 28.02%, 19.84%, 36.55%, 21.47%, 22.96%, 41.05%, 68.92%, and 68.85%, respectively, and the decreases (improvements) were all at least 20%, which was significant, as compared with those of the mice in the HFD group. There were no significant differences in the body fat coefficient, TG, TC, LDL-C, HDL-C, FBG, FINs, HOMA-IR, ALT and AST levels in the FEO10 group, as compared with those in the NC group. There were no significant differences in body fat coefficient, TG, TC, LDL-C, HDL-C, FBG, FINs, HOMA-IR, ALT, and AST levels in the FEO10 group, as compared to those of the mice in the NR group. The results of these animal experiments showed that the MH-FEO (the contents of FEO and energy-producing components were 18.00% and 35.93%, respectively) significantly improved the disorders of lipid metabolism and glucose metabolism induced by the excessive intake of LCTs and carbohydrates, significantly repaired the liver injury induced by the excessive intake of LCTs and carbohydrates and improved liver function.

The body fat coefficient, TG, TC, LDL-C, HDL-C, FBG, FINs, HOMA-IR, ALT and AST levels of the mice in the FEO11 group were reduced by 48.81%, 39.53%, 35.38%, 30.35%, 41.62%, 30.00%, 34.21%, 53.68%, 79.16%, and 78.32% respectively, with decreases (improvements) being at least 20%, which were very significant, as compared with those of the mice in the HFD group. The TC and LDL-C levels of FEO11 mice were significantly reduced, and there were no significant differences in the levels of body fat coefficient, TG, HDL-C, FBG, FINs, HOMATR, ALT and AST, as compared with those in the NC group. Compared with mice in the NR group, mice in the FEO11 group had significantly lower levels of TC, LDL-C, FBG, FINs, HOMA-IR, ALT, and AST, and there were no significant differences in body fat coefficients, TG, and HDL-C levels. The results of these animal experiments showed that the high-fat functional edible oil feed (H-FEO) (the contents of FEO and energy-producing components were 24.00% and 45.00%, respectively) not only significantly improved the lipid metabolism and glucose metabolism disorders induced by the excessive intake of LCTs and carbohydrates, but also repaired liver injury induced by the excessive intake of LCTs and carbohydrates and improved liver function.

The body fat coefficient, TG, TC, LDL-C, HDL-C, FBG, FINs, HOMA-IR, ALT and AST levels of the mice in the FEO12 group were reduced by 51.37%, 42.56%, 38.61%, 33.09%, 44.54%, 33.64%, 37.46%, 56.51%, 80.20%, and 79.40%, respectively, with the decreases (improvement) being at least 20%, which was very significant, as compared with those of the mice in the HFD group. The TC and LDL-C levels of FEO12 mice were significantly reduced, and there were no significant differences in the levels of body fat coefficient, TG, HDL-C, FBG, FINs, HOMATR, ALT and AST, as compared with the NC group. Compared with mice in the NR group, mice in the FEO12 group had significantly lower levels of TC, LDL-C, FBG, FINs, HOMA-IR, ALT, and AST, and there were no significant differences in body fat coefficients, TG, and HDL-C levels. The results of these animal experiments showed that EH-FEO feed (the contents of FEO and energy-producing components were 30.00% and 52.86%, respectively) not only significantly improved the lipid metabolism and glucose metabolism disorders induced by the excessive intake of LCTs and carbohydrates, but also repaired liver injury induced by the excessive intake of LCTs and carbohydrates and improved liver function.

From the comprehensive analysis of the growth of mice in FEO9, FEO10, FEO11 and FEO12 groups, it can be seen that the FEO with a mass ratio of 3.0 for MCFAs to LCFAs and a mass ratio of 0.5 for linoleic acid to linolenic acid in LCFAs could significantly improve the disorders of gly-colipid metabolism of the mice, and the higher the content of the FEOs in the food, the more the FEOs improved the disorders of glycolipid metabolism of the mice. The effect of improving the disorder of glycolipid metabolism and repairing liver injury in mice was observed when the content of FEO in feed was 18% or more. The effect of improving the disorder of glycolipid metabolism and repairing liver injury in mice was even more significant when the content of FEO in feed was 24% or more.

Example 4

50 g of caprylic acid and 100 g of CCSKO were weighed in a three-necked round-bottomed flask, and the mass ratio of the caprylic acid to the CCSKO was 0.5. The reaction conditions were as follows: 1000 (with respect to the mass of the mixed oil) of *Staphylococcus caprae* lipase was added, and the reaction was carried out in a device with a mechanical stirrer under 4° C. for 4 h. After the reaction was completed, the lipase was removed from the reaction solution by filtration using a qualitative filter paper, and the caprylic/capric/lauric triglyceride was obtained, then the fatty acid composition of which was determined by gas chromatography.

The fatty acid composition and distribution of the caprylic/capric/lauric triglyceride, soybean oil and linseed oil are shown in Tables 10, 3 and 4.

TABLE 10

Fatty acid composition and distribution
of caprylic/capric/lauric triglyceride.

| | Content (%, w/w) Caprylic/capric/lauric triglyceride | | |
| Fatty acid | Total fatty acids | sn-2 | sn-1,3 |
| --- | --- | --- | --- |
| Capylic acid (C8:0) | 31.90 ± 0.57 | 34.81 ± 0.42 | 30.69 ± 0.31 |
| Capric acid (C10:0) | 57.57 ± 0.94 | 58.79 ± 0.79 | 55.30 ± 0.55 |
| Lauric acid (CC12:0) | 10.53 ± 0.73 | 6.40 ± 0.02 | 14.01 ± 0.04 |
| Myristic acid (C14:0) | ND | ND | ND |
| Palmitic acid (C16:0) | ND | ND | ND |
| Stearic acid (C18:0) | ND | ND | ND |
| Oleic acid (C18:1) | ND | ND | ND |
| Linoleic acid (C18:2) | ND | ND | ND |
| α-Linolenic acid (C18:3n-3) | ND | ND | ND |
| Saturated fat acid (ΣSFA) | 100.00 ± 0.00 | 100.00 ± 0.00 | 100.00 ± 0.00 |
| Unsaturated fatty acid (ΣUSFA) | ND | ND | ND |
| Medium-chain fatty acid (ΣMCFA) | 100.00 ± 0.00 | 100.00 ± 0.00 | 100.00 ± 0.00 |
| Long-chain fatty acid (ΣLCFA) | ND | ND | ND |

According to the mass ratio of MCFAs to LCFAs (caprylic/capric/lauric triglyceride/soybean oil and linseed oil) of 3.0 and the mass ratio of L to Ln of 0.5, appropriate amounts of CCSKO, soybean oil and linseed oil were weighed and put in different esterification reactors, and 10% (w/w) of *Staphylococcus caprae* lipase with respect to the mass of the mixed oil was added. The reaction was performed at 40° C. for 4 h with stirring. After the ternary esterification reaction, the lipase in the reaction solution was separated, and an FEO with a mass ratio of 3.0 for MCFAs to LCFAs and a mass ratio of 0.5 for linoleic acid to linolenic acid was obtained.

3-4-week-old male C57BL/6 mice weighing 13-16 grams were used for the experiment. During the experiment, the mice were fed in standard cages with free access to food and water, in 12 h/12 h day/night light cycle, at 23±2° C. and 40-60% humidity. After one week of acclimatization, the mice were randomly divided into two groups: 10 mice were fed AIN-93M as the NC group and 50 mice were fed D12451 as the HFD group. After 8 weeks of feeding, the mice were weighed for recording. The mice in the HFD group that were at least 20% heavier than the average weight of the mice in the NC group were selected as the nutritional obesity model mice and used in the subsequent experiments.

After the modeling, the mice in the HFD group were randomly divided into 6 groups according to their body weight, namely the HFD group, the NR group, and 4 FEO groups with the FEO added at ratios of 50%, 75%, 100, 125%, respectively (FEO13, FEO14, FEO15 and FEO16), and the mice were fed continuously for 10 weeks. The model control group was fed high-fat diet continuously, the NR group was fed normal chow, and the four FEO groups were fed corresponding FEO diets. The mice in NC group were fed normal chow AIN-93M until the end of the experiment. The specific feed formulations used during the experiment are shown in Tables 1-1, 1-2 and 1-3.

At the end of the experiment, the final body weight of the mice was weighed and recorded, the blood was collected, and serum was separated. Serum concentrations of TG, TC, LDL-C, HDL-C, as well as levels of FBG, FINs, etc., were measured. Peritesticular fat and perirenal fat were separated and weighed, and the sum of peritesticular fat and perirenal fat was taken as the abdominal fat mass, and the fat coefficient (percentage of fat to body weight) and HOMA-IR (HOMA-IR=[(FBG (mmol/L)×FINs (ng/ml)]/22.5) were calculated.

At the end of the animal test, liver and adipose tissues of mice in the NC, HFD and FEO15 groups were promptly extracted, and the activity or expression level of factors or proteins affecting the synthesis of triglycerides and fatty acids, factors or proteins affecting the decomposition of triglycerides, factors or proteins affecting the oxidation of fatty acids, and factors or proteins affecting the browning/beiging of white adipose tissue were determined and analyzed in molecular biology and biochemistry assays, to identify the pathways and mechanisms by which the FEOs affect triglyceride and fatty acid synthesis.

Data processing was performed using the SPSS 19.0 statistical software package (SPSS Inc., Chicago, IL, USA). The results of animal experiments are shown in FIGS. 10A to 12C.

An improvement greater than 20% in the mice of the FEO group compared with those of the HFD group was deemed as significant.

As can been seen from FIG. 10A and FIG. 10B, the fat coefficients of mice in the NC, NR, FEO13, FEO14, FEO15, and FEO16 groups were at a low level. The fat coefficient of mice in the FEO13 group was 20.53% lower than in the HFD group, that in the FEO14 group was 38.02% lower than in the HFD group, that in the FEO15 group was 51.31% lower than in the HFD group, and that in the FEO16 group was 50.29% lower than in the HFD group, indicating that the FEO with a mass ratio of 3.0 for MCFAs to LCFAs and a mass ratio of 0.5 for linoleic acid to linolenic acid had the effect of significantly reducing body fat of the mice in the range of 50% to 125%.

As can be seen from FIGS. 10C to 11B, the effects of the FEOs were greater in mice regarding serum TG, TC and LDL-C levels. The TG, TC and LDL-C levels of mice in the NC, NR, FEO13, FEO14, FEO15, and FEO16 groups were all at a low level. The TG, TC and LDL-C levels of mice in the FEO13 group were 31.79%, 33.02%, and 20.31% lower than in the HFD group, respectively, those in the FEO14 group were 34.19%, 42.06% and 26.72% lower than in the HFD group, respectively, those in the FEO15 group were 40.92%, 44.72% and 38.83% lower than in the HFD group, respectively, and those in the FEO16 group were 44.46%, 46.93% and 38.83% lower than in the HFD group, respectively, indicating that the addition of the FEO with a mass ratio of 3.0 for MCFA and LCFA and 0.5 for linoleic acid and linolenic acid had a significant effect of lowering the lipids in mice from 50% to 125%

As can be seen from FIGS. 12B and 12C, the FEOs had great effects on serum ALT and AST levels in mice. The ALT and AST levels of mice in the NC group, the NR group and the FEO13, FEO14, FEO15 and FEO16 groups were all at a low level. The ALT and AST levels of mice in the FEO13 group were 61.54% and 61.37% lower than in the HFD group, respectively, those in the FEO14 group were 70.77% and 70.70% lower than in the HFD group, respectively, those in the FEO15 group were 80.40% and 79.61% lower than in the HFD group, respectively, and those in the FEO16 group were 80.79% and 80.02% lower than in the HFD group, respectively, indicating the addition of the FEO with a mass ratio of 3.0 for MCFAs to LCFAs and a mass ratio of 0.5 for linoleic acid to linolenic acid in LCFAs had a significant hepatic injury repairing effect in the range of 50% to 125%.

Glycometabolism is closely related to lipid metabolism, and disorders of lipid metabolism can easily cause disorders of glucometabolism. From FIGS. 11C to 12A, it can be seen that the serum levels of FBG, FINs and HOMA-IR index of mice in the NC, NR, FEO14, FEO15 and FEO16 groups were all at normal but low levels. The levels of FBG, FINs and HOMA-IR index in the FEO14 group were 27.59%, 28.96% and 45.48% lower than in the HFD group, respectively, those in the FEO15 group were 35.58%, 39.29% and 57.78% lower than in the HFD group, respectively, and those in the FEO16 group were 38.80%, 42.32% and 59.89% lower than in the HFD group, respectively, suggesting that the addition of the FEO with a mass ratio of 3.0 for MCFAs to LCFAs and a mass ratio of 0.5 for linoleic acid to linolenic acid in LCFAs had a significant hepatic injury repairing effect in the range of 75% to 125% had a lowering blood glucose in mice. However, the levels of FBG, FINs and HOMA-IR of the mice in the HFD, FEO7 and FEO8 groups were all at high levels, and the reduction of FBG levels and FINs levels in the FEO13 group was less than 20.0% compared with those in the HFD group, indicating that the addition of the FEO with a mass ratio of 3.0 for MCFAs to LCFAs and a mass ratio of 0.5 for linoleic acid to linolenic acid in LCFAs had an effect of lowering blood glucose in mice, but the effect was not significant.

The results of the molecular biological and biochemical experiments showed that the secretion of norepinephrine (NE) in the serum of the FEO15 group was 78.31% higher; the expression of BDNF in the hypothalamus of the FEO15 group was 34.56% higher; in interscapular adipose tissue (brown adipose tissue), inguinal adipose tissue (beige adipose tissue) and epididymal adipose tissue (white adipose tissue) of the FEO15 group, the expressions of the browning-associated protein, UCP1, were 39.90%, 33.86%, and 0.06% higher, respectively, the expressions of Dio2 in the FEO15 group were 46.16%, 26.76%, and 25.81% higher, respectively, the expressions of PRDM16 were 13.57%, 19.08% and 74.70% higher, respectively, the expressions of CIDEA were 61.90%,−29.53% and 14.38% higher, respectively; the expressions of TBX1 in interscapular adipose tissue (brown adipose tissue), inguinal adipose tissue (beige adipose tissue) and epididymal adipose tissue (white adipose tissue) of the FEO15 group mice were 52.91% and 89.59% higher, respectively; in interscapular adipose tissue (brown adipose tissue), groin adipose tissue (beige adipose tissue) and epididymal adipose tissue (white adipose tissue) of the FEO15 group mice, the expressions of β3-AR were 72.43%, 48.18% and 45.91% higher, respectively; in the livers of mice in the FEO15 group, the expressions of the proteins affecting the synthesis of triglycerides and fatty acids, namely, SREBP-1c, ACC1, and FAS, were reduced by 42.45%, 77.72%, and 76.44%, respectively, the expressions of proteins affecting the breakdown of triglycerides, namely ATGL, HSL, and LPL, were increased by 32.06%, 23.18%, and 33.50%, respectively, and the expressions of fatty acid β-oxidation related proteins, namely PPARα and CPT-1a were increased by 18.61% and 47.49%, respectively; in adipose tissues of the FEO15 group, the expressions of SREBP-1c and ACC1, and FAS, proteins affecting the synthesis of triglycerides and fatty acids, decreased by 16.77%, 10.29%, and 17.55%, respectively, the expressions of the proteins affecting the catabolism of triglyceride, namely ATGL, HSL, and LPL increased by 17.59%, 14.29, and 21.36%, respectively, and the expressions of PPARα and CPT-1α, which are proteins affecting the fatty acid β-oxidation, were increased by 9.03%, and 30.36%, respectively, as compared with those in the HFD group.

The data of Example 3 and Example 4 show that in order to significantly improve the effect of fat metabolism disorder in mice, the amount of FEO added to food should be more than 18%, and the effect of FEO as to improving the fat metabolism disorder in mice is most obvious when the ratio of fatty acids in the medium-carbon chain oils is 3:6:1 between caprylic acid, capric acid and lauric acid.

Example 5

In this example, with a mass ratio of 3.0 for MCFAs to LCFAs, and a mass ratio of 0.5 for linoleic acid to linolenic acid, four portions of a mixed oil consisting of 192.25 g of CCSKO, 8.93 g of soybean oil and 48.82 g of linseed oil were weighed into four reactors of the same size, and a mixture of immobilized lipase NOVOZYME® 435 (lipase derived from *Candida antarctica* lipase B), immobilized *Staphylococcus caprae* lipase, immobilized LIPOZYME® RM IM (lipase derived from *Rhizomucor miehei*), immobilized lipase LIPOZYME® TL IM (lipase derived from *Thermomyces lanuginosus*) was added at 10% (w/w) of the mass of the mixed oil in four reactors. The conditions of the ternary transesterification were as follows: magnetic stirring (stirrer 30 mm×10 mm, speed 100 rprn), and the reaction temperature was selected from the recommended optimal temperature for each lipase, which was 60° C. for immobilized lipase NOVOZYME® 435 (lipase derived from *Candida antarctica* lipase B), immobilized lipase LIPOZYME® RM IM (lipase derived from *Rhizomucor miehei*), and immobilized LIPOZYME® TL IM (lipase derived from *Thermomyces lanuginosus*), 40° C. for immobilized *Staphylococcus caprae* lipase, and thee reaction was conducted for 4 h. After the ternary transesterification, the transesterification rate was determined by high performance liquid chromatography-evaporative light scattering detection (HPLC-ELSD). The effects of lipase species on the transesterification rate were compared and analyzed for lipase species selection. As shown in Table 11, the highest transesterification rate of 72.13% (w/w) was achieved when the *Staphylococcus caprae* lipase was used for the preparation of FEOs, so the lipase with the highest catalytic efficiency was *Staphylococcus caprae* lipase.

TABLE 11

| | | Effect of lipase species on ternary transesterification rate. | | |
|---|---|---|---|---|
| Catalyst | LIPOZYME ® RM IM (lipase derived from *Rhizomucormiehei*) | LIPOZYME ® TL IM (lipase derived from *Thermomyces lanuginosus*) | NOVOZYME ® 435 (lipase derived from *Candida antartica* lipase B) | *Staphylococcus caprae* lipase |
| Ternary transesterification rate | 64.31 | 66.78 | 69.82 | 72.13 |

Example 6

In this example, with a mass ratio of 3.0 for MCFAs to LCFAs, and a mass ratio of 0.5 for linoleic acid to linolenic acid, 192.25 g of CCSKO, 8.93 g of soybean oil, and 48.82 g of linseed oil were weighed in a reactor. The conditions of the ternary transesterification were as follows: 5% to 25% of *Staphylococcus caprae* lipase (percentage to the mass of the mixed oil), magnetic stirring (stirrer 30 nm×10 mm, speed 100 rpm), and at 40° C. for 4 h.

After the reaction, the transesterification rate was determined by HPLC-ELSD. The effect of enzyme addition on the transesterification rate was compared and analyzed, and the enzyme addition amount was determined. As shown in Table 12, the highest transesterification rate was 72.08% (w/w) at 10% enzyme addition, so the optimal enzyme addition rate was 10%.

TABLE 12

| | | Effect of the addition of *Staphylococcus caprae* lipase on the transesterification rate. | | |
|---|---|---|---|---|
| Enzyme addition (w/w %) | 5 | 10 | 15 | 20 | 25 |
| Ternary transesterification rate (w/w %) | 69.31 | 72.08 | 68.46 | 63.17 | 60.03 |

Example 7

In this example, with a mass ratio of 3.0 for MCFAs to LCFAs, and a mass ratio of 0.5 for linoleic acid to linolenic acid, 192.25 g of CCSKO, 8.93 g of soybean oil, and 48.82 g of linseed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 25-45° C. for 4 h.

After the reaction, the transesterification rate was determined by HPLC-ELSD. The effect of reaction temperature on the transesterification rate was compared and analyzed to determine the reaction temperature. As shown in Table 13, the highest transesterification rate of 72.13% (w/w) was obtained at a reaction temperature of 40° C. The optimum reaction temperature was 40° C.

TABLE 13

| | | Effect of transesterification temperature on the transesterification rate. | | |
|---|---|---|---|---|
| Temperature (° C.) | 25 | 30 | 35 | 40 | 45 |
| Ternary transesterification rate (w/w %) | 64.44 | 66.92 | 69.96 | 72.13 | 69.24 |

Example 8

In this example, with a mass ratio of 3.0 for MCFAs to LCFAs, and a mass ratio of 0.5 for linoleic acid to linolenic acid, 192.25 g of CCSKO, 8.93 g of soybean oil, and 48.82 g of linseed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 1-8 h.

After the reaction, the transesterification rate was determined by HPLC-ELSD. The effect of reaction time on the transesterification rate was compared and analyzed for reaction time selection. As shown in Table 14, the highest transesterification rate of 72.06% (w/w) was achieved at 4 h, and the optimal reaction time was 4 h.

TABLE 14

| Effect of transesterification time on transesterification rate | |
|---|---|
| Reaction time (h) | Ternary transesterification rate (w/w %) |
| 1 | 34.66 |
| 2 | 62.60 |
| 3 | 70.61 |
| 4 | 72.06 |
| 5 | 71.32 |
| 6 | 70.48 |
| 7 | 69.59 |
| 8 | 68.97 |

Example 9

In this example, with a mass ratio of 3.0 for MCFAs to LCFAs and a mass ratio of 0.5 for linoleic acid to linolenic acid, 192.25 g of CCSKO, 6.07 g of safflower seed oil and 52.18 g of *perilla* seed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.94%, and the triglyceride content with ECN of 34-44 was 65.52%, as determined by HPLC-ELSD. The fatty acid content in the FEO was determined by GC. Caprylic acid 0.31%, capric acid 47.56%, lauric acid 25.93%, linoleic acid 5.14%, linolenic acid 10.87%.

Example 10

In this Example, with a mass ratio of 3.0 for MCFAs to LCFAs and a mass ratio of 0.5 for linoleic acid to linolenic acid, 192.25 g of CCSKO, 7.03 g of corn oil and 52.18 g of *perilla* seed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.83%, and the content of triglycerides with ECN of 34-44 was 64.96%, as determined by HPLC-ELSD. The fatty acid content in the FEO was determined by GC. The results were caprylic acid 0.32%, capric acid 47.29%, lauric acid 26.74%, linoleic acid 5.27% and linolenic acid 10.34%.

Example 11

In this Example, with a mass ratio of 3.0 for MCFAs to LCFAs and a mass ratio of 0.5 for linoleic acid to linolenic acid, 192.25 g of CCSKO, 7.05 g of sunflower seed oil and 48.82 g of linseed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.87%, and the triglyceride content with ECN of 34-44 was 65.14%, as determined by HPLC-ELSD. The fatty acid content in the FEO was determined by GC. The results were caprylic acid 0.33%, capric acid 47.52%, lauric acid 26.23%, linoleic acid 5.31%, linolenic acid 10.27%.

Example 12

With a mass ratio of 3.0 for MCFAs to LCFAs and a mass ratio of 0.5 for linoleic acid to linolenic acid, 192.25 g of glycerol ester of caprylic acid capric acid lauric acid, 6.07 g of safflower seed oil, and 52.18 g of *perilla* seed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.93%, and the triglyceride content with ECN of 34-44 was 63.99%, as determined by HPLC-ELSD. The fatty acid content in the FEO was determined by GC. The results were caprylic acid 24.36%, capric acid 43.65%, lauric acid 7.93%, linoleic acid 4.94%, and linolenic acid 10.65%.

Example 13

With a mass ratio of 3.0 for MCFAs to LCFAs and a mass ratio of 0.5 for linoleic acid to linolenic acid, 192.25 g of glycerol caprylate decanoate laurate, 7.03 g of corn oil, and 52.18 g of *perilla* seed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.75%, and the triglyceride content with ECN of 34-44 was 64.36% as determined by HPLC-ELSD, and the fatty acid content in the functionalized edible oil was determined by GC. The results were caprylic acid 24.21%, capric acid 44.01%, lauric acid 7.73%, linoleic acid 5.07%, and linolenic acid 10.16%.

Example 14

With a mass ratio of 3.0 for MCFAs to LCFAs and a mass ratio of 0.5 for linoleic acid to linolenic acid, 192.25 g of glycerol caprylate, 7.05 g of sunflower oil and 48.82 g of flaxseed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 72.13%, and the content of triglycerides with ECN of 34-44 was 64.83%, as determined by HPLC-ELSD. The fatty acid content in the FEO was determined by GC. The results were caprylic acid 24.33%, capric acid 43.52%, lauric acid 7.23%, linoleic acid 5.11%, and linolenic acid 10.27%.

Example 15

In this Example, with a mass ratio of 3.0 for MCFAs to LCFAs and a mass ratio of 0.5 for linoleic acid to linolenic acid, 194.13 g of caprylic triglyceride, 7.05 g of soya bean oil and 48.82 g of linseed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.89% and the triglyceride content with ECN of 34-44 was 63.57% as determined by HPLC-ELSD. The fatty acid content in the functionalized edible oil was determined by GC. The results were caprylic acid 31.11%, capric acid 44.22%, linoleic acid 5.14% and linolenic acid 10.32%.

Example 16

In this Example, with a mass ratio of 3.0 for MCFAs to LCFAs and a mass ratio of 0.5 for linoleic acid to linolenic acid, 194.13 g of caprylic/capric triglyceride, 7.05 g of sunflower oil and 48.82 g of linseed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 72.14%, and the triglyceride content with ECN of 34-44 was 63.88%, as determined by HPLC-ELSD. The fatty acid content in the FEO was determined by GC. The results were: caprylic acid 30.85%, capric acid 44.12%, linoleic acid 5.04% and linolenic acid 10.13%.

Example 17

In this Example, with a mass ratio of 3.0 for MCFAs to LCFAs and a mass ratio of 0.5 for linoleic acid to linolenic acid, 190.55 g of caprylic/capric triglyceride, 7.24 g of corn oil, and 52.21 g of *perilla* seed oil were weighed and placed in a reactor. The conditions of the ternary transesterification were as follows: 10% of *Staphylococcus caprae* lipase (percentage to the mass of the mixed oil), magnetic stirring (stirrer 30 nm×10 mm, speed 100 rpm), and at 40° C. for 4 h.

At the end of the reaction, the transesterification rate was 71.65%, and the content of triglyceride with ECN of 34-44 was 64.63%, as determined by HPLC-ELSD. The fatty acid content in the FEO was determined by GC. The results were: caprylic acid 30.25%, capric acid 43.21%, linoleic acid 5.26% and linolenic acid 11.23%.

Example 18

A functional non-diary creamer was prepared using the FEO prepared in each example with other ingredients, and the specific steps of the preparation process were as follows:
(1) Preparation of the material solution: according to the functional non-dairy creamer formula in Table 15, the corresponding mass of water-soluble substances was weighed and added to hot water at 63 to 67° C. until all the water-soluble substances were dissolved, then the corresponding mass of the FEO and mono- and diglycerides of fatty acids were weighed and added in an aqueous solution, and then a resulting solution was stirred for 25 to 30 min at 60 to 90 rpm.
(2) Emulsification by shearing: the material was sheared with a shearing machine for about 1 to 2 min;
(3) Emulsification by homogenization: the material was homogenized twice at 25-30 Mpa using a sterilized homogenizer;
(4) Drying and granulation: pressure atomizer and fluidized bed was used for drying and granulation, with an inlet air temperature of 180° C., and an outlet air temperature of 90-100° C.

TABLE 15

Functional non-diary creamer formulations

| Ingredients | Mass ratio (%) |
|---|---|
| Functional edible oil | 20.0-50.0 |
| Starch syrup | 40.0-70.0 |
| Skimmed milk powder | 5.0-10.0 |
| Glycerides of mono- and di- fatty acids | 0.5-5.0 |
| Sodium tripolyphosphate | 0.1-5.0 |
| Sodium caseinate | 0.1-5.0 |
| Hydroxymethylcellulose | 0.2-0.6 |
| Sodium Hexametaphosphate | 0.1-1.5 |
| Dipotassium hydrogen phosphate | 0.1-5.0 |
| Sodium citrate | 0.1-0.5 |
| Sodium chloride | 0.0-0.5 |
| Edible Flavors | 0.0-0.5 |
| SiO$_2$ | 0.0-0.5 |
| Total | 100.0 |

Example 19

A nutritional meal replacement powder was prepared using the FEO prepared in each example with other ingredients, and the specific steps of the preparation process were as follows:

(1) Preparation of the material solution: according to the nutritional meal replacement powder formula in Table 16, the corresponding mass of water-soluble substances was weighed and added to hot water at 63 to 67° C. until all the water-soluble substances were dissolved, then the corresponding mass of the FEO and mono- and diglycerides of fatty acids were weighed and added in an aqueous solution, and then a resulting solution was stirred for 25 to 30 min at 60 to 90 rpm.
(2) Emulsification by shearing: the material was sheared with a shearing machine for about 1 to 2 min;
(3) Emulsification by homogenization: the material was homogenized twice at 25-30 Mpa using a sterilized homogenizer;
(4) Drying and granulation: pressure atomizer and fluidized bed was used for drying and granulation, with an inlet air temperature of 180° C., and an outlet air temperature of 90-100° C.

TABLE 16

Nutritional Meal Replacement Powder Formulas

| Ingredients | Mass ratio (%) |
|---|---|
| Starch syrup | 30.0-55.0 |
| Functional edible oil | 20.0-50.0 |
| Skimmed milk powder and protein | 20.0-30.0 |
| Oligofructose | 20.0-30.0 |
| Dietary fiber | 5.0-10.0 |
| Resistant starch | 5.0-10.0 |
| Glycerides of mono- and di- fatty acids | 0.2-5.0 |
| Glutamine | 2.0-3.0 |
| Complex Minerals | 0.1-1.0 |
| Multivitamins | 0.1-0.5 |
| Food Flavors | 0.1-0.3 |
| Total | 100.0 |

Example 20

A functional milk tea powder was prepared using the FEO prepared in each example with other ingredients, and the specific steps of the preparation process were as follows:
(1) Preparation of the material solution: according to the functional milk tea powder formula in Table 17, the corresponding mass of water-soluble substances was weighed and added to hot water at 63 to 67° C. until all the water-soluble substances were dissolved, then the corresponding mass of the FEO and mono- and diglycerides of fatty acids were weighed and added in an aqueous solution, and then a resulting solution was stirred for 25 to 30 min at 60 to 90 rpm.
(2) Emulsification by shearing: the material was sheared with a shearing machine for about 1 to 2 min;
3) Emulsification by homogenization: the material was homogenized twice at 25-30 Mpa using a sterilized homogenizer;
(4) Drying and granulation: pressure atomizer and fluidized bed was used for drying and granulation, with an inlet air temperature of 180° C., and an outlet air temperature of 90-100° C.

TABLE 17

Functional Milk Tea Powder Formulas

| Ingredients List | Mass ratio (%) |
|---|---|
| Tea Juice | 20.0-50.0 |

TABLE 17-continued

Functional Milk Tea Powder Formulas

| Ingredients List | Mass ratio (%) |
|---|---|
| Functional edible oil | 20.0-50.0 |
| Skimmed Milk Powder | 5.0-15.0 |
| Emulsifier | 0.1-3 |
| Stabilizer | 0.1-1.5 |
| Sweeteners | 0.1-15.0 |
| Acidity regulator | 0.1-0.5 |
| Flavos | 0.0-0.2 |
| Antioxidant | 0.0-0.5 |
| Total | 100.0 |

Example 21

The FEO prepared in each example was used together with other ingredients to prepare an injectable nutritional lipid emulsion, the specific steps of the preparation process were as follows:

(1) Water for injection was heated to 65° C., and ingredients were added according to the mass ratio in Table 18, and stirred in pharmaceutical glycerol accordingly to dissolve as aqueous phase.

(2) The FEO was heated to 65° C., added to phosphatidylcholine and phosphatidylinositol, and prepared as oil phase by stirring and dissolving.

(3) The oil phase was added to the aqueous phase, and subjected to 1,000 rpm high-speed shearing for 10 min to prepare raw emulsion.

(4) The pH of the raw emulsion was adjusted to 7, and the water for injection was added to make 135 g of ingredients per 1,000 ml raw emulsion.

(5) 3 cycles of high pressure emulsification was performed at a pressure of 1,000 bar to prepare fine emulsion.

(6) The fine emulsion was filtered with a 0.45 m microporous membrane, sterilized and filled.

TABLE 18

Injectable nutritive fat emulsions

| Ingredients | Mass ratio (%) |
|---|---|
| Functional Edible Oil | 75 |
| Pharmaceutical glycerol | 16.99 |
| phosphatidylcholine | 8 |
| phosphatidylinositol | 0.01 |

Example 22

Specific steps for preparing an oral nutritional lipid emulsion using the functional edible oil prepared in each example together with other ingredients are as follows:

(1) According to the ingredient ratios in Table 19, lecithin, pharmaceutical glycerol and purified water (1000 ml of lipid emulsion per 205 g of ingredients) were heated to 60° C., placed in a vacuum homogenized, stirred at 1,000 rpm, and added with the FEO to prepare raw emulsion.

(2) The raw emulsion was quickly transferred to a high-pressure homogenizer with a low pressure valve at 150 kg cm², and a high pressure valve at 500 kg cm², the emulsion was collected when the pressure was stable and the temperature stabilized at 40° C., and the operation was repeated for 15 times until the emulsion particle size was 50 nm.

(3) The pH was adjusted to 7, and the emulsion was passed through a 0.45 m microporous filter membrane, sterilized and subjected to bottle filling.

TABLE 19

Oral nutritional lipid emulsions

| Ingredients | Mass ratio (%) |
|---|---|
| Functional Edible Oil | 70 |
| Pharmaceutical glycerol | 10 |
| Lecithin | 5 |
| Calcium Caseinate | 9 |
| Vitamins | 3 |
| Minerals | 3 |

What is claimed is:

1. A functional edible oil (FEO), wherein the FEO is prepared by ternary transesterification of medium chain triglycerides (MCTs), oils rich in linoleic acid, and oils rich in linolenic acid;

the MCTs are selected from the group consisting of *Cinnamomum camphora* seed kernel oil (CCSKO), caprylin, caprin, laurin, caprylic/capric triglyceride, capric/lauric triglyceride, caprylic/capric/lauric triglyceride, and a mixture thereof;

the oils rich in linoleic acid are selected from the group consisting of soybean oil, corn oil, sunflower seed oil, safflower seed oil; and the oils rich in linoleic acid are selected from the group consisting of linseed oil and *perilla* seed oil, wherein the FEO has a mass ratio of 2.3 to 4.0 for medium chain fatty acids (MCFAs) to long chain fatty acids (LCFAs) and a mass ratio of 0.5 to 1.0 for linoleic acid to linolenic acid in the LCFAs, based on a mass of total fatty acids;

and wherein the MCFAs are derived from the MCTs selected from the group consisting of *Cinnamomum camphora* seed kernel oil (CCSKO), caprylin, caprin, laurin, caprylic/capric triglyceride, capric/lauric triglyceride, caprylic/capric/lauric triglyceride, and a mixture thereof; and the LCFAs are derived from the group consisting of oils rich in linoleic acid, and oils rich in linolenic acid.

2. The FEO according to claim 1, wherein the FEO has a mass ratio of 3.0 for MCFAs to LCFAs, and a mass ratio of 0.5 for linoleic acid to linolenic acid in the LCFAs, based on the mass of total fatty acids.

3. The FEO according to claim 1, wherein the MCFAs in the FEO are selected from the group consisting of caprylic acid, capric acid and lauric acid; and the LCFAs in the FEO has a content of 3.94% to 7.37% for linoleic acid and a content of 7.16% to 11.97% for linolenic acid, with respect to a total mass of the FEO in percentage.

4. The FEO according to claim 3, wherein the MCFAs in the FEO are selected from two or more of caprylic acid, capric acid and lauric acid; and the LCFAs in the FEO has a content of 5.30% for linoleic acid and a content of 9.97% for linolenic acid, with respect to a total mass of the FEO in percentage.

5. A method for preparing the FEO of claim 1, comprising subjecting the MCTs, oils rich in linoleic acid, and oils rich in linolenic acid to ternary transesterification with lipase as a catalyst, and under suitable temperature and stirring intensity, so as to obtain the FEO in one step; wherein the FEO has a mass ratio of 2.3 to 4.0 for MCFAs in the MCTs to LCFAs in the oils rich in linoleic acid, and oils rich in linolenic acid, and a mass ratio of 0.5 to 1.0 for linoleic acid to linolenic acid in the LCFAs;

the lipase is selected from the group consisting of lipase derived from *Rhizomucor miehei*, lipase derived from *Thermomyces lanuginosus*, lipase derived from *Candida antarctica* lipase B, and *Staphylococcus caprae* lipase;

the lipase is added at 5% to 25% with respect to a mass of mixed oil, the suitable temperature is 25 to 45° C., and the ternary transesterification is conducted for 1 to 8 h.

6. A method for preparing food, comprising adding the FEO according to claim 1 to food.

7. The method according to claim 6, wherein the FEO is added to the food at ≥18.00% based on total weight.

8. The FEO according to claim 3, wherein the FEO has a mass ratio of 3.0 for MCFAs to LCFAs, and a mass ratio of 0.5 for linoleic acid to linolenic acid in the LCFAs, based on the mass of total fatty acids.

9. The method according to claim 5, wherein the FEO has a mass ratio of 2.3 to 4.0 for medium chain fatty acids (MCFAS) to long chain fatty acids (LCFAs) and a mass ratio of 0.5 to 1.0 for linoleic acid to linolenic acid in the LCFAs, based on a mass of total fatty acids;

and wherein the MCFAs are derived from the MCTs selected from the group consisting of CCSKO, caprylin, caprin, laurin, caprylic/capric triglyceride, capric/lauric triglyceride, caprylic/capric/lauric triglyceride, and a mixture thereof; and the LCFAs are derived from the group consisting of oils rich in linoleic acid, and oils rich in linolenic acid.

10. The method according to claim 6, wherein the FEO has a mass ratio of 2.3 to 4.0 for medium chain fatty acids (MCFAs) to long chain fatty acids (LCFAs) and a mass ratio of 0.5 to 1.0 for linolic acid to linolenic acid in the LCFAs, based on a mass of total fatty acids;

and wherein the MCFAs are derived from the MCTs selected from the group consisting of CCSKO, caprylin, caprin, laurin, caprylic/capric triglyceride, capric/lauric triglyceride, caprylic/capric/lauric triglyceride, and a mixture thereof, and the LCFAs are derived from the group consisting of oils rich in linoleic acid, and oils rich in linolenic acid.

\* \* \* \* \*